United States Patent [19]
Hsu et al.

[11] Patent Number: 5,465,322
[45] Date of Patent: Nov. 7, 1995

[54] APPARATUS AND METHOD FOR PARSING A STREAM OF DATA INCLUDING A BITMAP AND CREATING A TABLE OF BREAK ENTRIES CORRESPONDING WITH THE BITMAP

[75] Inventors: Lillian-Liu Hsu, Rochester; Kitty Sathi, Pittsford; Mark C. Biondi, Rochester; Thomas B. Zell, Victor; David A. Catapano, Rochester; Richard T. Lauria, Webster, all of N.Y.

[73] Assignee: Xerox Corporation, Stamford, Conn.

[21] Appl. No.: 072

[22] Filed: Jan. 4, 1993

[51] Int. Cl.$^6$ .................................................. H04N 1/419
[52] U.S. Cl. ............................................................ 395/114
[58] Field of Search .................................. 395/114, 115, 395/116, 575, 600; 358/429, 430, 431, 261.3; 370/85.13

[56] References Cited

U.S. PATENT DOCUMENTS

| | | | |
|---|---|---|---|
| 4,888,812 | 12/1989 | Dinan et al. | 382/7 |
| 4,975,828 | 12/1990 | Wishneusuy et al. | 364/200 |
| 5,122,875 | 6/1992 | Raychaudhuri et al. | 358/133 |
| 5,150,462 | 9/1992 | Takeda et al. | 395/166 |
| 5,170,340 | 12/1992 | Prokop et al. | 364/143 |
| 5,278,400 | 1/1994 | Appel | 358/455 |
| 5,361,338 | 11/1994 | Kobayashi et al. | 395/375 |

FOREIGN PATENT DOCUMENTS

| | | |
|---|---|---|
| 048625A1 | 3/1982 | European Pat. Off. . |
| 302432A2 | 2/1989 | European Pat. Off. . |
| 574224A2 | 12/1993 | European Pat. Off. . |

*Primary Examiner*—Mark R. Powell
*Assistant Examiner*—Gabriel I. Garcia
*Attorney, Agent, or Firm*—Gary B. Cohen

[57] ABSTRACT

A printing system for making prints from a stream of image data written in a printer page description language is provided. The stream of image data includes a compressed bitmap having break entries dividing the bitmap into a plurality of image data segments. The printing system includes an arrangement for separating the compressed bitmap from the stream of image data and a boundary code catcher, which communicates with the separating arrangement, for creating a table to list the break entries of the bitmap. A memory section is employed to store the bitmap with its corresponding break entry table, and a plurality of imaging channels, which communicate with the memory section, are employed to decompress selected segments of the bitmap in parallel.

16 Claims, 12 Drawing Sheets

| | | |
|---|---|---|
| First Segment | Break Entry Length | Pointer to First Line Boundary Code |
| Second Segment | Break Entry Length | Pointer to First Line Boundary Code |
| Third Segment | Break Entry Length | Pointer to First Line Boundary Code |
| ⋮ | ⋮ | ⋮ |
| Nth Segment | Break Entry Length | Pointer to First Line Boundary Code |

73

APPARATUS AND METHOD FOR PARSING A STREAM OF DATA INCLUDING A BITMAP AND CREATING A TABLE OF BREAK ENTRIES CORRESPONDING WITH THE BITMAP

BACKGROUND OF THE INVENTION

The present application is related to the co-pending U.S. Pat. application Ser. No. 08/000,074, entitled "Apparatus and Method for Processing a Stream of Image Data in a Printing System", filed Jan. 4, 1993, the pertinent portions of which are incorporated herein by reference.

The present invention relates generally to a technique for processing image data in a printing system and, more particularly to processing a stream of image data with one or more compressed bitmaps in a manner that maximizes the rate at which image data is outputted.

Electronic printing systems employ image data as the image source when producing prints. One source of image data is a document scanner which scans the documents that comprise the job and converts images on the documents to the image data necessary to produce prints. One electronic printing system capable of producing prints in this manner is referred to as the DocuTech® printing system, which is manufactured by Xerox® Corporation. In a preferred embodiment of the DocuTech® printing system, the scanner transmits bitmaps, in the form of raw (uncompressed) data to an image compression processor where the bitmap image is compressed. In conjunction with compressing the image, a prediction break table is compiled.

A format of the prediction break table is discussed in the following reference, the pertinent portions of which Encoding Standard are incorporated herein.

Title: *Xerox Raster Encoding Standard* ("Encoding Standard") Publication No. XNSS 178905 Publication Date: 1990

The Encoding Standard discloses a decoding algorithm which, preferably, treats an encoding section of a vector as vector binary values $P_{encoded}$, and produces a vector of binary values denoted as $P_{decoded}$. Data bits for $P_{encoded}$ are extracted in groups of 4, 8 or 12 bits. The first eight bits comprise a code SOI (start of image), and the last eight bits are a code EOI (end of image). Each scan line is decoded separately and begins with an eight-bit line boundary code (LBC), each LBC indicating which of four modes is used. Some modes of the decoder depend on previously-decoded scan lines, while others "break" the dependencies on previous scan lines. A decompression operator requires that the first scan line of an image be a break line and that break lines occur at least every 16 scan-lines. The decompression operator may specify the locations of break lines in the encoding data, using a break table that appears immediately after the encoding data. An entry in the break table describes a block of encoded data that begins with a break line. The block is described by its length, in scan lines, and the LCC for the first scan line of the block is indicated with a pointer.

Essentially, the prediction break table delineates segments of compressed image data for an image. Preferably, in the DocuTech® printing system, each bitmap can be either stored out to disk, with its corresponding break entry table, for subsequent printing at an image output terminal ("IOT") or transmitted from the image compression processor to the IOT. The IOT is coupled with a plurality of imaging channels, each of the imaging channels being adapted to decompress a plurality of segments of image data, so that, upon reading the break entry table, the imaging channels can decompress the plurality of segments of image data in parallel. As the segments of image data are decorepressed, the decompressed image data can be buffered for printing by the print engine. It has been found that this sort of parallel processing scheme serves to increase the speed of printing significantly, while minimizing costs of construction and operation.

The following reference contemplates the use of a table, in conjunction with a stored image, to facilitate display of the stored image U.S. Pat. No. 5,150,462 Patentees: Takeda et al. Issued: Sep. 22, 1992

In a network printing system, compressed image data is transmitted to an electronic printing system in the form of a stream of data expressed in terms of a page description language ("PDL"). The PDL can include, among other things, a compressed bitmap. Preferably, as discussed in the following patent application, a decomposer, with one or more processors and suitable software, is employed to "take apart" an input document so that the PDL is "parsed" into various image related components with a preparser.

U.S. patent application Ser. No. 07/898,761 Entitled: *Apparatus and Method for Multi-Stage/Multi-Process Decomposing* Filed: Jun. 12, 1992

As discussed in the above-indicated reference, the pertinent portions of which are incorporated herein, the decomposer executes the PDL to generate imaging primitives. In doing this, the decomposer, for example, uses an arrangement for parsing the PDL into various image related components. The types of operations required to generate imaging primitives include, among others, binding fonts with requested fonts, any image processing on pictorial information, and/or converting line art/graphics (including bitmaps) to lower level primitives.

While the above-discussed scanning/compression scheme of the DocuTech® printing system contemplates creating a break table while compressing a bitmap, it does not contemplate a printing system which is capable of creating a break table from a PDL stream captured, "on-the-fly", from a network.

SUMMARY OF THE INVENTION

In accordance with the present invention there is provided a printing system for making prints from a stream of image data written in a printer page description language with the stream of image data including a compressed bitmap having break entries dividing the bitmap into a plurality of image data segments, including: an arrangement for separating the compressed bitmap from the stream of image data; a device, communicating with the separating arrangement, for creating a table to list the break entries of the bitmap; a memory section for storing the bitmap with its corresponding break entry table; a plurality of imaging channels, communicating with the memory section, for decorepressing selected segments of the bitmap in parallel.

These and other aspects of the invention will become apparent from the following description, the description being used to illustrate a preferred embodiment of the invention when read in conjunction with the accompanying drawings.

DESCRIPTION OF THE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
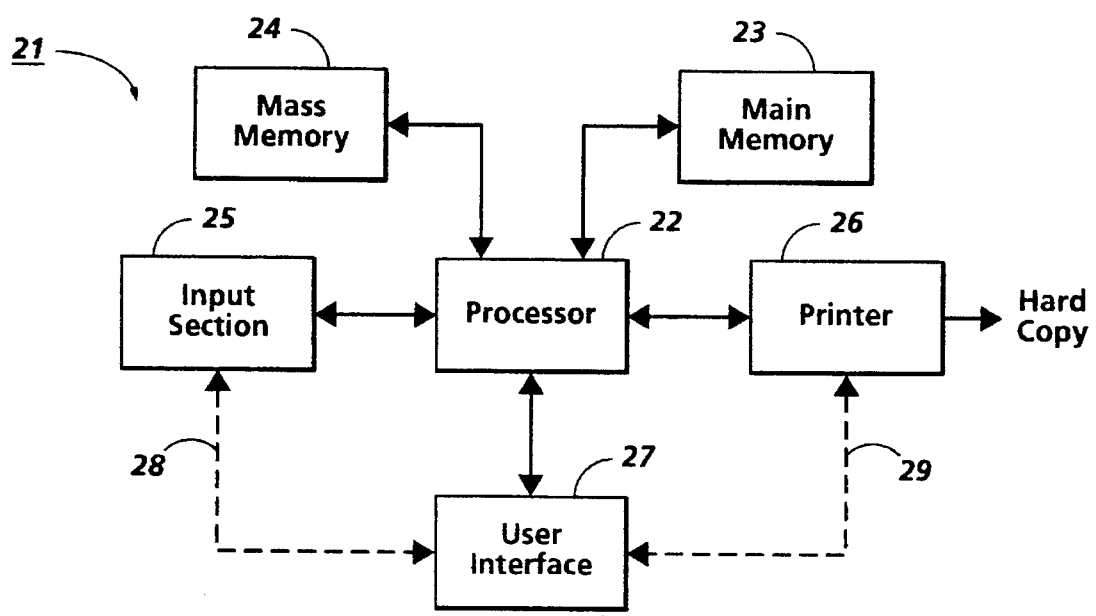
FIG. 1 is a block diagram of a printing system in which the present invention can be carried out.

Turning now to the drawings, and at this point especially to FIG. 1, there is an electronic printing system 21 to illustrate a typical environment for this invention. In keeping with standard practices, the printing system 21 comprises a digital processor 22 having a main memory 23 and a mass memory 24, an input section 25 for providing a job written in a printer page description language (PDL), and a printer 26 for printing hardcopy renderings of selected image components obtained from the PDL. Furthermore, there is a user interface 27 for enabling a user to interact with the processor 22, the input scanner 25, and the printer 26.

As will be understood, the user interface 27 collectively represents the input devices through which the user enters image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering use instructions, a monitor for giving the user a view of the process that is being performed by the processor 22, and a cursor controller for enabling the user to move a cursor for making selections from and/or for entering data into a process that is being displayed by the monitor (none of these conventional components is shown).

The illustrated printing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input scanner 25 and the printer 26 may have its own user interface, as indicated by the dashed lines 28 and 29, respectively. Indeed, it will be evident that the printing system 21 could be reconfigured to have a distributed architecture to operate with a remote input section and/or a remote printer (not shown). Data could be transferred from and to such remote input section and printer terminals via dedicated communication links or switched communication networks (also not shown).

Figure 2:
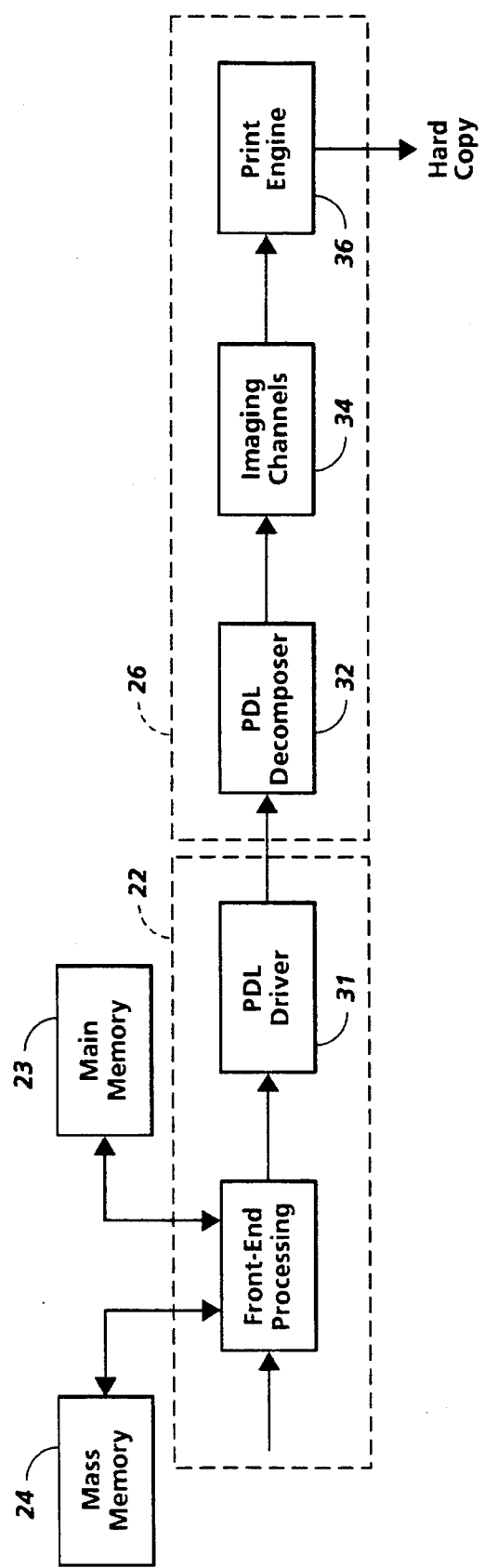
FIG. 2 is a, block diagram of a processor/printer interface for the printing system shown in FIG. 1.

As shown in FIG. 2, the processor 22 preferably includes a PDL driver 31 for transferring to the printer 26 PDL descriptions of the electronic document files that are selected for printing. Thus, the printer 26 is illustrated as having a PDL decomposer 32 for decomposing such PDL descriptions to produce corresponding bitmapped image file. It will be appreciated, particularly in view of the discussion below, that the decomposer 32 is capable of receiving PDL files from mass memory, such as disk, or from off the network "on the fly." Additionally, the printer 26 includes a print engine 36, the print engine 36 including one or more image data buffering devices and being coupled with the decomposer 36 by way of an arrangement of imaging channels 34. The significance of the imaging channels will be discussed in further detail below.

Figure 3:
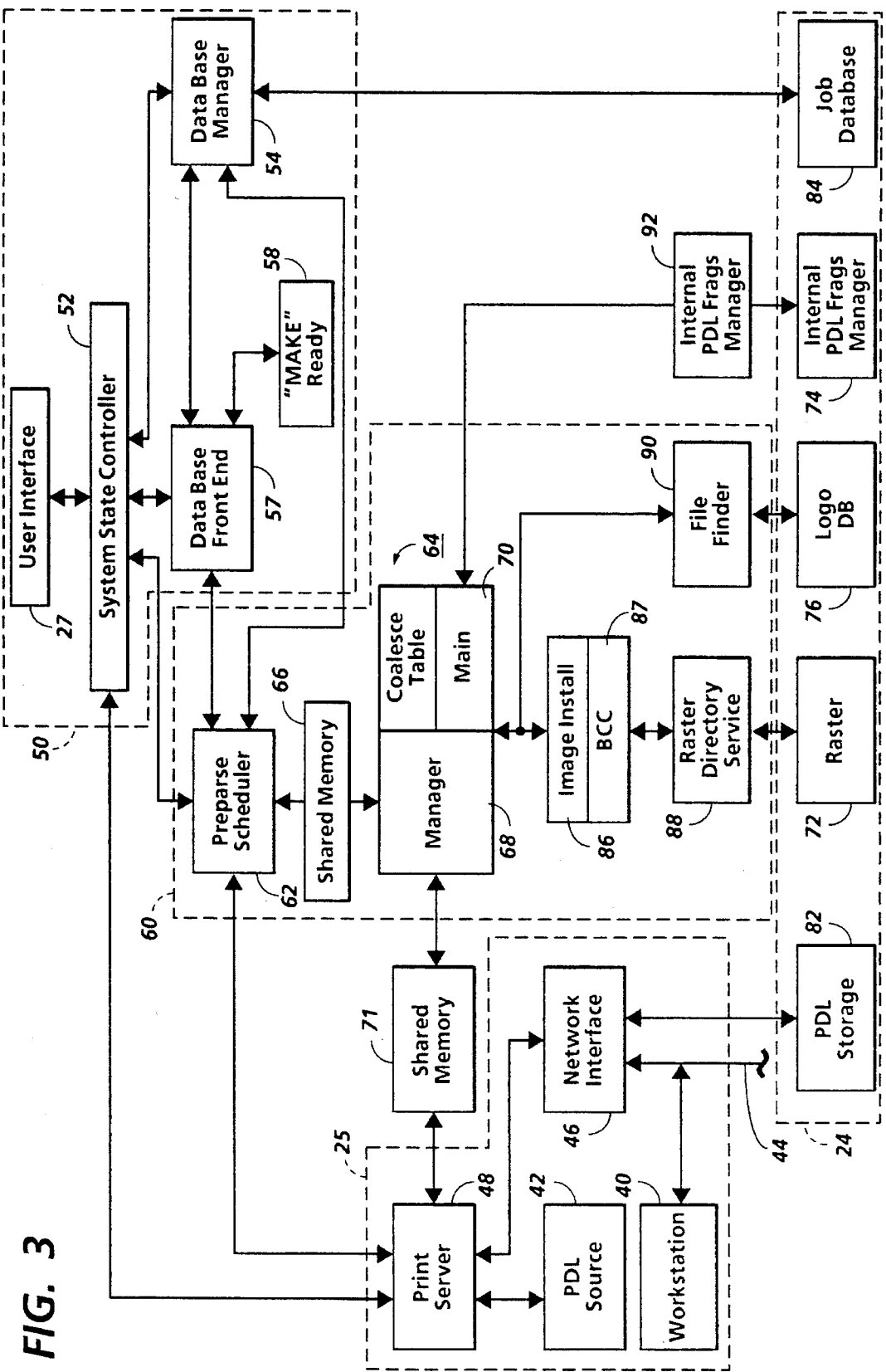
FIG. 3 is a block diagram of selected sections of a decomposer for the printing system of FIG. 1, the selected sections including an input section, a system, managing section and a parsing section.

Referring to FIG. 3, an arrangement including the mass memory 24, the input section 25 and a portion of the decomposer 32 is shown. In the illustrated embodiment of FIG. 3, the input section 25 comprises up to two PDL emitters, such as a workstation 40, or any other suitable PDL source 42. In one Example, the workstation 40 is Xerox® 6085 (the term "Xerox 6085" is a trademark used by Xerox® Corp.) workstation coupled with a network 44, such as a network sold by Xerox® Corp. under the trademark of EtherNet™. The network is interfaced with the decomposer 32 by way of a suitable network interface 46, which could include one of many known interfaces such as TCP/IP™, AppleTalk™ or Token Ring™. Both of the workstation 40 and the PDL source 42 are interfaced with the decomposer 32 by way of a print server 48, which print server 48 can be a suitable protocol corresponding with the specifications of the PDL Source 42 and/or the network interface 46. The print server 48 communicates with a system manager 50.

In the preferred embodiment, the system manager 50 comprises a system state controller (SSC) 52 of the type disclosed in patent application Ser. No. 07/591,325 entitled "System State Controller for Electronic Image Processing Systems," filed Sep. 28, 1990, the pertinent portions of which are incorporated herein, the user interface (UI) 27, which, in one example, is of the type disclosed in U.S. Pat. No. 5,083,210, the pertinent portions of which are incorporated herein, a database manager 54 and a database front end processor 57. Additionally, the database manager 54 preferably comprises a database job queue and a database coalescer table. The features of the present invention can be obtained through use of any suitable, commercially available database. Alternatively, one of ordinary skill in the art could, without undue experimentation, construct the database of the present invention by reference to one of several known texts, such as the following text:

Martin, J. Computer Data-Base Organization Prentice Hall, Inc. Englewood Cliffs, N.J. 1975

The database front end processor 57, which serves to define the structure of the PDL job, and the sequence in which image related identifiers stored in the database are operated on, can be constructed by those skilled in the art in view of the type of database manager selected for use. As will appreciated from the discussion below, the database manager 54 is the conduit through which virtually all image related identifiers and all job identifiers ("handles") flow. Moreover, editing of postparsed information is achieved by use of a "make ready" process 58 which is coupled with the front end 57. The "make ready" process, which serves to interpret operator commands for performing bitmap processing, is used in the DocuTech™ electronic printer which is sold by Xerox® Corp.

Referring still to FIG. 3, the print server 48, the SSC 52 and the data base front end processor 57 each communicate with a parsing section 60 by way of a preparse scheduler 62. In the preferred embodiment, the steps of the parsing section 60 are performed on a MESA™ processor of the type manufactured by Xerox® Corp. The preparse scheduler 62 communicates with a preparser 64 by way of a block of shared memory 66. In the preferred embodiment of the present invention, the preparser includes a manager section 68 and a main section 70. In one example, the manager section comprises a MESA™ processor of the type referred to immediately above, and the main section comprises a similar processor and a math coprocessor, the math coprocessor being similar to any one of a number of commercially available math coprocessors. Additionally, the manager 68 communicates with the print server 48 by way of a block of memory 71, and the main section 70 is configured to store a coalesce table, the significance of which table will be discussed in further detail below.

The preparser 64, which serves to break up PDL into image related components, is capable of storing those components in mass memory 24, which, in the preferred embodiment is a disk storage device, such as the one used on the DocuTech™ electronic printer manufactured by Xerox® Corp. Preferably, the disk storage device is adapted to receive rasters or bitmaps in raster storage section 72 and internal PDL fragments ("internal PDL frags") in internal PDL frags. storage section 74. It should be recognized that internal PDL fragments are higher level primitives to be imaged on a substrate, In one example, an internal PDL fragment serves to transform coordinate systems inputted to the decomposer for printing. Employment of other storage sections in the mass memory 24 to receive other image related components is contemplated by the present invention.

In practice, the mass memory 24 is configured to not only receive and store the image related components developed by the preparser 64, but to store, on a long term basis, a relatively large variety of logos (in logo DB storage section 76) and fonts (in a font storage section which is not shown). Employment of other storage sections in the mass memory 24 to store other image related components, on a long term basis, is contemplated by the present invention. Additionally, the disk storage device preferably includes section 82 for storing PDL files to be processed and a section 84 for storing all information communicated to the database manager 54. Preferably, the storage section 82 is used in conjunction with volatile memory, such as cache so that each PDL job need not necessarily be stored out to disk. In one example, the job database 84 is adapted to contain a structure for image related components of a job written in a PDL. It will be appreciated by those skilled in the art that a suitable memory arrangement could be used in place of the job database without affecting the underlying concept of the present invention.

Figures 4, 5:
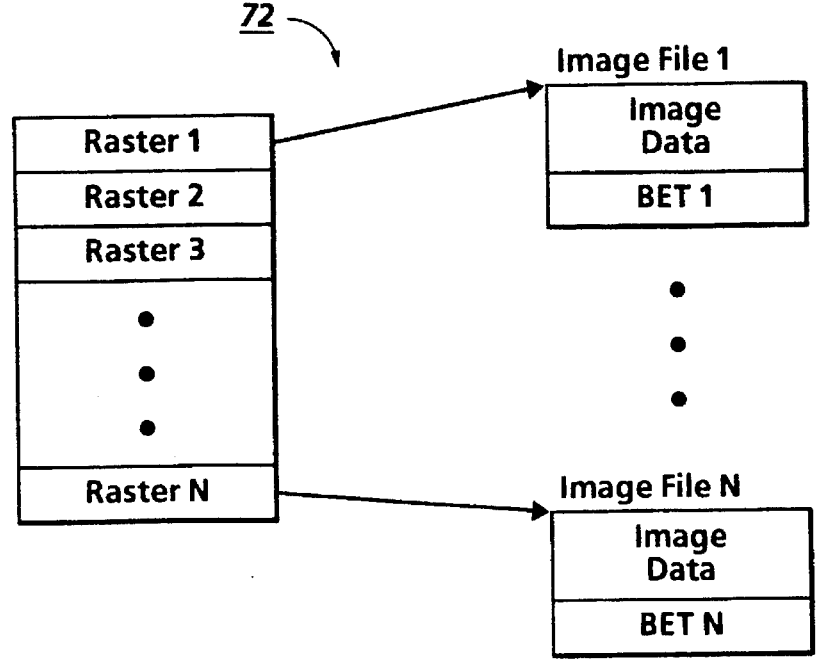
FIG. 4 is a schematic view of a prediction break table used in conjunction with a technique of the present invention.
FIG. 5 is a block diagram illustrating the manner in which bitmaps, processed in accordance with the technique of the present invention, are stored in memory.

In practice, the preparser 64 is interfaced with the raster section 72 by way of an image install process 86, a Boundary Code Catcher ("BCC") 87 and a raster directory service (DS) 88. Preferably, the BCC achieves its intended purpose through use of a plurality of programmable logic arrays programmed with suitable software, the details of the software being discussed in further detail below. In one embodiment of the present invention, each raster or bitmap is stored in the storage section 72 with a corresponding break entry table ("BET") 73, an example of which break entry table is shown in FIG. 4 as an array of break table segments. A detailed discussion of the format used for table 73 is provided in the Encoding Standard.

As explained in further detail below, each bitmap comprises a plurality of segments with break entries, each entry designating a scanline count. Preferably, the BCC 87, in accordance with the the algorithm discussed below, builds the table 73 by indicating the location of each break entry in the image and relating it with a pointer to corresponding line boundary code.

In accordance with the above-described embodiment, the preparser 64 is interfaced with the logo DB section 76 (FIG. 3) by way of a file finder process 90 and the internal PDL frags section by way of Internal PDL Frags Manager 92. Referring to FIGS. 3 and 5, one or more supplemented bitmaps are transmitted from the BCC 87 to the raster DS 88. Each supplemented bitmap comprises a bitmap with its corresponding BET. As illustrated specifically in FIG. 5, each supplemented bitmap is assigned an image identifier, each image identifier pointing to one of the supplemented bitmaps stored in the storage section 72. Finally, for the illustrated embodiment of FIG. 3, copies of the corresponding image identifiers from the raster DS 88 are passed to the preparser 64.

Referring still to FIG. 3, the internal PDL frags manager 92 is adapted to assign a fragment identifier to each internal PDL fragment transmitted thereto, and pass each of those identifiers to the preparser 64. On the other hand, the file finder 90 assigns an identifier to calls for logos received at the preparser 64 from the print server 48, and permits the logos to be fetched by the preparser 64 when they are available in the logo DB section 76. When the called for logo is not available in the logo DB section, the file finder 90 is capable of issuing an appropriate fault message for display at the UI 27 or for printing with a hardcopy print.

Figure 6:
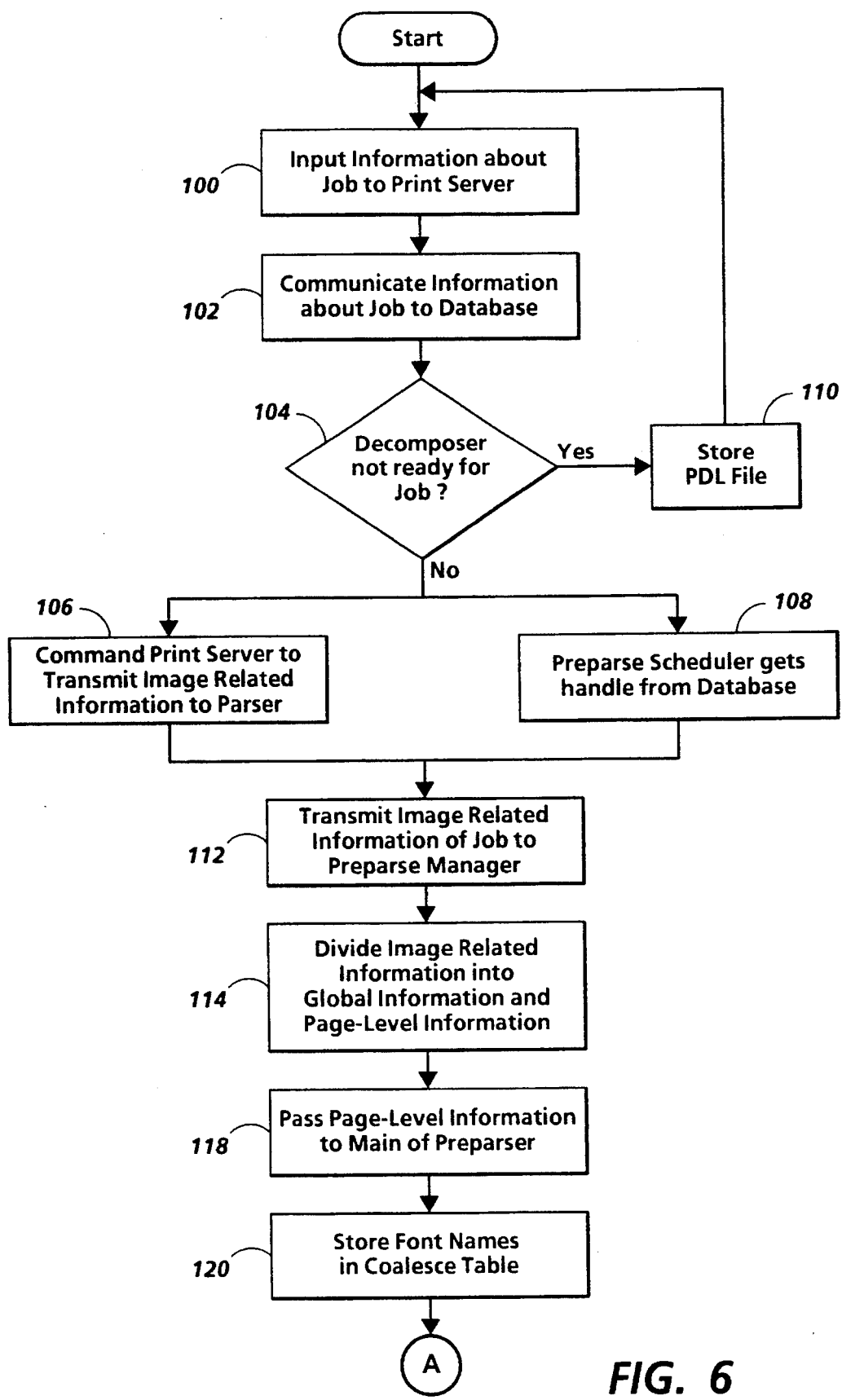
FIGS. 6 and 7 conjunctively represent a flow diagram depicting a preferred mode of operation for the input section, system managing section and parsing section of FIG. 3.
Figure 7:
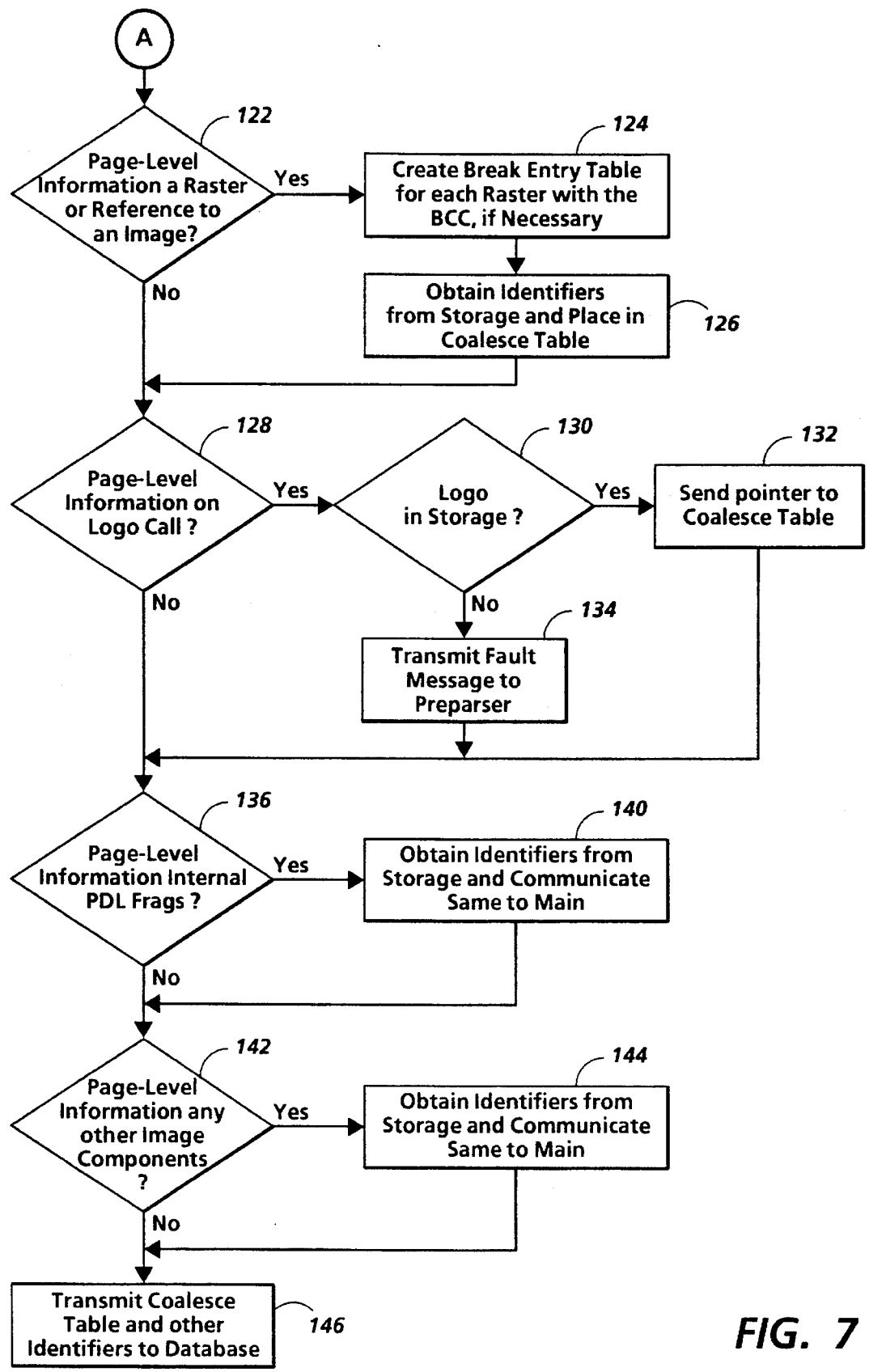

Referring to FIGS. 6 and 7, the inputting and parsing of the PDL file(s) will be discussed in further detail. Referring specifically to FIG. 6, at step 100, a job file written in a particular PDL, such as Interpress used by Xerox® Corp.,is provided from either the workstation 40 or the PDL source 42. Upon inputting the PDL job to the print server 48, basic information regarding, for example, the structure of the job and the order in which the job should be processed, is transmitted to the database manager 54 (step 102) by way of the preparse scheduler 62 and the database front end processor 57. The database manager 54 indicates to the SSC 52 that it has a job, and in due course, provided that the decomposer is ready (see step 104), the SSC 52 commands the print server 48 to begin transmitting blocks of the PDL file to the manager section 68 across shared memory block 71 (step 106) and causes the preparse scheduler 62 to obtain a job identifier ("handle") from the database manager 54 (step 108). The handle represents the information that the preparse scheduler 62 will need to pass the image related identifiers resulting from the parsing process on to the database manager 54. Alternatively, as illustrated by steps 104 and 110, if a job is ready to be inputted concurrent with a job being processed, the job that is ready to be inputted can be stored for subsequent processing. In one preferred embodiment of the present invention, as described in further detail below, step 110 is performed in conjunction with a filtering technique.

As the PDL is transmitted to the manager section 68 (step 112), it is, per step 114, broken down into global information, such as a header and a preamble, and page level information. Additionally, the manager 68 finds the beginning of each page within the job file ("master") for setting up the image related components ("data structures") to be received by the main section 70. Essentially, the manager functions as a syntactical analyzer, insuring that the syntax of the encoded PDL master is correct. The manager preferably performs some pre-work for the main 70 and possesses limited interpretative capabilities.

At step 118, page-level information is passed from the manager 68 to the main 70 at which information, or, more specifically, data structures are created. The main looks into a linked list of set up pages and sequentially decomposes them. The manager and the main can work on separate pages or the main can work ahead of the manager within a page. Once the manager has created a data structure for a page, the main executes data structures within the page for storage in the mass memory 24. Per step 120, the main 70 inserts any font names that it gleans from pages in a coalesce table stored in the main.

Referring to FIG. 7, once the page-level data structures are available, identifiers therefore are obtained. If rasters (i.e., bitmaps) or references to rasters ("tokens of interest") are found among the data structures (step 122), the rasters are communicated to the raster storage section 72 by way of the image install 86 and the raster DS 88. For each raster found among the data structures, a break entry table is created, with the BCC 87, at step 124. An approach for processing the rasters referenced by the tokens of interest is described in further detail below. Per step 126, the rasters, with their respective break entry tables, are assigned identifiers by the raster directory service, and the identifiers are passed to the main 70 for placement in the coalesce table.

If logo calls, i.e., calls for a merge item, are found among the data structures (step 128), the file finder 90 checks to see if the logos are in the logo DB section 76 (step 130). For those logos in the logo DB, corresponding pointers for the available logos are communicated to the main (step 132) for placement in the coalesce table. For those logos not in the logo DB, a fault message is, per step 134, returned to the main for eventual display or printing into hardcopy. Per steps 136 and 140, internal PDL fragments are created and communicated to the internal PDL frags storage section 74 by way of the internal PDL frags manager 92. With step 140, the internal PDL fragments are assigned identifiers or "tokens" by the internal PDL frags manager 92, and the identifiers are passed to the main 70. As shown by steps 142 and 144, any other data structures flowing from the main 70 would be handled in a manner similar to that shown for rasters or internal PDL fragments. After all of the identifiers are provided to the main 70, a signal is sent to the preparse scheduler 62, and the identifiers, per step 146, are communicated to the database manager 54.

Figure 8:
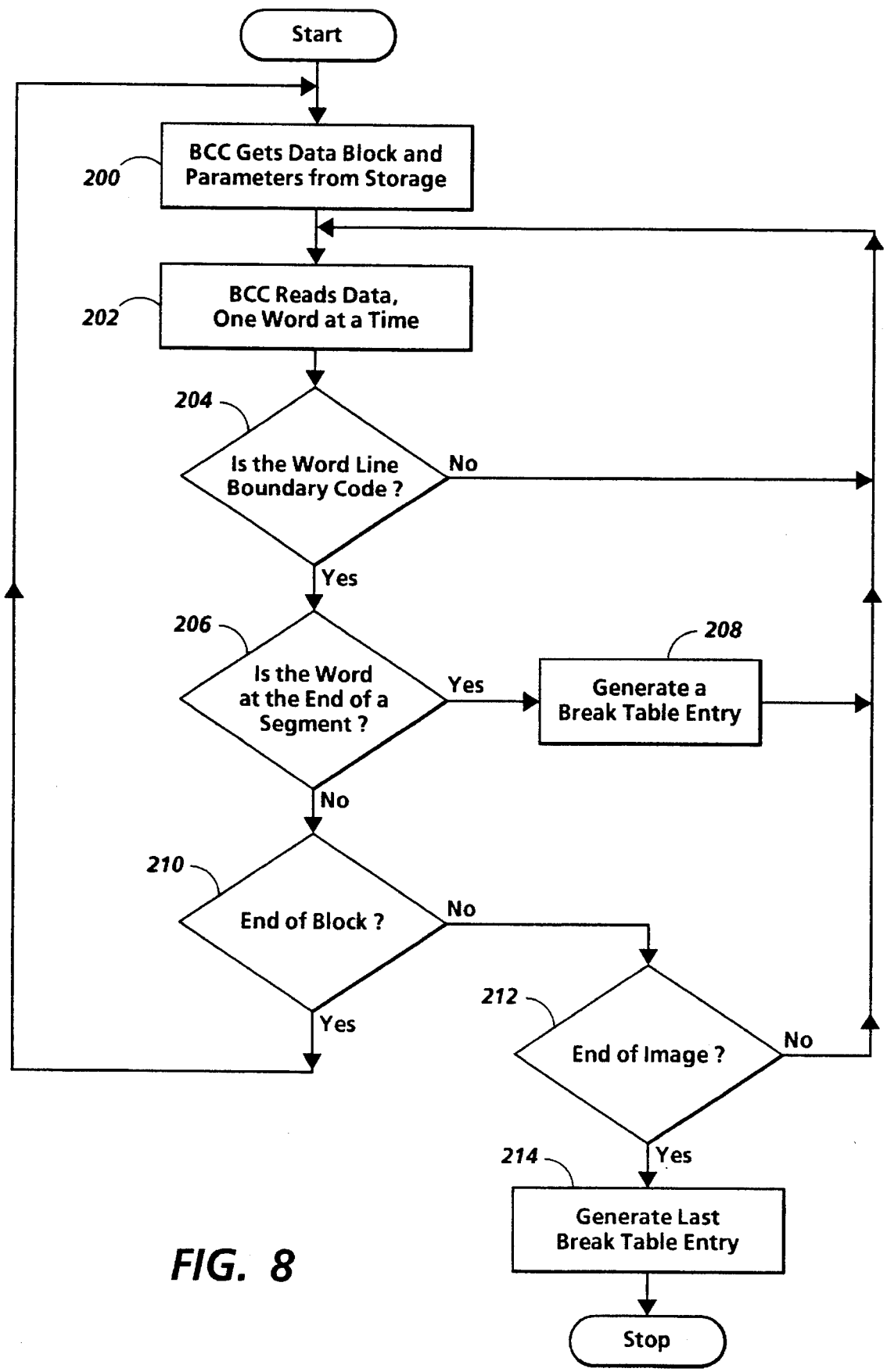
FIG. 8 is a flow diagram demonstrating the operation of a boundary code catcher ("BCC"), the BCC being used, preferably, in conjunction with either the input section or the parser.

Referring to FIG. 8, a technique for creating the break entry table 73 of FIG. 4 is discussed in further detail. In the preferred embodiment of the present invention, one or more data blocks, representing a bitmap, are buffered and, initially, at step 200, the BCC 87 fetches a data block, along with pertinent parameters, such as "image handle", "pixel sequence type", "pixel encoding offset", etc. The BCC 87 then reads one word of image data at-a-time (step 202), from the block of image data and checks each word to determine if it includes line boundary code. If a word does not include line boundary code (step 204), then the process returns to step 202. If, on the other hand, the word does include line boundary code, then the word is examined, per step 206, and it is determined whether the word is at the end of a segment. If the word marks the end (or, alternatively, the beginning) of a segment, then a break table entry is generated (step 208) and then the process loops back to step 202 to read another word. If the word does not mark the end of a segment (step 206), but the word is at the end of the block being examined (step 210), then the process returns to step 200 to fetch another block of image data, provided another block has been transmitted to the image install 86 from the preparser 64. If the word is neither the end of a segment nor the end of a block (steps 206, 210), then a check is performed to determine if the end of the image has been reached (step 212). When the end of the image has been reached, a "last break table entry" is generated (step 214), and the process is ended.

Referring to Appendix A, the portions of which are incorporated as part of the present description, the various steps of FIG. 8 are shown as code written in MESA™ language. In particular, support for step 200 is provided in Part 1 of Appendix A, while support for step 202, 204, 206, 208, 210, 212 and 214 are provided in Part 2 of Appendix A.

As described in patent application Ser. No. 07/898,761, the pertinent portions of which are incorporated herein, a postparser (not shown) causes all of the data structures assimilated by the decomposer to be placed in a suitable form for printing and places corresponding raster identifiers, font identifiers and primitive representations of internal PDL fragments into a bandlist for printing. Through employment of the bandlist, image data is delivered to the imaging channel arrangement 34, each of which channels is adapted to process, and, more particularly, decompress segments having up to 256 scanlines of image data.

Figure 9:
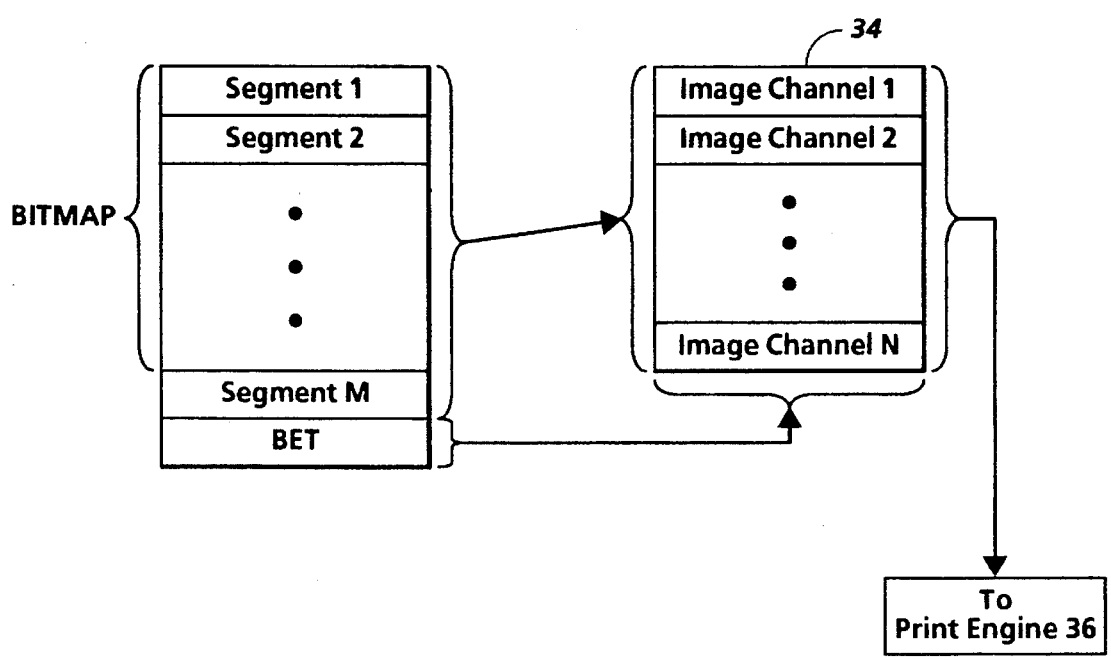
FIG. 9 is a block diagram illustrating the manner in which bitmaps, stored in accordance with the technique of the present invention, are printed with the printer/processor interface of FIG. 2.

Referring to FIG. 9, the break entry table is read by the imaging channel arrangement 34 and a suitable number of data segments are delivered, in parallel, to the imaging channels for decompression of the compressed scanlines of each segment. Accordingly, the imaging channels of imaging channel arrangement 34 serve as multiple decompression channels. In one example, each segment comprises 16 scanlines of image data. As the image data is decorepressed, the resulting decorepressed image data can be buffered for subsequent consumption by the print engine 36. It will be appreciated by those skilled in the art, that either a single segment can be fed to a single imaging channel, a plurality of segments can be fed to one imaging channel at a time or a plurality of segments can be fed to a plurality of imaging channels. Moreover, in one example of operation, one imaging channel can work ahead of another since the rate at which image data is decompressed can vary between the imaging channels.

It should be recognized that the decorepressed image data can be used for purposes other than printing. For example, the decompressed image data could be simply displayed on the UI 27. Additionally, since segments of each bitmap are decompressed in parallel, portions of a bitmap can be displayed, or printed, out of sequence. This sort of selective output can be particularly useful in, among other operations, a cut and paste routine. More particularly, certain editing functions can be performed with selected portions of the bitmap, rather than the entire bitmap itself.

Figure 10:
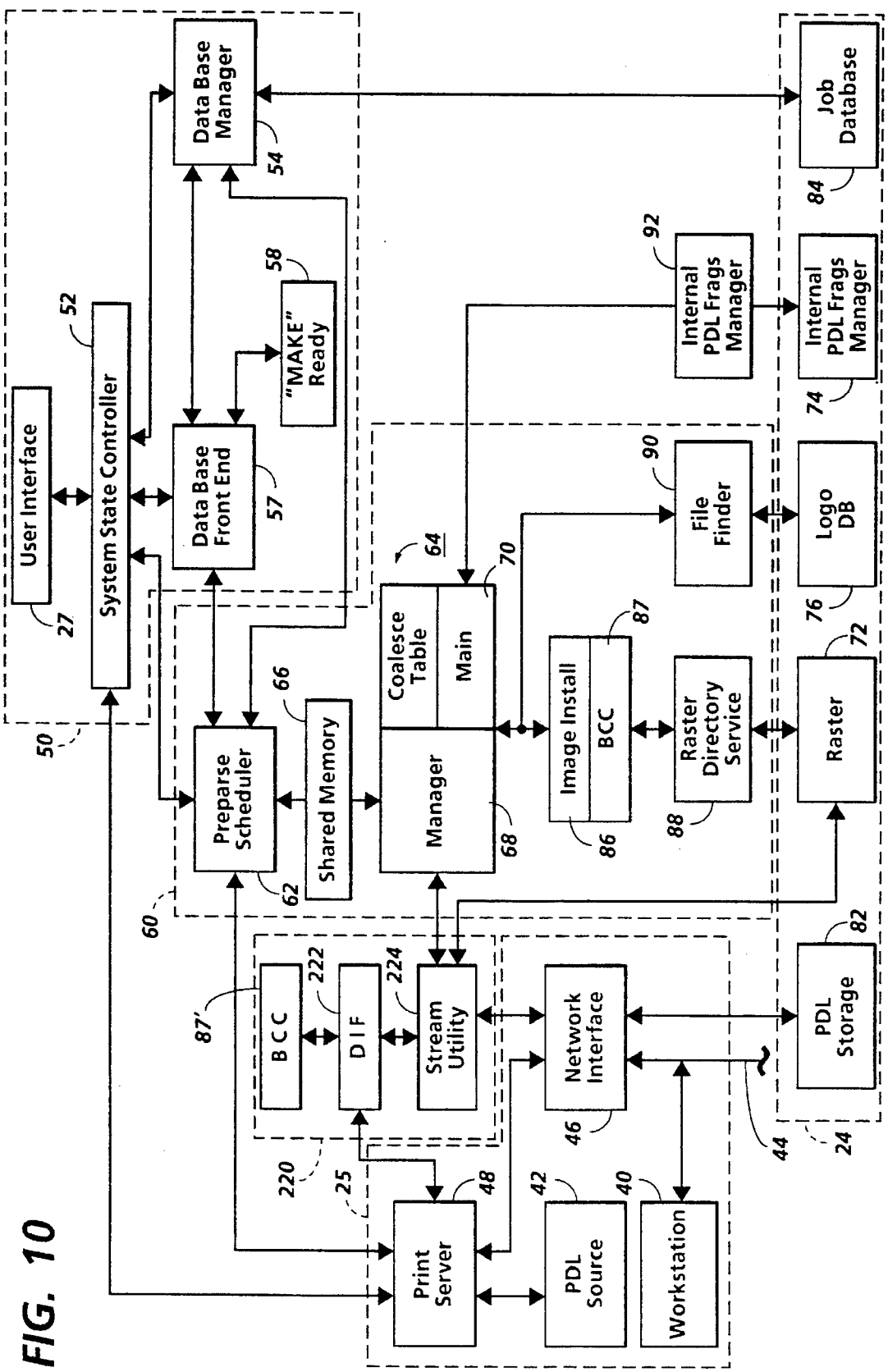
FIG. 10 is a block diagram of selected sections of a decomposer for the printing system of FIG. 1, the selected sections including an input section with a decomposer image filter ("DIF"), a stream utility and the BCC, a system managing section and a parsing section.

Referring to FIG. 10, another embodiment of the input area for the printing system 21 is shown. The illustrated embodiment of FIG. 10 is similar to that of FIG. 3 except that an input filtering arrangement 220 is substituted for the shared memory 71. The input filtering arrangement 220 comprises a decomposer input filter ("DIF") 222 communicating with both a stream utility 224 and a BCC 87'. In practice, the BCC 87 and BCC 87' are structurally and functionally equivalent; however, the two apparatuses are designated with separate numerals for ease of discussion and purposes of clarity.

The functions of DIF 222 and the stream utility 224 can be obtained on a MESA processor of the type designated above. Moreover, it will be appreciated by those skilled in the art that the functions of DIF and the stream utility could be combined with affecting the concept of the present invention. The software used to implement the DIF 222 and the stream utility 224 are included in the present description as APPENDIX B, the entire portion of which is incorporated herein. External interfaces for DIF are appended to the Appendix" B. As illustrated in APPENDIX C, the program used with DIF is "reentrant" so that multiple users can access DIF, in parallel. Additionally, the program for the print server 48, like DIF, is reentrant. Finally, the network interface 46 and the stream utility 224 are both capable of communicating multiple streams to and from DIF 222, in parallel.

Referring still to FIG. 10, the operation of the filtering arrangement 220 is explained in further detail. It should be recognized that while the following description refers to the processing of a single stream of image data, the input section 25, along with the filtering arrangement 220, are, as mentioned immediately above, capable of processing multiple streams, in parallel. Upon receiving a stream of image data, the network interface 46 indicates, to the print server 48 that a connection is desired. In response to such indication, the print server passes suitable parameters to the DIF 222 for processing the incoming input stream. In turn, DIF passes appropriate "handles" to the stream utility 224 for accessing the input stream and passing the by-products of the filtering process to either the raster storage section 72 or the PDL storage section 82. Upon setting up the DIF 222 and the stream utility 224 appropriately, the input stream is inputted to DIF via the network interface 46 through employment of the stream utility 224.

Figure 11:
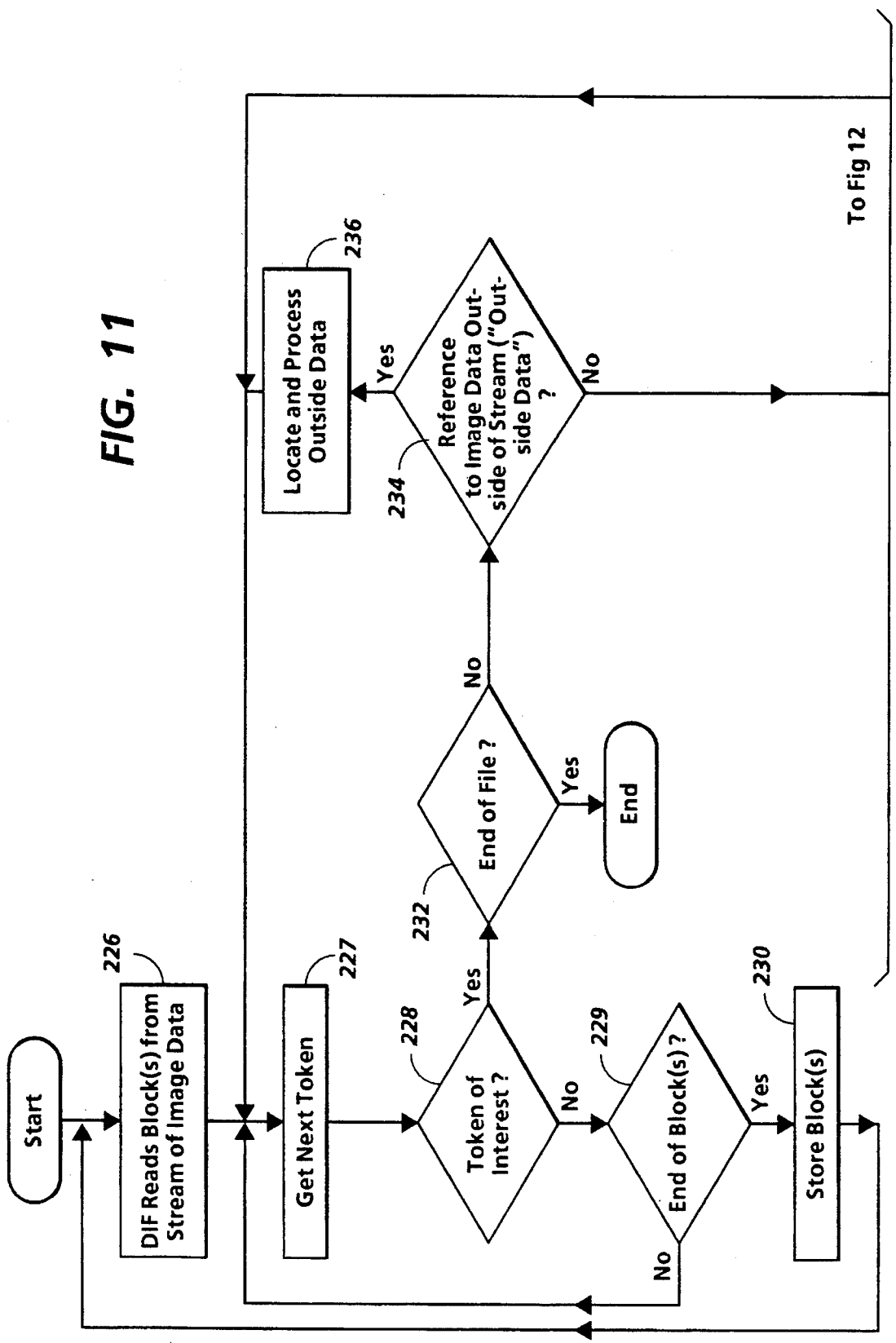
FIGS. 11–12 represent, conjunctively, a flow diagram illustrating the manner in which DIF examines and processes a stream of image data communicated from a network to the input section.
Figure 12:
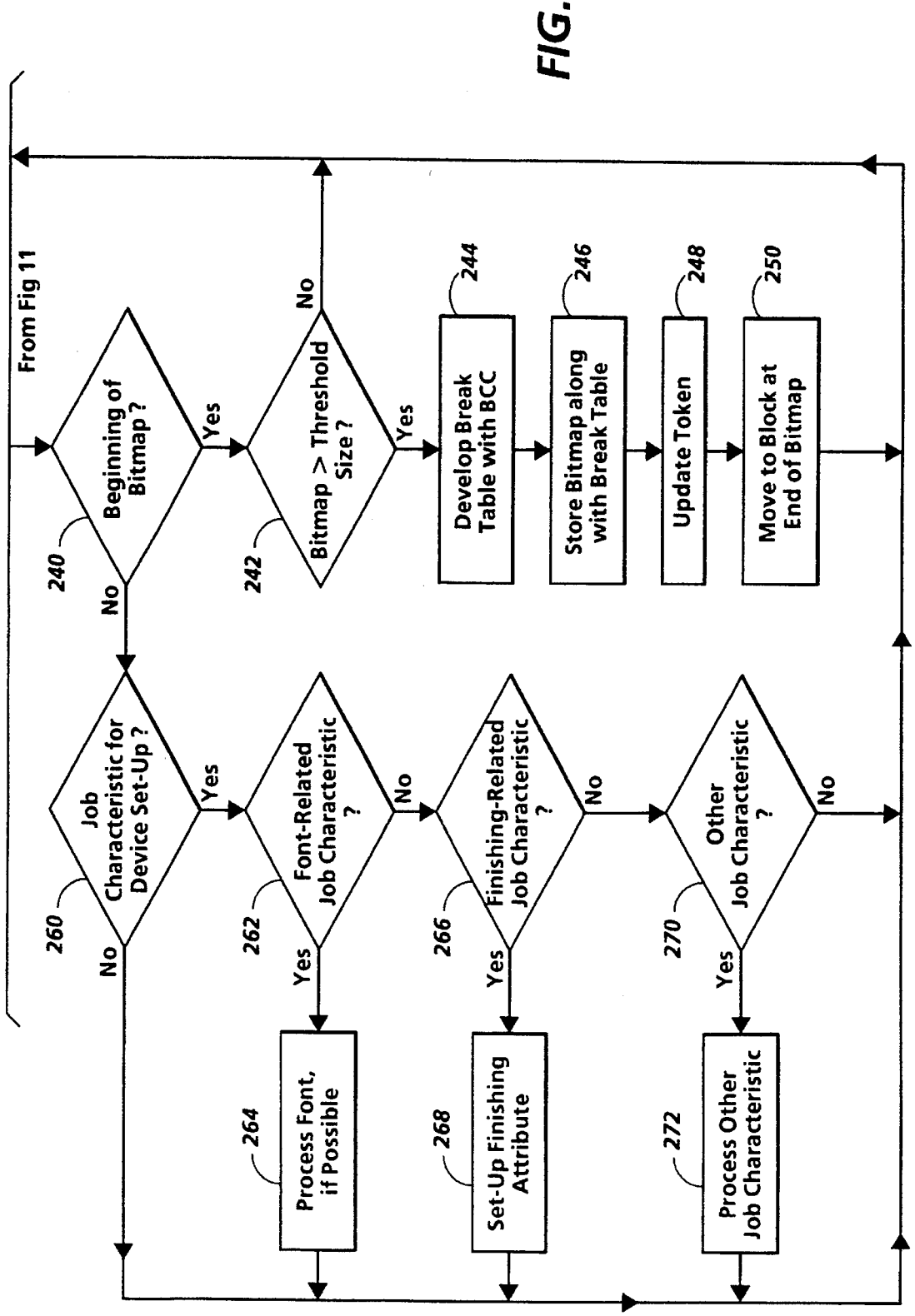

Referring to FIGS. 11 and 12, the processing of the input stream by DIF 222 is discussed in further detail. Preferably, image data is read by DIF (step 226), block-by-block, as it is fed thereto with the stream utility 224. It will be recognized by those skilled in the art that a block could be as small as a single word, or that more than one block could be fed to the DIF at one time. As each block is read, DIF determines, via steps 227, 228, whether the block under examination includes a token of interest. For each new block, the step 227 initially causes the first token found in the new block to be referenced. At step 229, the process checks to see if the end of the block has been reached. It has been found that a counting index scheme can be used to determine the beginning and end of the block. If the end of the block has not been reached, then the processs loops back to step 227 for getting the next token. If, on the other hand, the end of the block has been reached, then, via step 230, that block is handed over to the stream utility 224 for transmission thereby to PDL storage 82, and the process loops back to step 226 for reading another block. As indicated above, the PDL storage section 82 can include cache. Accordingly, the block need not necessarily be stored out to disk.

Once a token of interest is found (step 228), it is determined, at step 232, whether the found token constitutes the end of the input stream. If the token does not constitute the end of the stream, then it is determined, at step 234, whether the token relates to a reference to image data outside of the stream ("outside data "), such as a sequence insert file ("SIF") or a sequence insert master ("SIM"). A detailed discussion of SIFs and SIMs can be found in the following reference, the pertinent portions of which are incorporated herein by reference:

Harrington, S. J. and Buckley, R. R. Interpress: The Source Book Simon & Schuster, Inc. New York, N. Y. 1988

Assuming that the token of interest designates outside data, such outside data is, via step 236, retrieved and processed suitably. In one example, the outside image data would comprise a bitmap stored either locally or remotely of the printing system 21. The referenced bitmap would preferably be processed in accordance with steps 242, 244, 246, 248 and 250 (FIG. 12), as described below. It will be appreciated by those skilled in the art that step 236 contemplates the retrieval and processing of other local and/or remote images other than bitmaps. For example, the outside data could constitute another stream of image data.

When it is determined that the token of interest corresponds to a bitmap (step 240) (FIG. 12), the process proceeds to step 242. If the bitmap is smaller than a predetermined size, then the bitmap is left in the stream for parsing and eventual storage with the image install 86. It has been found that storing bitmaps with the filtering arrangement 220 does not necessarily facilitate the decomposing process unless the bitmap to be separated is above a predetermined threshold size. If the bitmap is below the predetermined threshold, then it is eventually stored at step 230. When the bitmap is greater than the predetermined threshold then, it is examined with the BCC 87' (step 244) in accordance with the procedure described above. Additionally, DIF 222 provides the image data associated with the bitmap to the BCC 87'. Once a break table is formed for the bitmap, the bitmap is stored, along with the break table, by the stream utility 224 (step 246) in the raster storage section 72. Upon storing the bitmap and break table, the token of interest is revised or updated (step 48) to reflect a modification of the input stream. Storing the bitmap removes a plurality of blocks from the stream and these blocks need not be read again at step 226. Accordingly, through use of step 250, the examination is continued at a block which is at the end of the bitmap.

Figure 13A:
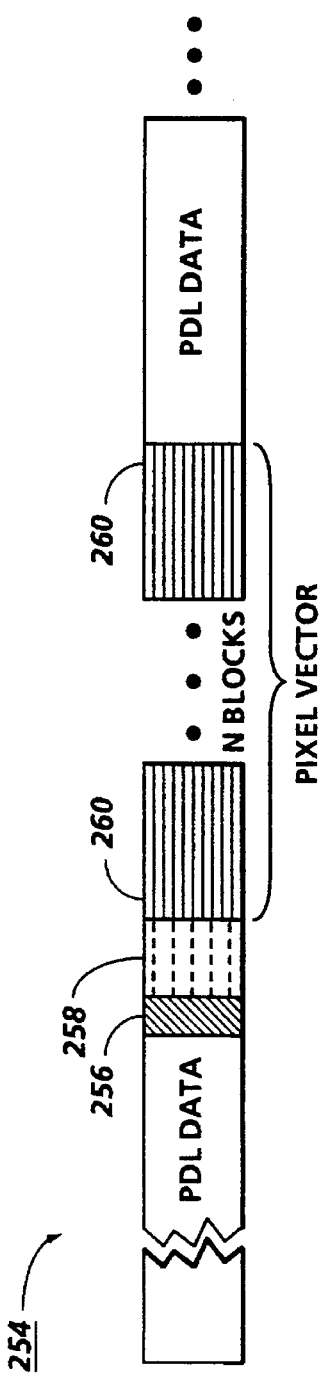
FIGS. 13A–13C are respective schematic views of an unmodified PDL stream, a modified PDL stream, and a bitmap extracted in accordance with another inventive technique.
Figure 13B:
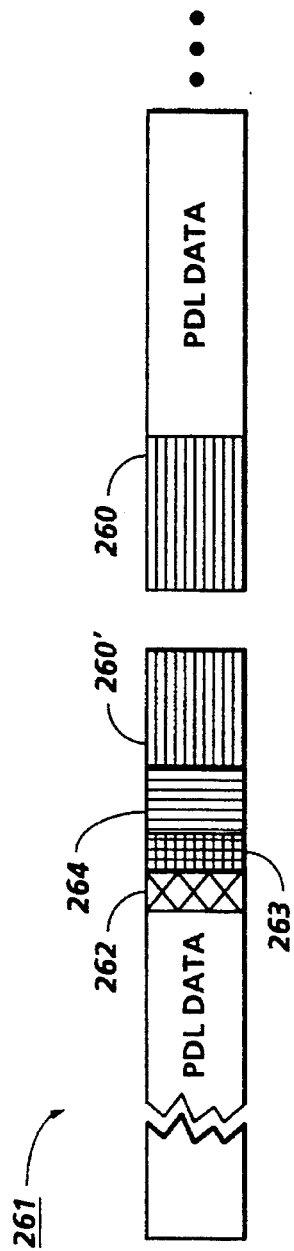
Figure 13C:
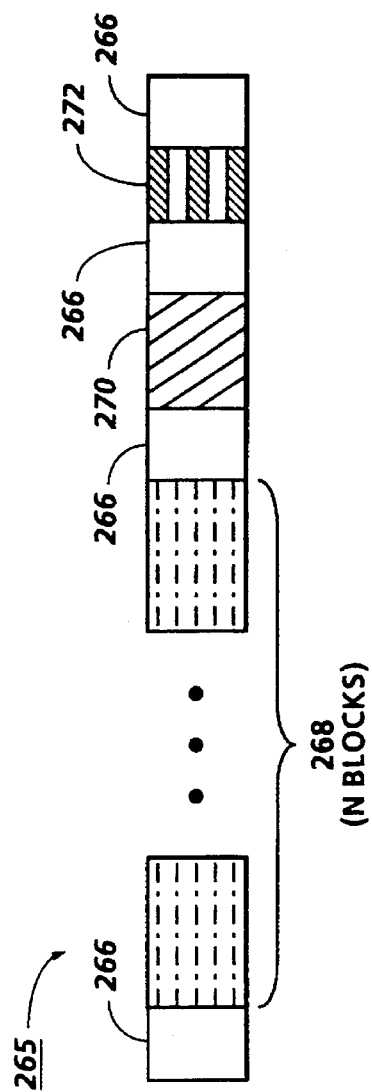

Referring to FIGS. 13A–13C, the manner in which the input or original PDL stream is modified with the filtering arrangement 220 is discussed in further detail. Referring specifically to FIG. 13A, a stream fragment 254, including PDL data portions and image information, is shown. The image information, which, in one example, comprises pixel vector information (i.e., bitmap information), is designated with the numerals 256, 258 and 260. The section 256, which is commonly referred to as a "token", indicates a pixel sequence type, i.e., whether the image is a pixel vector, a SIF/SIM, etc. While the illustrated embodiment of FIGS. 13A–13C shows the pixel sequence type as being a bitmap, as mentioned above, the pixel sequence type could comprise one of a variety of image types. Additionally, as described in further detail below the token 256 can serve to initiate a large range of job characteristics. The section 258 preferably is one to three bytes in length and designates the length of the bitmap. It should be appreciated that, in another aspect of the disclosed embodiment, as described below, the section 258 could include a variety of information serving to further define a process indicated by the token. The information regarding length is employed to make an appropriate decision at step 242 of FIG. 11. The portions designated with the numerals 260 represent portions of the stream which are not necessarily stored in the raster storage section 72, while the N blocks between the portions 260 represent portions of the stream which are stored in the raster storage section 72. It will be appreciated by those skilled in the art that the portions 260 could be stored with the N blocks, or deleted altogether, without altering the concept of the present invention.

Referring to FIG. 13B, the input stream of FIG. 13A, as modified in accordance with the procedure of the present invention, is designated by the numeral 261. The image information of the modified stream 261 is designated with the numerals 260, 260', 262, 263 and 264. A modified token, indicating a preinstalled pixel sequence type, is provided in section 262. A length designator 263 serves as an offset indicator to the next valid PDL token. Preferably, an eight byte file identifier, being designated with the numeral 264 and pointing to the location of the pixel vector in the raster storage section 72, is provided. In the modified stream, the file identifier may be written over part of portion 260 to form portion 260'.

Referring to FIG. 13C, a pixel vector file, as stored in raster storage section 72, is designated with the numeral 265. Various portions of the stored pixel vector file 265 are respectively designated with the numerals 266, 268, 270 and 272. Portions 266 represent extraneous material resulting from page boundarizing while portion 268 represents image data corresponding substantially with the stored pixel vector. Additionally, portion 270 represents a break table corresponding with the image data and portion 272 comprises a pixel vector trailer, the trailer preferably being written at the end of the pixel vector file. As indicated in Appendix B, the pixel vector preferably relates to a host of information required by the raster directory service 88 for installing the pixel vector in the raster storage section 72, such information including sequence length, pixel sequence type, compression scheme, etc.

Referring again to FIG. 10, in one example of operation, a plurality of connections are made at the filtering arrangement 220, each stream is processed accordingly and a first stream is fed, with the stream utility 224, to the manager 68 for parsing. The other streams are modified, in accordance with the above-described procedure, and the stream utility 224 directs the modified streams and the separated bitmaps to the PDL storage 82 and raster storage section 72, respectively. As mentioned above, the PDL storage section can include cache memory so that one or more streams need not be stored out to disk. The size of the cache employed is only limited by practical constraints.

While parsing image data, if the manager 68 detects a bitmap identified by sections 262 (FIG. 13B), it causes the identified bitmap in the raster storage section 72 to be registered in the Raster DS 88 by the image install 86. It should be appreciated that in the illustrated embodiment of FIG. 10, the BCC 87 only forms break tables for those bitmaps which are less than a threshold size. For this embodiment, the BCC 87 is relegated to a minor role since a substantial number of the bitmaps fed to the image install 86 are already appended with respective break tables, each of these appended break tables being developed with the BCC 87'. Each bitmap of the first stream, with its corresponding break table, is installed in the raster storage section 72 as described above with respect to the discussions of FIGS. 8 and 13C. Once the first stream is parsed, each modified stream stored in the PDL storage section 82 is, in turn, retrieved with the stream utility 224 and parsed.

Referring to the following table, an example which serves to illustrate a feature of the filtering arrangement 220 is shown.

| Event in msec | With Filtering Arrangement | With Spooling |
|---|---|---|
| Start Capture PDL | 0 | 0 |
| End Capture PDL | 43339 | 39434 |
| Start PreParse | 43394 | 39481 |
| End PreParse | 45255 | 48531 |

The exemplary results demonstrate that capture time of the PDL input stream is shorter for the case in which the stream is spooled directly to the PDL storage section 82 than for the case in which the stream is filtered and spooled. On the other hand, the time required to preparse is greater for the case in which the stream is spooled directly to the PDL storage section 82 than for the case in which the stream is filtered and spooled. Accordingly, despite the additional time required to filter a stream, the time required to both capture and preparse the stream which is filtered and spooled can be less than the time required to both capture and preparse the stream which is spooled directly.

Referring again to FIG. 13A, it should be appreciated that, in another aspect of the disclosed embodiment, the token 256 can serve to initiate an operation other than storing N blocks of image data in the storage section 72. In other words, in the most generalized aspect of the disclosed embodiment, a token and, optionally, corresponding information can be read by the DIF 222 and used to initiate a selected operation in the printing system 21. More particularly, the token, with the optional corresponding information, can define the job, represented by the stream of image data, in that the token can serve to set up a device for a "job characteristic".

Referring again to FIGS. 11–12, the manner in which devices are set up for job characteristics is discussed in further detail. After it is determined that the token of interest is a job characteristic to be used in setting up a device (step 260), such as a font developing arrangement or a finishing arrangement, the process checks, at step 262, to determine if the job characteristic is a "font-related job characteristic".

Provided that the job characteristic is font-related, the stream utility 224 (FIG. 10) initiates a font development procedure. In one example, a known font checking procedure is used to determine if a suitable bitmap is available in a font database, the font database being disposed locally or remotely of the printing system 21 (FIG. 1). An arrangement for implementing such font checking is disclosed by U.S. patent application Ser. No. 07/898,761, U.S. Pat. No. 5,113,355 to Nomura and/or U.S. Pat. No. 5,167,013 to Hube et al., the pertinent portions of which are incorporated herein by reference. The advantage to checking for fonts with the stream utility 224 is that the printing system can indicate to the operator that a font is not available prior to the time of coalescing the job. In another example, the stream utility 224 can initiate a font rendering routine, prior to coalescing. Examples of font rendering can be found in the above-referenced text entitled *Interpress: The Source Book*.

If the job characteristic is not font-related, then the process determines, at step 266, whether the job characteristic is finishing-related, i.e. whether the job characteristic is a "finishing attribute". When the job characteristic is finishing-related, a finishing arrangement associated with the printer 26 (FIG. 1), is set up for the selected finishing attribute. An exemplary finishing arrangement, suitable for use with the printer 26, can be found in U.S. Pat. No. 5,045,881 to Kinder et al., the pertinent portions of which are incorporated herein. The finishing arrangement could be set up for the selected finishing attribute, with the stream utility 224 (FIG. 10), in a manner consistent with the scheme disclosed by U.S. Pat. No. 5,129,639 to DeHority, the pertinent portions of which are incorporated herein by reference.

If the job is a job characteristic other than a font related job characteristic or a finishing-related job characteristic (step 270), then the other job characteristic is processed at step 272. Various other job characteristics could include PDL file library references, printing instructions, etc. PDL file library references would be used to fetch remote libraries for use in decomposing. As explained in the following reference, the pertinent portions of which are incorporated by reference, a library is appended to a PDL file to provide macro definitions for various operations:

Adobe Systems Incorporated *PostScript® Language Reference Manual* Addison-Wesley Co. 1990

Additionally, the token can be used to determine job disposition. For example, the token can provide an indication regarding whether the job is going to a job file or a print queue. An exemplary job file and print queue are disclosed in U.S. Pat. No. 5,164,842 to Gauronski et al., the pertinent portions of which are incorporated herein by reference. Knowledge regarding where the job is to be directed allows for optimization of memory usage, such as optimization of cache usage.

Finally, the token can be used to initiate an operation with respect to a referenced file, the referenced file being disposed locally or remotely of the printing system 21. For example, the token can initiate the fetching of a sequence insert master.

In view of the description above, numerous features of the disclosed embodiment will be appreciated by those skilled in the art. One feature of the disclosed embodiment is to accommodate for processing compressed bitmaps captured from a network "on-the-fly". In particular, with the disclosed technique, the break entries of the compressed bitmaps can be determined and tabulated with a minimum amount of processing. Another feature of the disclosed embodiment is to generate the break entry table with a dedicated device, namely the BCC. Accordingly, once the bitmap is separated from the PDL stream, the BCC permits the bitmaps to be processed with relatively little effort. Yet another feature of the disclosed embodiment is to process bitmaps in the decomposer, or at the network input to the decomposer, for later consumption by the printer. The printing system serves as a "pipeline", and by situating the BCC away from both the imaging channels and the print engine, work is more evenly distributed across the pipeline. Such even distribution serves to facilitate printing and avoid clogging of the print engine.

APPENDIX A

PART 1: Bcc.mesa, IMBreakTableGenImpl.mesa

-- File: Bcc.mesa - last edit:
-- Kitty Sathi:WBST129:Xerox 15-May-91 15:24:55
-- Hsu:WBST129:Xerox  29-Apr-91 18:25:26
-- lauria.WBST     25-Jan-89 14:01:31

-- Copyright (C) 1988, 1991 by Xerox Corporation. All rights reserved.

```
DIRECTORY
  RTOSESCAlpha USING [aBCODESCAN],
  RTOSIGStructures USING [ImageBreakTablePtr, TiledImageBreakTablePtr],
  Mopcodes USING [zESC];

Bcc: DEFINITIONS =
  BEGIN

-- Types
  BccStatus: TYPE = MACHINE DEPENDENT RECORD [
        faultCode        (0:0..7): FaultType,
        unused0              (0:8..8): BOOLEAN,
        unused1              (0:9..9): BOOLEAN,
        unused2              (0:10..10): BOOLEAN,
        unused3              (0:11..11): BOOLEAN,
        unused4              (0:12..12): BOOLEAN,
        fault                (0:13..13): BOOLEAN,
        EOI                  (0:14..14): BOOLEAN,
        underrun         (0:15..15): BOOLEAN ];

FaultType: TYPE = MACHINE DEPENDENT {
    noError (0),
    parseError (1),           -- Not used
    invalidParameter (2),     -- Not used
    noHardware (3)};

ModeType: TYPE = MACHINE DEPENDENT {
    gho (0),
    adaptive (1) };

BccInfo: TYPE = MACHINE DEPENDENT RECORD [
        mode             (0:0..3): ModeType,
        nibbleOffset     (0:4..7): [0..3],      --Starting nibble offset
        minPbkScanlines  (0:8..15): [0..255],   --Not used
        scanlineNibbles (1): CARDINAL];                  --raw scanline length BccInputData: TYPE = RECORD [
        blockPtr: LONG POINTER,
        blockSizeInNibbles: LONG CARDINAL];

PBTEntryInfo: TYPE = RECORD [
            tableIndex: CARDINAL,             --offset into the break table, must
be updated by ucode
            nibbleLastCount: LONG CARDINAL,    --# of nibbles found since last
prediction break, used for underrun
```

```
            scanlineLastCount: CARDINAL,           --# of scanlines found since last
prediction break, used for underrun
            nibbleCountSoFar: LONG CARDINAL,--# of nibbles found since beginning
of image, must be updated by ucode
            scanlineCountSoFar: CARDINAL,          --# of scanlines found since
beginning of image, must be updated by ucode
            unparsedNibbles: LONG CARDINAL,
            is4WordTable: BOOLEAN ← FALSE,
            bccParamPtr: LONG POINTER,
            tablePtr: LONG POINTER];
       -- tableIndex is the index for next pbt entry
       -- is4WordTable changes to TRUE IM detects there will be a
       -- breakTableOverflow
       -- nibbleLastCount and scanlineLastCount should be 0 except for underrun
       -- nibbleCountSoFar is the accumulated nibbleCount
       -- scanlineCountSoFar is the accumulated scanlineCount
       -- nibbleCountSoFar's initial value for the first pbt entry should be
       -- always 0, nibbleCountSoFar is 2 when data starts at oddByte
       -- The initial value of the scanlineCountSoFar is set by IM.
       -- In case of underrun nibbleCountSoFar is the total number of nibbles
       -- processed until the last valid prediction break, i.e., it does not
       -- include the number of nibbles processed in the current prediction
break.
       --
       -- unparsedNibbles is the nibbles that need to be saved for a underrun
       -- unparsedNibbles may be cross block boundary
       -- bccParamPtr points to 16 words for Bcc uCode to store data at interrupt
    -- tablePtr is "tiled" only if the is4WordTable is TRUE PBTTypes: TYPE = {normal, tiled};

TablePtr: TYPE = RECORD[
          var: SELECT OVERLAID PBTTypes FROM
                  normal = >
                               [imageBreakTablePtr:
RTOSIGStructures.ImageBreakTablePtr],
                  tiled = > [tiledImageBreakTablePtr:

RTOSIGStructures.TiledImageBreakTablePtr],
                  ENDCASE];

-- Procedures
  BCODESCAN: PROCEDURE [inputBlock0: BccInputData, inputBlock1: BccInputData,
                     bccParameters: BccInfo,
                            pbtEntryInfoPtr: LONG POINTER TO PBTEntryInfo]
          RETURNS [status: BccStatus] =
          MACHINE CODE BEGIN Mopcodes.zESC, RTOSESCAlpha.aBCODESCAN
  END;

END.
```

```
-- File: IMBreakTableGenImpl.mesa - last edit:
-- Lillian Hsu:WBST129:Xerox 31-Jan-92 18:50:22
-- Description: Implements the break table generation for net compressed images.

-- Copyright (C) 1985, 1986, 1987, 1988, 1989, 1990, 1991, 1992 by Xerox Corporation.
All rights reserved.

DIRECTORY
  Bcc USING [BccInfo, BccInputData, BccStatus, BCODESCAN, ModeType],
  ByteBlt USING [ByteBlt],
  Environment USING [Block, bytesPerWord, Word],
  IM USING [Buffer],
  IMObject USING [Image],
  IMBreakTableGen USING [Error, FaultType, Table],
  IMLog USING [EventType, LogEvent, HandleType, ProcID],
  IMManager USING [ConvertToTiledTable, ImageHandle],
  Inline USING [DBITAND, DBITSHIFT, HighHalf, LowByte, LowHalf],
  RasterObjects USING [PixelOverhead, PixelSequence],
  ResMgr USING [Allocate],
  ResMgrHeap USING [Create, Error, FreeNode, MakeNode],
  RTOSIGStructures USING [ImageBreakTablePtr, TiledImageBreakTablePtr];

IMBreakTableGenImpl: MONITOR
  IMPORTS Bcc, ByteBlt, IMBreakTableGen, IMLog, IMManager, Inline, ResMgr,
    ResMgrHeap
  EXPORTS IMBreakTableGen =

BEGIN

-- Types

LongWord: TYPE = MACHINE DEPENDENT RECORD [
  SELECT OVERLAID * FROM
  words = > [x, y: Environment.Word],
  long = > [lc: LONG CARDINAL],
  ENDCASE];

-- Global Variables and Constants directProcessDone: BOOLEAN ← FALSE;
DirectProcessDone: CONDITION;
zone: UNCOUNTED ZONE ← NIL;

-- Signals and Errors

Error: PUBLIC ERROR [
  fault: IMBreakTableGen.FaultType] = CODE;
-- unimplemented error is checked in IMManagerImpl.SavePVInfo BreakTableOverflow: PUBLIC SIGNAL [] = CODE;

-- Procedures
```

```
-- packed seqType
BreakTableGen: PUBLIC PROCEDURE [
    imageHandle: IMManager.ImageHandle,
    table: LONG POINTER TO IMBreakTableGen.Table,
        pixelsPerScanline: CARDINAL,
        scanLines: CARDINAL,
        scansPerBreak: CARDINAL]
  RETURNS [] =
BEGIN
ENABLE UNWIND = > NULL;

longWord: LongWord;
limitScanLines: CARDINAL ← 10240;
maxNibbleCount: LONG CARDINAL = 16777215; -- FFFFFFH
scansPerBreak: CARDINAL ← 16;
savedIndex: CARDINAL ← 0;
estTableSize: CARDINAL = (scanLines + scansPerBreak - 1) /
  scansPerBreak;
pixelsPerNibble: CARDINAL = 4;
nibblesPerBreak: LONG CARDINAL =
  (LONG[scansPerBreak] * pixelsPerScanline) / pixelsPerNibble;
zero: LONG CARDINAL = 0;
overflow, overLimitScanLines: BOOLEAN ← FALSE;
tablePtr: RTOSIGStructures.ImageBreakTablePtr = LOOPHOLE[
  table.pbtEntryInfoPtr.tablePtr];

IMLog.LogEvent[BufferPointer, table, [procEntered[breakTableGen]]];

SELECT (scanLines < scansPerBreak) FROM
 TRUE = > {
  tablePtr.seq[0] __ [scanLines,
        Inline.LowByte[Inline.HighHalf[table.nextEntryNibbleCount]],
        Inline.LowHalf[table.nextEntryNibbleCount]];
  table.pbtEntryInfoPtr.tableIndex __ 0 };
 ENDCASE = > {
  SELECT (scanLines > limitScanLines) FROM
   TRUE = > {overLimitScanLines ← TRUE};
        ENDCASE = > {
          FOR i: CARDINAL IN [0..estTableSize) DO
            nibble: LONG CARDINAL ←
                table.nextEntryNibbleCount + (nibblesPerBreak * i);
            -- can not handle 17" raw image, break table overflow
            IF nibble > = maxNibbleCount THEN {
                overflow ← TRUE;
                table.pbtEntryInfoPtr.tableIndex ← i;
                EXIT };
            tablePtr.seq[i] __ [scansPerBreak,
                Inline.LowByte[Inline.HighHalf[nibble]],
                Inline.LowHalf[nibble]];
          ENDLOOP;
          IF overflow THEN { -- must use tile table
            tempTablePtr: RTOSIGStructures.TiledImageBreakTablePtr ← NIL;
            IMManager.ConvertToTiledTable[
                imageHandle: imageHandle, scanLength: pixelsPerScanline];
```

```
                    table.pbtEntryInfoPtr.is4WordTable ← TRUE;
                    tempTablePtr ← LOOPHOLE[table.pbtEntryInfoPtr.tablePtr,
                         RTOSIGStructures.TiledImageBreakTablePtr];
                    -- continue to finish the 4W PBT, xyTable is built at GetParsePBTInfo
proc.
                    FOR i: CARDINAL IN [table.pbtEntryInfoPtr.tableIndex..estTableSize) DO
                         nibble: LONG CARDINAL ←
                           table.nextEntryNibbleCount + (nibblesPerBreak * i);
                         longWord.x ← Inline.HighHalf[nibble];
                         longWord.y ← Inline.LowHalf[nibble];
                         tempTablePtr.seq[i].nibblePtr ← longWord.lc;
                         tempTablePtr.seq[i].scanLength ← pixelsPerScanline;
                         tempTablePtr.seq[i].nScanLines ← scansPerBreak;
                         ENDLOOP;
                    IF (scanLines MOD scansPerBreak) # 0 THEN
                         tempTablePtr.seq[estTableSize - 1].nScanLines ←
                           scanLines MOD scansPerBreak;
                    } -- overflow case
                    ELSE -- for the normal case, last entry update
                    IF (scanLines MOD scansPerBreak) # 0 THEN
                         tablePtr.seq[
                           estTableSize - 1].scanCount ← scanLines MOD scansPerBreak;
                    table.pbtEntryInfoPtr.tableIndex _ estTableSize - 1 } };
IF overLimitScanLines THEN
  SIGNAL BreakTableOverflow;
IMLog.LogEvent[BufferPointer, table, [procExited[breakTableGen]]];

END; -- of BreakTableGen

NotifyDirectProcessDone: PUBLIC ENTRY PROCEDURE []
  RETURNS [] =
BEGIN
directProcessDone ← TRUE;
NOTIFY DirectProcessDone;
END;

WaitDirectProcessDone: ENTRY PROCEDURE []
  RETURNS [] =
BEGIN
WHILE ~directProcessDone DO
  WAIT DirectProcessDone;
ENDLOOP
END;

-- for compressed or adaptive pixelSequence
GatherPBTDataFromBcc: PUBLIC PROCEDURE [
 imageHandle: IMManager.ImageHandle,
 buffer0: IM.Buffer,
 buffer1: IM.Buffer,
 pixelEncodingOffset: LONG CARDINAL,
 pixelSequenceType: RasterObjects.PixelSequence,
 pixelV0ThroughV3: RasterObjects.PixelOverhead,
```

```
    priorScansPerBreak: CARDINAL,
    table: LONG POINTER TO IMBreakTableGen.Table,
    firstCall: BOOLEAN,
    needScansPerBreak: BOOLEAN]
    RETURNS [holdThisBuffer: IM.Buffer,
     eoi: BOOLEAN,
     bccFault: IMBreakTableGen.FaultType] =
    BEGIN
    saveBuffer: IM.Buffer ←
     LOOPHOLE[imageHandle, LONG POINTER TO IMObject.Image].pbtBuffer;
    BEGIN
    ENABLE UNWIND = > { IF saveBuffer.pointer # NIL THEN
      ResMgrHeap.FreeNode[z: zone, p: saveBuffer.pointer];
      saveBuffer.pointer ← NIL };
    allocWords: CARDINAL ← 0;
    bccInfo: Bcc.BccInfo;
    bccStatus: Bcc.BccStatus ←
     [noError, FALSE, FALSE, FALSE, FALSE, FALSE, FALSE, FALSE];
    block0: Bcc.BccInputData ← [NIL,0];
    block1: Bcc.BccInputData ← [NIL,0];
    modeType: Bcc.ModeType;
    limitScanLines: CARDINAL ← 10240;
    limitForAllocWords: CARDINAL ← 700;
    overLimitScanLines: BOOLEAN ← FALSE;
    -- microCode needs something - default.
    minPbkScanlines: CARDINAL ← 16;
    nibbleCount: LONG CARDINAL ← 0;
    nibblesPerByte: CARDINAL ← 2;
    nibblesPerWord: CARDINAL ← 4;
    scanlineNibbles: CARDINAL ← 0;
    scanLineCount: CARDINAL ← 0;
    handle: LONG POINTER ← LOOPHOLE[imageHandle, LONG POINTER];

MakeBlockFromBuffer: PROCEDURE [buffer: IM.Buffer]
     RETURNS [block0: Bcc.BccInputData] = INLINE
    BEGIN
    block0 ← [blockPtr: buffer.pointer,
      blockSizeInNibbles: buffer.lengthInBytes * 2];
    RETURN[block0];
    END; -- MakeBlockFromBuffer CheckAndConvertToTiledTable: PROCEDURE [] RETURNS [] =
     BEGIN
     maxNibbleCount: LONG CARDINAL = 16777215; -- FFFFFFH
     IF table.pbtEntryInfoPtr.scanlineCountSoFar > limitScanLines THEN {
       overLimitScanLines ← TRUE;
       SIGNAL BreakTableOverflow };
     IF (table.pbtEntryInfoPtr.nibbleCountSoFar + block0.blockSizeInNibbles +
       block1.blockSizeInNibbles) > = maxNibbleCount THEN { -- BreakTableOverflow
       -- Allocate a 4W pbt table and convert 2W to 4W table
       IMManager.ConvertToTiledTable[imageHandle: imageHandle,
         scanLength: (scanlineNibbles * 4) ];
       table.pbtEntryInfoPtr.is4WordTable ← TRUE;
       };
```

END; -- CheckAndConvertToTiledTable

```
SaveBlocks: PROCEDURE [
    block0: Bcc.BccInputData,
    block1: Bcc.BccInputData]
RETURNS [] =
BEGIN
  remainder: CARDINAL ← 0;
  buffer0, buffer1: Environment.Block ← [NIL,0,0];
  allocWords: LONG CARDINAL ← Inline.DBITSHIFT
    [table.pbtEntryInfoPtr.unparsedNibbles, -2];

buffer0.blockPointer ← block0.blockPtr;
  buffer0.stopIndexPlusOne ← CARDINAL[(table.pbtEntryInfoPtr.unparsedNibbles -
    block1.blockSizeInNibbles) / nibblesPerByte];
  IF buffer0.stopIndexPlusOne MOD Environment.bytesPerWord # 0 THEN {
    buffer0.startIndex ← 1;
         buffer0.stopIndexPlusOne ← buffer0.stopIndexPlusOne + 1 }
  ELSE buffer0.startIndex ← 0;
  buffer1 ← [block1.blockPtr, CARDINAL[(block1.blockSizeInNibbles /
nibblesPerByte)],
         CARDINAL[(block1.blockSizeInNibbles / nibblesPerByte)]];

IF allocWords < = 0 THEN allocWords ← 1;
  remainder ← CARDINAL[Inline.DBITAND[
    table.pbtEntryInfoPtr.unparsedNibbles, (nibblesPerWord - 1)]];
  IF remainder # 0 THEN allocWords ← allocWords + 1;
  IF allocWords > limitForAllocWords
    THEN ERROR IMBreakTableGen.Error[bccParseError];
  saveBuffer.pointer ← ResMgrHeap.MakeNode[z: zone,
         n: CARDINAL[allocWords]];
  saveBuffer.bufferSizeInBytes ← allocWords * Environment.bytesPerWord;
  saveBuffer.lengthInBytes ← saveBuffer.bufferSizeInBytes;
  [] ← ByteBlt.ByteBlt[
         from: [LOOPHOLE[buffer0.blockPointer],
           buffer0.startIndex, CARDINAL[buffer0.stopIndexPlusOne]],
         to: [LOOPHOLE[saveBuffer.pointer],
           0, CARDINAL[buffer0.stopIndexPlusOne - buffer0.startIndex]],
         overLap: move];
  [] ← ByteBlt.ByteBlt[
         from: [LOOPHOLE[buffer1.blockPointer],
           0, CARDINAL[buffer1.stopIndexPlusOne]],
         to: [LOOPHOLE[saveBuffer.pointer],
           CARDINAL[buffer0.stopIndexPlusOne - buffer0.startIndex],
           CARDINAL[buffer1.stopIndexPlusOne]],
         overLap: move];
  -- in two buffer case, the buffer0 should be the previous saveBuffer
  ResMgrHeap.FreeNode[z: zone, p: buffer0.blockPointer];
  buffer0.blockPointer ← NIL;
END; -- SaveBlocks SaveBlockAndBccInfo: PROCEDURE [block: Bcc.BccInputData, inBuffer: IM.Buffer]
RETURNS [] =
BEGIN
```

```
tempBlock: Bcc.BccInputData ← [NIL,0];
tempBuffer: IM.Buffer ← [NIL,0,0];
allocWords, usedNibbles, saveNibbles: LONG CARDINAL ← 0;

IF table.pbtEntryInfoPtr.unparsedNibbles = 0 THEN {
  table.nibbleOffset ← 0;
  saveBuffer ← [NIL,0,0] }
ELSE {
  usedNibbles ← block.blockSizeInNibbles - table.pbtEntryInfoPtr.unparsedNibbles;
  -- tempBlock.blockPtr ← block.blockPtr + (usedNibbles / nibblesPerWord);
  tempBlock.blockPtr ← block.blockPtr + Inline.DBITSHIFT[usedNibbles, -2];
  -- table.nibbleOffset ← CARDINAL[usedNibbles MOD nibblesPerWord];
  table.nibbleOffset ← CARDINAL[
    Inline.DBITAND[usedNibbles, (nibblesPerWord - 1)]];

saveNibbles ← table.nibbleOffset + table.pbtEntryInfoPtr.unparsedNibbles;
  allocWords ← Inline.DBITSHIFT[saveNibbles, -2];
  IF Inline.DBITAND[saveNibbles, (nibblesPerWord - 1)] # 0 THEN
    allocWords ← allocWords + 1;
  IF allocWords < = 0 THEN allocWords ← 1;

IF inBuffer.pointer # NIL THEN {
    ResMgrHeap.FreeNode[z: zone, p: inBuffer.pointer];
      inBuffer.pointer ← NIL };
  IF allocWords > limitForAllocWords THEN
    ERROR IMBreakTableGen.Error[bccParseError];
  saveBuffer.pointer ← ResMgrHeap.MakeNode[z: zone,
      n: CARDINAL[allocWords]];
  saveBuffer.bufferSizeInBytes ← allocWords * Environment.bytesPerWord;
  saveBuffer.lengthInBytes ← saveNibbles / nibblesPerByte;
  IF saveNibbles MOD nibblesPerByte # 0 THEN
    saveBuffer.lengthInBytes ← saveBuffer.lengthInBytes + 1;
  [] ← ByteBlt.ByteBlt[
        from: [LOOPHOLE[tempBlock.blockPtr],
          0, CARDINAL[saveBuffer.bufferSizeInBytes]],
        to: [LOOPHOLE[saveBuffer.pointer],
          0, CARDINAL[saveBuffer.bufferSizeInBytes]],
        overLap: move] }
END; -- SaveBlockAndBccInfo IMLog.LogEvent[ImageHandle, handle,[procEntered[gatherPBTDataFromBcc]]];
bccFault ← noError;
holdThisBuffer ← [NIL,0,0];
eoi ← FALSE;

-- only handles thses two types
IF pixelSequenceType = adaptive THEN
  modeType ← adaptive
ELSE modeType ← gho;

WITH vec: pixelV0ThroughV3 SELECT
  pixelSequenceType FROM
    adaptive = >
          scanlineNibbles ← vec.scanLength / 4; -- v[2]
```

```
    compressed = >
        scanlineNibbles ← vec.scanLength / 4; -- v[2]
    ENDCASE = > ERROR;
bccInfo ← [
  LOOPHOLE[modeType], LOOPHOLE[table.nibbleOffset],
  LOOPHOLE[minPbkScanlines], scanlineNibbles];

WaitDirectProcessDone[];

IF firstCall THEN {
  maxNibbleCount: LONG CARDINAL = 16777215; -- FFFFFFH
  block0 ← MakeBlockFromBuffer[buffer: buffer0];
  block1 ← [NIL,0];
  IF block0.blockSizeInNibbles > = maxNibbleCount THEN
    table.pbtEntryInfoPtr.is4WordTable ← TRUE;
  bccStatus ← Bcc.BCODESCAN[
    inputBlock0: block0, inputBlock1: block1,
    bccParameters: bccInfo, pbtEntryInfoPtr: table.pbtEntryInfoPtr];
  firstCall ← FALSE }
ELSE {
  block0 ← MakeBlockFromBuffer[buffer: buffer0];
  block1 ← MakeBlockFromBuffer[buffer: buffer1];
  -- check table overflow
  IF ~(table.pbtEntryInfoPtr.is4WordTable) THEN
    CheckAndConvertToTiledTable[! BreakTableOverflow = > bccStatus.EOI ←
TRUE];
  -- check scanlineLastCount
  -- removed the code since Bcc now wants 16 all the time
  « IF table.pbtEntryInfoPtr.scanlineLastCount > = 16 THEN
    bccInfo.minPbkScanlines ← 1
  ELSE
    bccInfo.minPbkScanlines ← LOOPHOLE[
         minPbkScanlines - table.pbtEntryInfoPtr.scanlineLastCount]; »
  bccStatus ← Bcc.BCODESCAN[
    inputBlock0: block0, inputBlock1: block1,
    bccParameters: bccInfo, pbtEntryInfoPtr: table.pbtEntryInfoPtr];
  }; -- IF firstCall ELSE SELECT TRUE FROM
  bccStatus.fault = > {
    IMLog.LogEvent[ImageHandle, handle,[stepEntered[bccFault]]];
    SELECT bccStatus.faultCode FROM
      invalidParameter = > bccFault ← invalidBccParam;
      noHardware = > bccFault ← noBccHardware;
      parseError = > bccFault ← bccParseError;
            ENDCASE;
    eoi ← FALSE;
    directProcessDone ← FALSE;
    IMLog.LogEvent[ImageHandle, handle,[stepExited[bccFault]]];
    };
  bccStatus.EOI = > {
    IMLog.LogEvent[ImageHandle, handle,[stepEntered[bccEOI]]];
    IF saveBuffer.pointer # NIL THEN {
      ResMgrHeap.FreeNode[z: zone, p: saveBuffer.pointer];
```

```
            saveBuffer.pointer ← NIL };
         holdThisBuffer ← [NIL,0,0];
         directProcessDone ← FALSE;
   IF table.pbtEntryInfoPtr.scanlineCountSoFar > limitScanLines THEN
      overLimitScanLines ← TRUE;
   SELECT overLimitScanLines FROM
      TRUE = > {
            eoi ← FALSE;
            bccFault ← breakTableOverflow };
      ENDCASE = > {
            table.pbtEntryInfoPtr.tableIndex ← table.pbtEntryInfoPtr.tableIndex - 1;
            eoi ← TRUE };
      IMLog.LogEvent[ImageHandle, handle,[stepExited[bccEOI]]];
      };
   bccStatus.underrun = > {
      IMLog.LogEvent[ImageHandle, handle,[stepEntered[bccUnderrun]]];
      directProcessDone ← FALSE;
      IF block1.blockPtr # NIL THEN {
            IF table.pbtEntryInfoPtr.unparsedNibbles > block1.blockSizeInNibbles
THEN
               -- no scanline found in both blocks when process block0 and block1
               SaveBlocks[block0: block0, block1: block1 !
                              ResMgrHeap.Error = > {
                                 bccFault ← noMemSpace;
                                 GOTO exit };
                              IMBreakTableGen.Error = > {
                                 bccFault ← fault;
                                 GOTO exit } ]
         ELSE -- only block1 has some unparsedNibbles
            SaveBlockAndBccInfo[block: block1, inBuffer: saveBuffer !
                              ResMgrHeap.Error = > {
                                 bccFault ← noMemSpace;
                                 GOTO exit };
                              IMBreakTableGen.Error = > {
                                 bccFault ← fault;
                                 GOTO exit } ] }
      ELSE -- no block1, there are some leftover nibbles from block0
         SaveBlockAndBccInfo[block: block0, inBuffer: saveBuffer !
                        ResMgrHeap.Error = > {
                           bccFault ← noMemSpace;
                           GOTO exit };
                              IMBreakTableGen.Error = > {
                                 bccFault ← fault;
                                 GOTO exit } ];
      GOTO exit;
      EXITS
         exit = > {
               -- get next new block
               holdThisBuffer ← saveBuffer;
               eoi ← FALSE;
               IMLog.LogEvent[ImageHandle, handle,[stepExited[bccUnderrun]]] };
      };
   ENDCASE;
   IMLog.LogEvent[ImageHandle, handle,[procExited[gatherPBTDataFromBcc]]];
```

```
END; -- of ENABLE
END; -- of GatherPBTDataFromBcc

FreeSaveBuffer: PUBLIC PROCEDURE[saveBuffer: IM.Buffer] = {
 ResMgrHeap.FreeNode[z: zone, p: saveBuffer.pointer];
 saveBuffer.pointer ← NIL;
 saveBuffer.bufferSizeInBytes ← saveBuffer.lengthInBytes ← 0;
};
-- MAINLINE CODE:

zone ← ResMgrHeap.Create[
  bl: ResMgr.Allocate[id: [background, imageInstall], Pages: 3,
    base: NIL, waitTillAvailable: TRUE],
  heapFull: NIL, maxSize: 3, incrementSize: 0];

END...
```

PART 2: bccdefs.ms, Bcc.ms

% File: bccdefs.ms - last edit:
% Berger.WBST    16-Mar-89 16:02:40
% Definition file for Boundary Code Catcher (BCC) driver code % Copyright (C) 1989 by Xerox Corporation. All rights reserved.
!
        Note: initial stack frame is:
            tos -> ptrHi
                ptrLo
                bccParametersHi
                bccParametersLo
                block1SizeInNibblesHi
                block1SizeInNibblesLo
                block1PtrHi
                block1PtrLo
                block0SizeInNibblesHi
                block0SizeInNibblesLo
                block0PtrHi
                block0PtrLo Returned Stack Frame is:
            tos -> bccStatus Note that the stack pointer is adjusted to its final position
        on entry to RunBcc. Thus, the stack pointer points to
        block0SizeInNibblesHi when the data is removed from the stack.
!

define

```
               % Variables passed in: (See bcc.mesa)
    infoPtrHi                = "tosP4",
    infoPtrLo                = "tosP3",
    scanLineNibbles          = "tosP2",
    bccParameters            = "tosP1",
    block1SizeInNibblesHi    = "tos",
    block1SizeInNibblesLo    = "tosM1",
    block1PtrHi              = "tosM2",
    block1PtrLo              = "tosM3",
    block0SizeInNibblesHi    = "tosM4",
    block0SizeInNibblesLo    = "tosM5",
    block0PtrHi              = "tosM6",
    block0PtrLo              = "tosM7", % Variables returned: (See Bcc.Mesa)
    bccStatus                = "tosP8", % Internal variables nibbleCountHi            = "tosP5",
    nibbleCountLo            = "tosP6",
    scanLineCount            = "tosP7",
```

```
            currentWord              = "r0",    % Word being examined by the
BCC.
            bccStatusImage           = "r1",    % Copy of the Bcc status
register.
            bccType                  = "r2",    % XX1X if operating in buf 1,
0XXX if in buf 0.
                                                % XXX1 if 4 word table, XXX0
if not
            tableIndex               = "r3",
            temp                     = "r4",
            totalBlockLenLo          = "r5",    % Total size of the buffers
examined so far
            totalBlockLenHi          = "r6",    %  in nibbbles.
            nibblesLeftLo            = "r7",    % Nibbles left in the current
buffer.
            nibblesLeftHi            = "r8",
            newNibblePtrLo           = "r9",    % Pointer to start of a new line
after a RAW
            newNibblePtrHi           = "r10",   % line.
            newBlockSizeLo           = "r9",
            newBlockSizeHi           = "r10",
            usedBlockSizeLo          = "r11",
            usedBlockSizeHi          = "r12",
            newWordPtrLo             = "r11",   % Address of first word in the
new line
            newWordPtrHi             = "r12",
            nibbleOffset             = "r13",   % Starting nibble Offset from
Mesa
            tablePtrHi               = "r14",
            tablePtrLo               = "r15",
            scanlineCountSoFar       = "r16",
            nibbleCountThisBreakHi   = "r17",
            nibbleCountThisBreakLo   = "r18",
            unparsedNibbleCountHi    = "r17",
            unparsedNibbleCountLo    = "r18",
            tableNibbleCountHi       = "r19",
            tableNibbleCountLo       = "r20",
            blockNibbleOffset        = "tosP8";

% Constants:
constant
            Block1Flag               = 10H,
            Is4WordTableFlag  = 1H,
            BccCmdReg                = 10H,     % Address of the Bcc Command
Register
            BccDataReg               = 400H,    % Address of the Bcc Data
Register
            BccStatusReg             = 14H,     % Address of the Bcc Status
Register
            FaultStatusRegister = 6H,           % Cache Fault Status Register
```

```
            InputStreamStatusRegister = 15H,    % Cache Stream Fault Status
Register
            InputStreamDestroy          = 14H,    % Stream Destroy Register
            InputStreamRegister0        = 10H,    % Stream start address lo
            InputStreamRegister3        = 13H,    % Stream start address hi
            PtrMask                     = 0FFH,   % Mask off hi byte of hi address
word
            StreamInput                 = 80H,    % Stream input register
            ValidPbkFlag                = 08H,    % bccStatus flag indicating valid
Pred Break
            EOIFlag                     = 02H,    % bccStatus flag indicating EOI
            SOI                         = 70H,    % SOI bit pattern
            SOIFlag                     = 04H,    % bccStatus flag indicating SOI
            NoBccFlag                   = 310H,   % bccStatus flag indicating no
Bcc hardware
            UnderRunFlag                = 01H;    % bccStatus flag indicating an
under-run
```

```
% File: bcc.ms - last edit:
% Sathi:WBST129    15-Dec-90 13:35:42
% Berger.WBST      1-Feb-90 17:43:31
% Lauria.WBST      14-Aug-89 17:20:30
% Boundary Code Catcher (BCC) driver code % Copyright (C) 1989, 1990 by Xerox Corporation. All rights reserved.

@opBCC, goto RunBcc;
RunBcc:
        stackPtr ← 8;
        output (zero, BccCmdReg) ← zero;        % Initialize the BCC
                                                % Check to see if the
BCC is
                                                % attatched to this
channel.
                                                % First input has a
prediction
                                                % break.
        output (zero, BccDataReg) ← zero;
        noOp;
        noOp;
        if test then goto * + 2;
        goto NoBcc;

output (zero, BccCmdReg) ← zero;        % This input does not have a
        output (zero, BccDataReg) ← ones;       % prediction break.
        noOp;
        noOp;
        if test then goto NoBcc;

% If we made it this far, we can assume that the BCC exists and works,
% so start feeding the BCC nibbleOffset ← loadField (bccParameters, 4:4);  % Get the nibble offset
        blockNibbleOffset ← nibbleOffset;
        nil ← block0SizeInNibblesLo or block0SizeInNibblesHi;
        bccType ← 0,
                if z then goto StartBuf1;                       % Block 0 has
0 length % Initialize the Stream Registers to read block 0

%       nil ← cacheInput (zero, FaultStatusRegister);
        nil ← cacheInput (zero, InputStreamStatusRegister);
        cacheOutput (zero, InputStreamRegister0) ← block0PtrLo;
        temp ← block0PtrHi and PtrMask;
        cacheOutput (zero, InputStreamRegister3) ← temp;
        nibblesLeftLo ← block0SizeInNibblesLo;
        nibblesLeftHi ← block0SizeInNibblesHi,
                goto PrepareFirstWord;

StartBuf1:
```

```
                    % Start up with buffer 1 if buffer 0 is empty
            bccType ← Block1Flag;
%           nil ← cacheInput (zero, FaultStatusRegister);
            nil ← cacheInput (zero, InputStreamStatusRegister);
            cacheOutput (zero, InputStreamRegister0) ← block1PtrLo;
            temp ← block1PtrHi and PtrMask;
            cacheOutput (zero, InputStreamRegister3) ← temp;
            nibblesLeftLo ← block1SizeInNibblesLo;
            nibblesLeftHi ← block1SizeInNibblesHi;

PrepareFirstWord:
            tableIndex ← read (infoPtrHi, infoPtrLo);        % tableIndex
(passed back)
            nibbleCountThisBreakLo ← read (savedAddressP1);   %
nibbleLastCountLo (passed in for use in current line)
            nibbleCountThisBreakHi ← read (savedAddressP1);   %
nibbleLastCountHi (passed in for use in current line)
            scanLineCount ← read (savedAddressP1);            %
scanlineLastCount (passed in for use in current line)
            tableNibbleCountLo ← read (savedAddressP1);       % nibbleCountSoFarLo
            tableNibbleCountHi ← read (savedAddressP1);       % nibbleCountSoFarHi
            scanlineCountSoFar ← read (savedAddressP1);       % scanlineCountSoFar
            temp ← read (savedAddressP1);                     %
unparsedNibbleCountLo (current nibble count passed back due to underrun)
            temp ← read (savedAddressP1);                     %
unparsedNibbleCountHi (current nibble count passed back due to underrun)
            temp ← read (savedAddressP1);                     %
is4WordTable     (unused at this time)
%           temp ← temp and Is4WordTableFlag;
            bccType ← bccType or temp;
            temp ← read (savedAddressP1);                     %
bccParamPtrLo    (unused at this time)
            temp ← read (savedAddressP1);                     %
bccParamPtrHi    (unused at this time)
            tablePtrLo ← read (savedAddressP1);               % tablePtrLo
            tablePtrHi ← read (savedAddressP1);               % tablePtrHi tableIndex ← shiftField (tableIndex, 1);  % mult by 2 for # of words
instead of # of table entries.
            nil ← bccType and Is4WordTableFlag;
            if z then goto TableIndexCont;
            tableIndex ← shiftField (tableIndex, 1);  % mult by 2 again for # of words
instead of # of table entries.

TableIndexCont:
            tablePtrLo ← tablePtrLo + tableIndex;
            tablePtrHi ← tablePtrHi + carry;

nibbleCountThisBreakLo ← zero - nibbleCountThisBreakLo;
            nibbleCountThisBreakHi ← zero - nibbleCountThisBreakHi - borrow;
            nibbleCountLo ← 4H;
            nibbleCountHi ← 0H;     % initializes the nibble count to one word totalBlockLenLo ← nibblesLeftLo;
```

```
        totalBlockLenHi ← nibblesLeftHi;

% Handle the special case of the first word:
        % First, look to see if it contains an SOI:

currentWord ← cacheInput (zero, StreamInput);
        nil ← nibbleOffset xor zero;          % SOI allowed only in position 0
or 2
        nil __ nibbleOffset xor 02H,
            ¯    if eq then goto CheckFirstSOI;
        if ne then goto InitBcc;
        temp __ loadField (currentWord, 8:8);

nil ← temp - SOI;
        if ne then goto InitBcc;
%       bccStatus ← bccStatus or SOIFlag;     % SOI found
        tableNibbleCountLo ← tableNibbleCountLo + 2;
        nibbleCountThisBreakLo ← tableNibbleCountLo;
        nibbleOffset ← 0;
        blockNibbleOffset ← nibbleOffset;                       % Point to
the nibble of interest
        nibblesLeftLo ← nibblesLeftLo - 4;
        nibblesLeftHi ← nibblesLeftHi - borrow;
        nil ← nibblesLeftLo or nibblesLeftHi;  % check to see if block was only 1
word long
        if z then goto UnderRun;
        output (zero, BccCmdReg) ← nibbleOffset;  % Initialize the BCC with
        scanLineCount ← scanLineCount -1, goto ProcessBlock;
% the starting nibble position CheckFirstSOI:
        temp ← loadField (currentWord, 0:8);
CheckSOI:
        nil ← temp - SOI;
        if ne then goto InitBcc;
%       bccStatus ← bccStatus or SOIFlag;         % SOI found
        nibbleOffset ← nibbleOffset + 2;          % Point to the nibble of interest
        blockNibbleOffset ← nibbleOffset;
        tableNibbleCountLo ← tableNibbleCountLo + 2;
%       nibbleCountThisBreakLo ← tableNibbleCountLo;

InitBcc:
        output (zero, BccCmdReg) ← nibbleOffset;  % Initialize the BCC with
        scanLineCount ← scanLineCount -1, goto BCCFeed;
            % the starting nibble position % Main processing code. General scheme is to keep on sending data to
the
        % bcc until it finds a line break. Then the break is checked to see if it
        % qualifies as a Prediction Break.

ProcessBlock:
        currentWord ← cacheInput (zero, StreamInput);
```

```
BCCFeed:
        output (zero, BccDataReg) ← currentWord;
        noOp;                                           % Wait at least 3 alu ops
        nibblesLeftLo ← nibblesLeftLo - 4;     % for the bcc
   freezeFlags;
        nibblesLeftHi ← nibblesLeftHi - borrow,
                if test then goto CheckBoundaryCode;  % Check if Bcc found a break
        nil ← nibblesLeftLo or nibblesLeftHi,
                if mi then goto NewBuf;                 % loop until nibblesLeft < = 0
        if nz then goto ProcessBlock;

% The following code handles the switching between buffer 0 and 1
NewBuf:
        cacheOutput (zero, InputStreamDestroy) ← zero;

% Check to see which buffer is currently being used
        nil ← bccType and Block1Flag;
        if nz then goto UnderRun;                       % If its buffer1, we're done
                                                        % Otherwise, switch to buffer 1

% Check to see if buffer 1 has 0 length.
        nil ← block1SizeInNibblesLo or block1SizeInNibblesHi;
        nibblesLeftLo ← block1SizeInNibblesLo,
                if z then goto UnderRun;
        nibblesLeftHi ← block1SizeInNibblesHi;

% Set the stream up for buffer 1
%       nil ← cacheInput (zero, FaultStatusRegister);
        nil ← cacheInput (zero, InputStreamStatusRegister);
        cacheOutput (zero, InputStreamRegister0) ← block1PtrLo;
        temp ← block1PtrHi and PtrMask;
        cacheOutput (zero, InputStreamRegister3) ← temp;

% Update counters
        totalBlockLenLo ← totalBlockLenLo + block1SizeInNibblesLo;
        totalBlockLenHi ← totalBlockLenHi + block1SizeInNibblesHi + carry;
        bccType ← bccType or Block1Flag,
                goto ProcessBlock;                      % Start sending data to the bcc % There is a line break of some type, check it out:
CheckBoundaryCode:
        % Read the LCC and nibble count
        bccStatusImage ← input (zero, BccStatusReg);

% Set the nibble pointers up:
        nibbleCountLo ← totalBlockLenLo - nibblesLeftLo;
        nibbleCountHi ← totalBlockLenHi - nibblesLeftHi - borrow;
        temp ← loadField (bccStatusImage, 14:2) - nibbleOffset;    % Get the nibble offset
```

```
        % If the line break is in the third nibble, it is the third nibble
        % of the PREVIOUS word.
        nil ← maskField (bccStatusImage, 14:2) - 03H;
        if eq then goto BreakInPrevWord;
        temp ← temp - 4,    % Count is 1 word ahead
                    goto * + 2;
BreakInPrevWord:
        temp ← temp - 8;              % nibble 3 of the previous word
        nibbleCountLo ← nibbleCountLo + temp;
        nibbleCountHi ← nibbleCountHi + ones + carry;  % temp is a negative
number % Now, check to see if we found an EOI
        nil ← bccStatusImage and 10H;
        if z then goto EOI;

scanLineCount ← scanLineCount + 1;

% Check to see if we have found more than minPbkScanLines scan lines nil ← loadField (bccParameters, 8:8) - scanLineCount;
        if gt then goto AdvanceLine;           % If not, continue processing nil ← bccParameters and 1000H;                  % Set up flags to
determine the mode
        if nz then goto Adaptive;

% We are in gho mode, check line condition codes for this mode to see if
we
        % have a valid Prediction Break
        % 01 is the only invalid mode
        nil ← loadField (bccStatusImage, 12:2) - 01H;
        if z then goto AdvanceLine;
%       bccStatus ← bccStatus or ValidPbkFlag;
                call WriteBreakTable;
                goto CheckInterrupt;

% Adaptive Mode
Adaptive:
        nil ← maskField (bccStatusImage, 13:1);
        if nz then goto AdvanceLine;
%       bccStatus ← bccStatus or ValidPbkFlag;
                call WriteBreakTable;
                goto CheckInterrupt;

ReFeed:
        % Restarts the bcc at the correct word and nibble position.
        % if at nibble position 2, we will be restarting in the next word.
        % nibble positions 0, 1, and 3 start in the current word. ( 3 starts
        % in the current word because the 3 refers to the previous word)
        nil ← maskField (bccStatusImage, 14:2) - 2;
        if ne then goto restartThisWord;
```

```
        output (zero, BccCmdReg) ← zero;
        nil ← nibblesLeftHi;
        nil ← nibblesLeftHi or nibblesLeftLo,
                 if mi then goto NewBuf;
        if z then goto NewBuf;
        goto ProcessBlock;

restartThisWord:
        temp ← maskField (bccStatusImage, 14:2) + 2;
        temp ← temp and 3;
        output (zero, BccCmdReg) ← temp;
        nibblesLeftLo ← nibblesLeftLo + 4;              % Fix up the counter
        nibblesLeftHi ← nibblesLeftHi + carry;
        goto BCCFeed;

AdvanceLine:
        % Check to see if the line code is RAW. If so, we need to skip over
        % this line. Otherwise, the bcc is restarted where it left off.

nil ← loadField (bccStatusImage, 12:2);
        temp ← scanLineNibbles + 2,                     % Compensate for line code
                 if nz then goto ReFeed;                % Look for RAW line temp ← temp + nibbleOffset;
                 % Compute the new index into the buffers in nibbles
        newNibblePtrLo ← nibbleCountLo + temp;
        newNibblePtrHi ← nibbleCountHi + carry;
                 % Check to see which buffer we are in now
        nil ← bccType and Block1Flag;
        if nz then goto AdvanceB1;

% We are in buffer 0, check to see if the new position is within
                 % this buffer.
        temp    maskField (newNibblePtrLo, 0:14);       % Truncate off the lower 2 bits
        nibblesLeftLo ← totalBlockLenLo - temp;
        nibblesLeftHi ← totalBlockLenHi - newNibblePtrHi - borrow;
        nil ← nibblesLeftLo or nibblesLeftHi,
                 if mi then goto AdvanceToBuf1;         % New pos is not in this buffer
        if z then goto AdvanceToBuf1;

% If we made it this far, we are in buffer 0 and the end of the
        % line is within this buffer. So, restart the stream at the
        % correct place, and reset the nibblesLeft counter
        cacheOutput (zero, InputStreamDestroy) ← zero;
        nil ← cacheInput (zero, InputStreamStatusRegister);

% The newWordPtr is the new starting address
        temp ← loadField (newNibblePtrLo, 0:14);
        newWordPtrLo ← shiftField (newNibblePtrHi, 14) or temp;
        newWordPtrLo ← newWordPtrLo + block0PtrLo;
```

```
            newWordPtrHi ← loadField (newNibblePtrHi, 0:14) + block0PtrHi +
carry;
            cacheOutput (zero, InputStreamRegister0) ← newWordPtrLo;
            temp ← newWordPtrHi and PtrMask;    % Calculate number of nibbles
into the word and set up
            cacheOutput (zero, InputStreamRegister3) ← temp;
                    % the bcc.
            temp ← loadField (newNibblePtrLo, 14:2);
            output (zero, BccCmdReg) ← temp;
            goto ProcessBlock;

AdvanceB1:
            % We are all ready in buffer1. Hopefully, the end of the line is within
            % this buffer. If not, we have an underrun.
            temp    maskField (newNibblePtrLo, 0:14);                    % Truncate
off the lower 2 bits
            nibblesLeftLo ← totalBlockLenLo - temp;
            nibblesLeftHi ← totalBlockLenHi - newNibblePtrHi - borrow;
            nil ← nibblesLeftLo or nibblesLeftHi,
                    if mi then goto UnderRun;
            if z then goto UnderRun;

% we are in buffer 1 and the end of the line is within this buffer
            % So, compute a new starting position and restart the stream.
            cacheOutput (zero, InputStreamDestroy) ← zero;
            nil ← cacheInput (zero, InputStreamStatusRegister);

% Compute distance into buffer 1
            newNibblePtrLo ← newNibblePtrLo - block0SizeInNibblesLo;
            newNibblePtrHi ← newNibblePtrHi - block0SizeInNibblesHi - borrow;

% Compute starting address
            temp ← loadField (newNibblePtrLo, 0:14);
            newWordPtrLo ← shiftField (newNibblePtrHi, 14) or temp;
            newWordPtrLo ← newWordPtrLo + block1PtrLo;
            newWordPtrHi ← loadField (newNibblePtrHi, 0:14) + block1PtrHi +
carry;
            cacheOutput (zero, InputStreamRegister0) ← newWordPtrLo;
            temp ← newWordPtrHi and PtrMask;    % Calculate number of nibbles
into the word and set up
            cacheOutput (zero, InputStreamRegister3) ← temp;
                    % Calculate number of nibbles into the word and set up
                    % the bcc.
            temp ← loadField (newNibblePtrLo, 14:2);
            output (zero, BccCmdReg) ← temp;
            goto ProcessBlock;

AdvanceToBuf1:
            % RAW line stretches across the two buffers. So, switch to buffer 1
            % and proceed with the restart code for buffer 1.

nil ← block1SizeInNibblesLo or block1SizeInNibblesHi;
            bccType ← bccType or Block1Flag,
```

```
                    if z then goto UnderRun;           % Check to see if buffer
1 has 0 length.
            totalBlockLenLo ← totalBlockLenLo + block1SizeInNibblesLo;
            totalBlockLenHi ← totalBlockLenHi + block1SizeInNibblesHi + carry,
                    goto AdvanceB1;

% End of Image
EOI:        scanLineCount ← scanLineCount + 1;
            call WriteBreakTable;
            call PrepareToReturn;

bccStatus ← EOIFlag,
                    goto bccDone;

UnderRun:
            nibbleCountThisBreakLo ← nibbleCountLo - nibbleCountThisBreakLo;
            nibbleCountThisBreakHi ← nibbleCountHi - nibbleCountThisBreakHi -
borrow;

call PrepareToReturn;

unparsedNibbleCountLo ← totalBlockLenLo - nibbleCountLo;
            unparsedNibbleCountHi ← totalBlockLenHi - nibbleCountHi - borrow;

unparsedNibbleCountLo ← unparsedNibbleCountLo - blockNibbleOffset;
            unparsedNibbleCountHi ← unparsedNibbleCountHi - borrow;
            write (savedAddressP1) ← unparsedNibbleCountLo;
            write (savedAddressP1) ← unparsedNibbleCountHi;
            bccStatus ← UnderRunFlag,
                    goto bccDone;

NoBcc:
            bccStatus ← NoBccFlag;

bccDone:
            tosM7 ← bccStatus;
            stackPtr ← 1;
            cacheOutput (zero, InputStreamDestroy) ← zero;
            endEmulation;

PrepareToReturn:
            tableIndex ← shiftField (tableIndex, -1);% divide by 2 for # of table entries
instead of # of words
            nil ← bccType and Is4WordTableFlag;
            if z then goto WriteIndex;
            tableIndex ← shiftField (tableIndex, -1);
            % divide by 2 again because it is a 4 word break table;
WriteIndex:
            write (infoPtrHi, infoPtrLo) ← tableIndex;       % tableIndex to return
to mesa
            write (savedAddressP1) ← nibbleCountThisBreakLo;
```

```
        write (savedAddressP1) ← nibbleCountThisBreakHi;
        write (savedAddressP1) ← scanLineCount;
        write (savedAddressP1) ← tableNibbleCountLo;
        write (savedAddressP1) ← tableNibbleCountHi;
        write (savedAddressP1) ← scanlineCountSoFar;
        return;

WriteBreakTable:
        scanlineCountSoFar ← scanlineCountSoFar + scanLineCount; %Write
scanLineCount & tableNibbleCounts to memory
        nibbleCountThisBreakLo ← nibbleCountLo - nibbleCountThisBreakLo;
        nibbleCountThisBreakHi ← nibbleCountHi - nibbleCountThisBreakHi -
borrow;
        nil ← bccType and Is4WordTableFlag;
        if z then goto Write2WordTable;
Write4WordTable:
        write (tablePtrHi, tablePtrLo) ← tableNibbleCountHi;
        write (savedAddressP1) ← tableNibbleCountLo;
        temp ← shiftField (scanLineNibbles, 2);
        write (savedAddressP1) ← temp;
        write (savedAddressP1) ← scanLineCount;
        temp ← 4, goto TableWritten;
Write2WordTable:
        temp ← shiftField (scanLineCount, 8);
        temp ← temp or tableNibbleCountHi;
        write (tablePtrHi, tablePtrLo) ← temp;
        write (savedAddressP1) ← tableNibbleCountLo;
        temp ← 2;
TableWritten:
        tablePtrLo ← tablePtrLo + temp;
        tablePtrHi ← tablePtrHi + carry;
        tableIndex ← tableIndex + temp;

tableNibbleCountLo ← tableNibbleCountLo + nibbleCountThisBreakLo;
        tableNibbleCountHi ← tableNibbleCountHi + nibbleCountThisBreakHi +
carry;
        nibbleCountThisBreakLo ← nibbleCountLo;
        nibbleCountThisBreakHi ← nibbleCountHi;
        scanLineCount ← 0, return;

CheckInterrupt:
        temp ← cacheInput(zero, c1InterruptStatus);
        temp ← loadField(temp, interruptLevelField);
        nil ← temp xor 1FH;
        if z then goto AdvanceLine; % if no interrupt continue processing
        level ← temp; % level is defined in mesachannel.ms tableIndex ← shiftField (tableIndex, -1);% divide by 2 for # of table entries
instead of # of words
        nil ← bccType and Is4WordTableFlag;
        if z then goto IntCont;
        tableIndex ← shiftField (tableIndex, -1);
        % divide by 2 again because it is a 4 word break table;
IntCont:
```

```
              write (infoPtrHi, infoPtrLo) ← tableIndex;      % tableIndex to return
to mesa
              write (savedAddressP1) ← zero; % nibbleCountThisBreak = 0 because we
are
              write (savedAddressP1) ← zero; % at a break boundry when we interrupt
              write (savedAddressP1) ← zero; % scanLineCount = 0 also
              write (savedAddressP1) ← tableNibbleCountLo;
              write (savedAddressP1) ← tableNibbleCountHi;
              write (savedAddressP1) ← scanlineCountSoFar;

unparsedNibbleCountLo ← totalBlockLenLo - nibbleCountLo;
              unparsedNibbleCountHi ← totalBlockLenHi - nibbleCountHi - borrow;
              unparsedNibbleCountLo ← unparsedNibbleCountLo - blockNibbleOffset;
              unparsedNibbleCountHi ← unparsedNibbleCountHi - borrow;
              nibbleOffset ← loadField (bccStatusImage, 14:2);   % Get the nibble
offset
              bccParameters ← insertField (nibbleOffset, 4:4) or bccParameters;
              newBlockSizeLo ← unparsedNibbleCountLo + nibbleOffset;
              newBlockSizeHi ← unparsedNibbleCountHi + carry;

nil ← bccType and Block1Flag;
              if nz then goto SetBlock1;

usedBlockSizeLo ← block0SizeInNibblesLo - unparsedNibbleCountLo;
              usedBlockSizeHi ← block0SizeInNibblesHi - unparsedNibbleCountHi -
borrow;
              usedBlockSizeLo ← shiftField(usedBlockSizeLo, -2);
              usedBlockSizeLo ← insertField (usedBlockSizeHi, 0:2) or usedBlockSizeLo;
              usedBlockSizeHi ← shiftField(usedBlockSizeHi, -2);
              block0PtrLo ← block0PtrLo + usedBlockSizeLo;
              block0PtrHi ← block0PtrHi + usedBlockSizeHi + carry;
              block0SizeInNibblesLo ← newBlockSizeLo;
              block0SizeInNibblesHi ← newBlockSizeHi;
              goto StreamDestroy;

SetBlock1:
              usedBlockSizeLo ← block1SizeInNibblesLo - unparsedNibbleCountLo;
              usedBlockSizeHi ← block1SizeInNibblesHi - unparsedNibbleCountHi -
borrow;
              usedBlockSizeLo ← shiftField(usedBlockSizeLo, -2);
              usedBlockSizeLo ← insertField (usedBlockSizeHi, 0:2) or usedBlockSizeLo;
              usedBlockSizeHi ← shiftField(usedBlockSizeHi, -2);
              block1PtrLo ← block1PtrLo + usedBlockSizeLo;
              block1PtrHi ← block1PtrHi + usedBlockSizeHi + carry;
              block1SizeInNibblesLo ← newBlockSizeLo;
              block1SizeInNibblesHi ← newBlockSizeHi;
              block0PtrLo ← zero;
              block0PtrHi ← zero;
              block0SizeInNibblesLo ← zero;
              block0SizeInNibblesHi ← zero;

StreamDestroy:
              cacheOutput (zero, InputStreamDestroy) ← zero;
``` stackPtr ← 0CH, goto BccInt;

```
-- File: DIFConstants.mesa - last edit:

DIRECTORY
  ResMgrIDs USING [ID],
  ResMgrStorage USING [Pages];

DIFConstants: DEFINITIONS =
  BEGIN

-- ResMgrIDs ID used in NetStream and MIPStream
  ResMgrID: ResMgrIDs.ID = [captureIP, netServe];

-- Size of MIP file segments
  MIPSegmentSize: ResMgrStorage.Pages = 180;

END.
```

-- File: DIFPixelData.mesa - last edit:

DIRECTORY
  RasterObjects USING [PixelSequence, PixelOverhead],
  RTOSFile USING [FileID, nullID];

DIFPixelData: DEFINITIONS =
  BEGIN

UndefinedSeqencePixelData: TYPE = RECORD [
    breakTableIndex: CARDINAL ← 0,
    breakTableOffset: LONG CARDINAL ← 0,
    breakTableLengthInWords: CARDINAL ← 0,
    fileId: RTOSFile.FileID ← RTOSFile.nullID,
    oddByte: BOOLEAN ← FALSE,
    numberOfBreakTableEntries: LONG CARDINAL ← 0,
    pixelEncodingOffset: LONG CARDINAL ← 0,
    pixelLengthInWords: LONG CARDINAL ← 0,
    pixelSequenceType: RasterObjects.PixelSequence ← spare1,
    pixelV0ThroughV3: RasterObjects.PixelOverhead ← TRASH,
    unusedInLastBlock: LONG CARDINAL ← 0,
    scanlineCountFromBcc: CARDINAL ← 0,
    scansPerBreak: CARDINAL ← 16];

END.

-- File: FENetServ.mesa - last edit:

DIRECTORY
 JobID USING [ID],
 JobQ USING [Priority],
 PublicPrinting USING [Finishing, InternalMedia,
  PagesToPrint, Plex],
 RTOSFile USING [FileID, nullID],
 ServPreParse USING [DefaultRecord],
 System USING [GreenwichMeanTime],
 UserProfile USING [DefaultJobAccess];

FENetServ: DEFINITIONS =

BEGIN

-- TYPES --

JobParms: TYPE = RECORD [
 access: UserProfile.DefaultJobAccess ← [[all[]], [all[]]],
 accountNum: LONG STRING ← NIL,
 copyCount: CARDINAL ← 1,
 createDate: System.GreenwichMeanTime,
 finishing: PublicPrinting.Finishing ← sampleTray,
 jobName: LONG STRING ← NIL,
 media: PublicPrinting.InternalMedia ← DESCRIPTOR[NIL,0],
 message: LONG STRING ← NIL,
 owner: LONG STRING ← NIL,
 priority: JobQ.Priority ← medium,
 recipientName: LONG STRING ← NIL,
 senderName: LONG STRING ← NIL,
 sigJob: BOOLEAN ← FALSE];
JobParmsPtr: TYPE = LONG POINTER TO JobParms;

PreParseStepParms: TYPE = RECORD [
 defaulted: ServPreParse.DefaultRecord ← [
  copyCount: TRUE,
  jobCreateDate: TRUE,
  jobName: TRUE,
  medium: TRUE,
  message: TRUE,
  pagesToPrint: TRUE,
  plex: TRUE,
  priority: TRUE,
  recipientName: TRUE,
  senderName: TRUE,
  staple: TRUE],
 ipFileID: RTOSFile.FileID ← RTOSFile.nullID,
 media: PublicPrinting.InternalMedia ← DESCRIPTOR[NIL,0],
 plex: PublicPrinting.Plex ← simplex,
 pagesToPrint: PublicPrinting.PagesToPrint ← [var: range[[1, LAST[CARDINAL]]]],

```
   topOfQueue: BOOLEAN ← FALSE];

Error: SIGNAL [code: ErrorCode];

ErrorCode: TYPE = {
 mediumUnavailable,
 invalidPrintParameters,
 systemError,
 spare1,
 spare2};

FirstBlockComplete: PROCEDURE [
 preParseStepParms: PreParseStepParms,
 jobID: JobID.ID];

Print: PROCEDURE [jobParms: JobParmsPtr]
 RETURNS [printRequestID: JobID.ID];

END. «FENetServ»
```

-- File: FENetSupport.mesa - last edit:

DIRECTORY
 DirectoryType USING [OperatorAccess],
 JobBackUp USING [LockID],
 JobQ USING [CreateDateOption, Disposition, JobReference, Priority],
 MRSignature USING [defaultTrimOffset, defaultTrimSizeX, defaultTrimSizeY,
  TrimOffset, TrimSizeX, TrimSizeY],
 PublicPrinting USING [Finishing, MediumDimensions];

FENetSupport: DEFINITIONS =

BEGIN

OtherOption: TYPE = RECORD [
 name: LONG STRING,
 data: LONG DESCRIPTOR FOR ARRAY CARDINAL OF CARDINAL]; -- Variable data PreParseOptionsType: TYPE = {copyCount, collated, docComment, docCreateDate,
 docCreator, docEndMessage, docName, docStartMessage, finishing,
 finishingMessage, jobAccount, jobAcquireAccess, jobComment, jobEndMessage,
 jobModifyAccess, jobName, jobOwner, jobPriority, jobStartMessage,
 recipientName, senderName, signature, slipSheet, other};

PreParseOptions: TYPE = LONG DESCRIPTOR FOR ARRAY CARDINAL OF
PreParseOptionsChoice;

PreParseOptionsChoice: TYPE = RECORD[
 SELECT tag: PreParseOptionsType FROM
  copyCount = > [copyCount: CARDINAL ← 1],
  collated = > [collated: BOOLEAN ← TRUE],
  docComment = > [docComment: LONG STRING ← NIL],
  docCreateDate = > [docCreateDate: JobQ.CreateDateOption],
  docCreator = > [docCreator: LONG STRING ← NIL],
  docEndMessage = > [docEndMessage: LONG STRING ← NIL],
  docName = > [docName: LONG STRING ← NIL],
  docStartMessage = > [docStartMessage: LONG STRING ← NIL],
  finishing = > [
    finishing: PublicPrinting.Finishing ← none,
      stitchA: CARDINAL ← 0,
      stitchB: CARDINAL ← 0,
    stitchNormal: BOOLEAN ← TRUE],
  finishingMessage = > [finishingMessage: LONG STRING ← NIL],
  jobAccount = > [jobAccount: LONG STRING ← NIL],
  jobAcquireAccess = > [jobAcquireAccess: DirectoryType.OperatorAccess],
  jobComment = > [jobComment: LONG STRING ← NIL],
  jobEndMessage = > [jobEndMessage: LONG STRING ← NIL],
  jobModifyAccess = > [jobModifyAccess: DirectoryType.OperatorAccess],
  jobName = > [jobName: LONG STRING ← NIL],
  jobOwner = > [jobOwner: LONG STRING ← NIL],

```
jobPriority = > [priority: JobQ.Priority ← medium],
jobStartMessage = > [jobStartMessage: LONG STRING ← NIL],
recipientName = > [recipientName: LONG STRING ← NIL],
senderName = > [senderName: LONG STRING ← NIL],
signature = > [
  trimOffset: MRSignature.TrimOffset ← MRSignature.defaultTrimOffset,
  trimSizeX: MRSignature.TrimSizeX ← MRSignature.defaultTrimSizeX,
  trimSizeY: MRSignature.TrimSizeY ← MRSignature.defaultTrimSizeY],
slipSheet = > [
  on: BOOLEAN ← FALSE,
        dimensions: PublicPrinting.MediumDimensions ← [0,0]],
other = > [otherOption: OtherOption],
ENDCASE];

PreParseParmsReady: PROCEDURE [
  disposition: JobQ.Disposition, preParseOptions: PreParseOptions,
  jobReference: JobQ.JobReference, lockID: JobBackUp.LockID];

END.

-- File: IPDIF.mesa - last edit:

DIRECTORY
  BlockStream USING [StreamHandle];

IPDIF: DEFINITIONS =
  BEGIN

Handle: TYPE = LONG POINTER TO HandleRep ← NIL;
HandleRep: TYPE;

Command: TYPE = {continue, suspend, abort};
Status: TYPE = {ok, done, error};

StatusProc: TYPE = PROC [handle: Handle, status: Status]
  RETURNS [command: Command];

CleanUpStream: PROC [inStream: BlockStream.StreamHandle];

FilterStream: PROC [
  handle: Handle, inStream, outStream: BlockStream.StreamHandle,
  statusProc: StatusProc];

Init: PROCEDURE [];

END.
```

-- File: IPDIFScanner.mesa - last edit:

```
DIRECTORY
 BlockStream USING [Block, StreamHandle];

IPDIFScanner: DEFINITIONS =
BEGIN

Error: ERROR [code: errorType];
errorType: TYPE = {unexpectedEOF,InvalidStreamOp, spare1, spare2};

InstallPixelVector: PROC [inStream, outStream: BlockStream.StreamHandle,
  startBlock: BlockStream.Block, index: LONG CARDINAL, zone: UNCOUNTED ZONE,
  prevPVEnd: LONG CARDINAL]
  RETURNS[endBlock: BlockStream.Block, start: CARDINAL,
      endOfStream: BOOLEAN, installed: BOOLEAN,
          newBlock: BOOLEAN];

END.
```

-- File: IPDIFScannerPrivate.mesa - last edit:

DIRECTORY
  BlockStream USING [StreamHandle],
  DIFPixelData USING [UndefinedSeqencePixelData],
  IMBcc USING [BCCInfo],
  ResMgr USING [TransferID, nullTransferID],
  ResMgrIDs USING [ID],
  ResMgrStorage USING [Pages];

IPDIFScannerPrivate: DEFINITIONS =

BEGIN

Handle: TYPE = LONG POINTER TO HandleRep ← NIL;
HandleRep: TYPE = RECORD [
  bccInfo: IMBcc.BCCInfo ← [],
  clientId: ResMgrIDs.ID ← [captureIP, netServe],
  inStream: BlockStream.StreamHandle ← NIL,
  undefinedSeqData: DIFPixelData.UndefinedSeqencePixelData ← [],
  xferId: ResMgr.TransferID ← ResMgr.nullTransferID];

-- Procedures

InitPBTTable: PROCEDURE [handle: Handle, xPixels: CARDINAL];

StorePBT: PROCEDURE [handle: Handle];

VerifyAndCachePBT: PROCEDURE [
  handle: Handle, fileOffsetInPages: ResMgrStorage.Pages];

END.

-- File: MIPStreamMgr.mesa - last edit:

DIRECTORY
 BlockStream USING [StreamHandle],
 Courier USING [ErrorCode],
 FaultLogger USING [ID],
 JobID USING [ID],
 ResMgr USING [Status],
 RMDirectory USING [ErrorCode],
 RTOSFile USING [FileID],
 Stream USING [CompletionCode];

MIPStreamMgr: DEFINITIONS =
BEGIN

-- Types

StatusProc: TYPE = PROCEDURE [clientID: JobID.ID, problem: Problem];

ProblemType: TYPE = {
 aborted, badStreamHandle, courierError, directoryError, invalidIPBuffer,
 resMgrError, streamTimeOut, unknownNetResponce, spare};

Problem: TYPE = RECORD [
 SELECT type: ProblemType FROM
 aborted = > [],
 badStreamHandle = > [],
 courierError = > [code: Courier.ErrorCode],
 directoryError = > [code: RMDirectory.ErrorCode, faultID: FaultLogger.ID],
 invalidIPBuffer = > [code: CARDINAL],
 resMgrError = > [code: ResMgr.Status, faultID: FaultLogger.ID],
 streamTimeOut = > [],
 unknownNetResponce = > [code: Stream.CompletionCode],
 spare = > [code: CARDINAL],
 ENDCASE];

Source: TYPE = {disk, net, spare};

StreamStatus: TYPE = {nthBlockTransmitted, spare};
StreamStatusProc: TYPE = PROC [
 bsH: BlockStream.StreamHandle, streamStatus: StreamStatus];

CreateCacheOutputStream: PROC [
  streamStatusProc: StreamStatusProc, statusOnBlockNumber: CARDINAL ← 1,
  zone: UNCOUNTED ZONE] RETURNS [bsH: BlockStream.StreamHandle, fileId:
RTOSFile.FileID];

CreateDiskOutputStream: PROC [
  streamStatusProc: StreamStatusProc, statusOnBlockNumber: CARDINAL ← 1,
  zone: UNCOUNTED ZONE] RETURNS [bsH: BlockStream.StreamHandle, fileId:
RTOSFile.FileID];

DeleteStream: PROC [bsH: BlockStream.StreamHandle];

OpenMIPInputStream: PROCEDURE [
 streamHandle: BlockStream.StreamHandle, fileID: RTOSFile.FileID,
 statusProc: StatusProc, zone: UNCOUNTED ZONE];

CloseStream: PROC [streamHandle: BlockStream.StreamHandle];

GetPrintIDStatus: PROCEDURE [clientID: JobID.ID] RETURNS [ok: BOOLEAN];

SetPrintIDStatus: PROCEDURE [clientID: JobID.ID, ok: BOOLEAN];

END.

```
-- File: NetLog.mesa - last edit:
DIRECTORY
 ResMgrStorage USING [Pages];

NetLog: DEFINITIONS =

BEGIN

-- Types
Entry: TYPE = RECORD [
  var: SELECT eventType: EventType FROM
    null = > [],
          filterStream = > [],
          scanForPV = > [],
          cleanUpDIF = > [],
          createStream = > [],
          createDiskStream = > [],
          getOffset = > [],
          putFileToStream = > [numberOfBlocks: CARDINAL],
          syncStream = > [offset: ResMgrStorage.Pages],
          aFreeList = > [blockPointer: LONG POINTER],
          aInUseList = > [blockPointer: LONG POINTER],
          aReadyList = > [blockPointer: LONG POINTER],
          delete = > [],
          getBufferList = > [],
          gFreeList = > [blockPointer: LONG POINTER],
          gInUseList = > [blockPointer: LONG POINTER],
          gReadyList = > [blockPointer: LONG POINTER],
          receive = > [blockPointer: LONG POINTER],
          acquire = > [blockPointer: LONG POINTER],
          return = > [blockPointer: LONG POINTER],
          setAbort = > [],
          setEOF = > [],
          transmit = > [blockPointer: LONG POINTER],
          installPV = > [index: CARDINAL, prevPVEnd: LONG CARDINAL],
          cleanUp = > [],
          open = > [seqLength: LONG CARDINAL],
          close = > [],
          genXYTable = > [],
          storeTrailer = > [offset: ResMgrStorage.Pages],
          ENDCASE];

EventType: TYPE = {null, filterStream, scanForPV, cleanUpDIF, createStream,
createDiskStream, getOffset, putFileToStream, syncStream, aFreeList, aInUseList,
aReadyList, delete, getBufferList, gFreeList, gInUseList, gReadyList, receive, acquire,
return, setAbort, setEOF, transmit, installPV, cleanUp, open, close, genXYTable,
storeTrailer};

NetStreamType: TYPE = EventType[createStream..transmit];

ScannerAType: TYPE = EventType[installPV..storeTrailer];

IPType: TYPE = EventType[filterStream..cleanUpDIF];
```

-- Procs

CreateLog: PROCEDURE[zone: UNCOUNTED ZONE, nEntries: CARDINAL];

DestroyLog: PROCEDURE[zone: UNCOUNTED ZONE];

Log: PROCEDURE[entry: Entry];

END...

-- File: Print3Sched.mesa - last edit:

DIRECTORY
 Print3 USING [PrintAttributes, PrintOptions, RequestID],
 Stream USING [Handle];

Print3Sched: DEFINITIONS =
 BEGIN

PrintJob: PROCEDURE [
  master: Stream.Handle,
  printAttributes: Print3.PrintAttributes,
  printOptions: Print3.PrintOptions]
  RETURNS [printRequestID: Print3.RequestID];

END. <<Print3Sched>>

-- File: Print3SchedExtra.mesa - Last Edit:

DIRECTORY
 RTOSFile USING [FileID];

Print3SchedExtra: DEFINITIONS =
 BEGIN

-- Procs
 GetMIPFile: PROC[] RETURNS[mipFile: RTOSFile.FileID];
 END.

-- File: Print3SchedInternal.mesa - Last Edit:

DIRECTORY
 BlockStream USING [StreamHandle],
 JobID USING [ID, nullID],
 JobStep USING [RootStep],
 JobQ USING [JobReference, nullJobReference],
 FENetServ USING [PreParseStepParms];

Print3SchedInternal: DEFINITIONS =
 BEGIN

-- Types
 PrintJobHandle: TYPE = LONG POINTER TO PrintJobObject;

PrintJobObject: TYPE = RECORD [
  next: PrintJobHandle ← NIL,
  jobID: JobID.ID ← JobID.nullID,
  jobReference: JobQ.JobReference ← JobQ.nullJobReference,
  inStream: BlockStream.StreamHandle ← NIL,
  outStream: BlockStream.StreamHandle ← NIL,
  preParseStepParms: LONG POINTER TO FENetServ.PreParseStepParms ← NIL,
  rootStep: JobStep.RootStep,
  sH: PrintStateHandle ← NIL];

PrintStateHandle: TYPE = LONG POINTER TO PrintStateObject;

PrintStateObject: TYPE = MONITORED RECORD [state: State ← idle];

State: TYPE = {aborting, completing, idle, running};

-- Constants

-- Procs

AddInstance: PROC[pH: PrintJobHandle];
 FindInstanceByStream: PROC[bsH: BlockStream.StreamHandle] RETURNS [pH: PrintJobHandle];
 FindInstanceByJob: PROC[jobID: JobID.ID] RETURNS [pH: PrintJobHandle];
 RemoveInstance: PROC[pH: PrintJobHandle];

END.

-- File: Print3Status.mesa - last edit:

DIRECTORY
  PublicPrinting USING [Spooler],
  ResMgrStorage USING [Pages];

Print3Status: DEFINITIONS =
  BEGIN << Print3Status >> heap: UNCOUNTED ZONE;
  pagesInBuffer: CARDINAL;
  bytesInBuffer: CARDINAL;
  extendFileBy: ResMgrStorage.Pages;
  defaultFileSize: ResMgrStorage.Pages;
  maxFileSize: ResMgrStorage.Pages;

-- Procedures

CheckDiskUsage: PROCEDURE [masterSize: ResMgrStorage.Pages,
                             completed: BOOLEAN];

CheckServiceEnabled: PROCEDURE [];

CloseConnection: PROCEDURE [error: BOOLEAN];

CloseDiskConnection: PROCEDURE [size: ResMgrStorage.Pages];

CloseStreamConnection: PROCEDURE [];

OpenConnection: PROCEDURE [];

GetSpoolingStatus: PROCEDURE []
    RETURNS [status: PublicPrinting.Spooler];

CheckStatus: PROCEDURE []
    RETURNS [disabled: BOOLEAN];
  END.

```
-- File: SMNetServSSC.mesa - last edit:

DIRECTORY
  EventHandler USING [MemoryActionCompleteProcType],
  JobID USING [ID],
  ResMgrIDs USING [TransactionID],
  ResMgrStorage USING [Pages];

SMNetServSSC: DEFINITIONS =
  BEGIN << NetServSM >>

-- Procedures

Abort: PROCEDURE [jobID: JobID.ID];

AbortAll: PROCEDURE [];

ClearFault: PROCEDURE [bucket: CARDINAL];

Init: PROCEDURE [];

PurgeCompleted: PROCEDURE [];

Resume: PROCEDURE [id: ResMgrIDs.TransactionID];

SetServiceSwitch: PROCEDURE [onLine: BOOLEAN];

SetPrint3ServerSwitch: PROCEDURE [enable: BOOLEAN];

SetSpoolingSwitch: PROCEDURE [enable: BOOLEAN];

SetMaxPrintConnections: PROCEDURE [newLimit: CARDINAL]
    RETURNS [ok: BOOLEAN];

SetMaxDiskUsage: PROCEDURE [pages: ResMgrStorage.Pages];

Shutdown: PROCEDURE [id: ResMgrIDs.TransactionID,
                      proc:
  EventHandler.MemoryActionCompleteProcType];

END.
```

```
-- File: IPDIFImpl.mesa - last edit:

DIRECTORY
  BlockStream USING [Block, EOF, nullBlock, StreamHandle],
  Environment USING [Byte, bytesPerPage],
  EventLogger USING [Log],
  Heap USING [systemZone],
  IMBcc USING [BccProcess],
  IMExtra USING [GetBccMesaChannel],
  IPDIF USING [Handle, StatusProc],
  IPDIFScanner USING [InstallPixelVector],
  NetLog USING [Log],
  Process USING [Detach],
  RTOSMP2Process USING [DirectProcess],
  RTOSFile USING [Delete, Error, FileID, nullID];

IPDIFImpl: PROGRAM
  IMPORTS
    BlockStream, EventLogger, Heap, IMExtra, IMBcc, IPDIFScanner, NetLog, Process,
    RTOSFile, RTOSMP2Process
  EXPORTS IPDIF =
  BEGIN workingZone: UNCOUNTED ZONE = Heap.systemZone;

headerOffset: CARDINAL = 21;
  bytesPerPage: CARDINAL = Environment.bytesPerPage;

ShortNumberULimit: Environment.Byte = 80H;
  ShortOperatorULimit: Environment.Byte = 0A0H;
  LongOperatorULimit: Environment.Byte = 0C0H;
  ShortSequenceULimit: Environment.Byte = 0E0H;

LongAdaptiveSeq: Environment.Byte = 0ECH;
  LongCCITT4Seq: Environment.Byte = 0EDH;
  LongCompressedSeq: Environment.Byte = 0EAH;
  LongPackedSeq: Environment.Byte = 0E9H;

DIFLongAdaptiveSeq: Environment.Byte = 0FCH;
  DIFLongCCITT4Seq: Environment.Byte = 0FDH;
  DIFLongCompressedSeq: Environment.Byte = 0FAH;
  DIFLongPackedSeq: Environment.Byte = 0F9H;

ScanState: TYPE = {normal, NeedShortLength, NeedLongLength, NeedFileID};
  BlockGenerator: TYPE = PROC [blockAction: BlockAction];
  BlockAction: TYPE = PROC [block: BlockStream.Block, start: LONG CARDINAL]
     RETURNS [found: BOOLEAN ← FALSE, index: CARDINAL ← 0, next: LONG
  CARDINAL ← 0];

FileID: TYPE = MACHINE DEPENDENT RECORD [
    SELECT OVERLAID * FROM
    id = > [id: RTOSFile.FileID],
    bytes = > [
      b0: Environment.Byte,
```

```
  b1: Environment.Byte,
  b2: Environment.Byte,
  b3: Environment.Byte,
  b4: Environment.Byte,
  b5: Environment.Byte,
  b6: Environment.Byte,
  b7: Environment.Byte],
ENDCASE];

LongNumber: TYPE = MACHINE DEPENDENT RECORD [
SELECT OVERLAID * FROM
real = > [real: REAL],
lp = > [lp: LONG POINTER],
lc = > [lc: LONG CARDINAL],
li = > [li: LONG INTEGER],
pair = > [lo: CARDINAL, hi: CARDINAL],
bytes = > [
  lh: Environment.Byte,
  ll: Environment.Byte,
  hh: Environment.Byte,
  hl: Environment.Byte],
bits = > [bits: PACKED ARRAY INTEGER [0..31] OF BOOL],
ENDCASE];

FilterStream: PUBLIC PROC [
  handle: IPDIF.Handle, inStream, outStream: BlockStream.StreamHandle,
  statusProc: IPDIF.StatusProc] = {
  ENABLE UNWIND = > outStream.setEOF[outStream];
  blockGenerator: BlockGenerator = {
    index: CARDINAL ← 0;
    found, endOfStream: BOOLEAN ← FALSE;
    installed: BOOLEAN ← FALSE;
    newBlock: BOOLEAN ← FALSE;
    block: BlockStream.Block ← BlockStream.nullBlock;
    prevPVEnd, start: LONG CARDINAL ← 0;  -- prevPVEnd is trim index for MIP left
side of block
    GetBlock: PROC [] = INLINE {
      IF statusProc[handle, ok] = abort THEN ERROR ABORTED;
      block ← inStream.receive[
        inStream ! BlockStream.EOF = > {endOfStream ← TRUE; CONTINUE}]};
    GetBlock[];
    start ← headerOffset;  -- Compensate for Interpress Header
    WHILE NOT endOfStream DO
      [found, index, start] ← blockAction[block, start];
      IF found THEN {
        EventLogger.Log[581];  -- startFiling for now means start InstallPixelVector
        [block, start, endOfStream, installed, newBlock] ←
          IPDIFScanner.InstallPixelVector[
          inStream, outStream, block, index, workingZone, prevPVEnd];
        EventLogger.Log[582];  -- endFiling for now means end InstallPixelVector
        IF installed THEN prevPVEnd ← start ELSE IF newBlock THEN prevPVEnd ← 0;
        }
      ELSE {
        block.startIndex ← (prevPVEnd / bytesPerPage) * bytesPerPage;
```

```
      outStream.transmit[outStream, block];
      GetBlock[];
      prevPVEnd ← 0};
     ENDLOOP;
    IF found THEN outStream.transmit[outStream, block];
    outStream.setEOF[outStream];
    };
   EventLogger.Log[451];
   NetLog.Log[[filterStream[]]];
   ScanForPixelVectors[blockGenerator ! ABORTED = > CONTINUE];
   [] ← statusProc[handle, done];
   EventLogger.Log[452];
   };

ScanForPixelVectors: PROC [blockGenerator: BlockGenerator] = {
   scanningState: ScanState ← normal;
   len: LongNumber ← [li[0]];
   longNumberIndex: CARDINAL ← 0;
   blockAction: BlockAction = {
    i: LONG CARDINAL ← start;
    SetSeqLength: PROC = {
     SELECT longNumberIndex FROM
      0 = > len.hl ← block.blockPointer[CARDINAL[i]];
      1 = > len.lh ← block.blockPointer[CARDINAL[i]];
      2 = > len.ll ← block.blockPointer[CARDINAL[i]];
      ENDCASE = > ERROR;
     };
    NetLog.Log[[scanForPV[]]];
    SELECT scanningState FROM
     NeedShortLength = > i ← i + block.blockPointer[CARDINAL[i]] + 1;
     NeedLongLength = > {
      WHILE longNumberIndex < 3 DO
       SetSeqLength[];
       i ← i + 1;
       longNumberIndex ← longNumberIndex + 1;
       ENDLOOP;
      i ← i + len.li;
      };
     ENDCASE = > NULL;
    scanningState ← normal;
    WHILE i < block.stopIndexPlusOne DO
     SELECT block.blockPointer[CARDINAL[i]] FROM
      < ShortNumberULimit = > i ← i + 2;
      < ShortOperatorULimit = > i ← i + 1;
      < LongOperatorULimit = > i ← i + 2;
      < ShortSequenceULimit = >
       IF (i + 1) = block.stopIndexPlusOne THEN {
        scanningState ← NeedShortLength; RETURN[FALSE, 0, 0]; }
        ELSE i ← i + block.blockPointer[CARDINAL[(i ← i + 1)]] + 1;
      ENDCASE = > { -- SequenceLong
       SELECT block.blockPointer[CARDINAL[i]] FROM
        LongAdaptiveSeq, LongCCITT4Seq, LongCompressedSeq, LongPackedSeq
= >
         RETURN[TRUE, CARDINAL[i], next];
```

```
    ENDCASE = > { -- Something other than Long Pixel Vector Sequence
      len.li ← longNumberIndex ← 0;
      WHILE (i ← i + 1) < block.stopIndexPlusOne AND longNumberIndex < 3
        DO
        SetSeqLength[]; longNumberIndex ← longNumberIndex + 1; ENDLOOP;
      IF longNumberIndex # 3 THEN { -- Length is in next block
        scanningState ← NeedLongLength; RETURN[FALSE, 0, 0]; };
      i ← i + len.li;
      };
    };
    ENDLOOP;
    next ← i - block.stopIndexPlusOne;
    };
  blockGenerator[blockAction];
  };

Init: PUBLIC PROCEDURE [] = {
  mesaChannel: CARDINAL ← IMExtra.GetBccMesaChannel[];
  bccProcess: PROCESS ← FORK IMBcc.BccProcess[];
  Process.Detach[bccProcess];
  RTOSMP2Process.DirectProcess[process: bccProcess, channel: mesaChannel];
  };

CleanUpStream: PUBLIC PROC [inStream: BlockStream.StreamHandle] = {
  blockGenerator: BlockGenerator = {
    index: CARDINAL ← 0;
    start: LONG CARDINAL ← 0;
    found, endOfStream: BOOLEAN ← FALSE;
    block: BlockStream.Block ← BlockStream.nullBlock;
    GetBlock: PROC [] = INLINE {
      block ← inStream.receive[
        inStream ! BlockStream.EOF = > {endOfStream ← TRUE; CONTINUE}]};
    GetBlock[];
    start ← headerOffset;
    WHILE NOT endOfStream DO
      [found, index, start] ← blockAction[block, start];
      inStream.return[inStream, block];
      GetBlock[];
      ENDLOOP;
    };
  ScanForFileIDs[blockGenerator];
  };

ScanForFileIDs: PROC [blockGenerator: BlockGenerator] = {
  scanningState: ScanState ← normal;
  longNumberIndex: CARDINAL ← 0;
  sequence: Environment.Byte ← 0;
  len: LongNumber ← [li[0]];
  fileID: FileID ← [id[RTOSFile.nullID]];
  fileIDIndex: CARDINAL ← 0;
  blockAction: BlockAction = {
    i: LONG CARDINAL ← start;
    SetSeqLength: PROC = {
      SELECT longNumberIndex FROM
```

```
   0 = > len.hl ← block.blockPointer[CARDINAL[i]];
   1 = > len.lh ← block.blockPointer[CARDINAL[i]];
   2 = > len.ll ← block.blockPointer[CARDINAL[i]];
   ENDCASE = > ERROR;
  };
SetFileID: PROC = {
 SELECT fileIDIndex FROM
   0 = > fileID.b0 ← block.blockPointer[CARDINAL[i]];
   1 = > fileID.b1 ← block.blockPointer[CARDINAL[i]];
   2 = > fileID.b2 ← block.blockPointer[CARDINAL[i]];
   3 = > fileID.b3 ← block.blockPointer[CARDINAL[i]];
   4 = > fileID.b4 ← block.blockPointer[CARDINAL[i]];
   5 = > fileID.b5 ← block.blockPointer[CARDINAL[i]];
   6 = > fileID.b6 ← block.blockPointer[CARDINAL[i]];
   ENDCASE = > ERROR;
  };
SELECT scanningState FROM
  NeedShortLength = > i ← i + block.blockPointer[CARDINAL[i]] + 1;
  NeedLongLength = > {
   WHILE longNumberIndex < 3 DO
     SetSeqLength[];
     i ← i + 1;
     longNumberIndex ← longNumberIndex + 1;
   ENDLOOP;
   i ← i + len.li;
   SELECT sequence FROM
     DIFLongAdaptiveSeq, DIFLongCCITT4Seq, DIFLongCompressedSeq,
     DIFLongPackedSeq = > {
      fileID ← [id[RTOSFile.nullID]];
      fileIDIndex ← 0;
      WHILE (i ← i + 1) < block.stopIndexPlusOne AND fileIDIndex < 7 DO
        SetFileID[]; fileIDIndex ← fileIDIndex + 1; ENDLOOP;
      i ← i + len.li - 8;
      RTOSFile.Delete[fileID.id ! RTOSFile.Error = > CONTINUE]};
     ENDCASE = > i ← i + len.li;
   };
  NeedFileID = > {
   WHILE fileIDIndex < 7 DO
     SetFileID[]; i ← i + 1; fileIDIndex ← fileIDIndex + 1; ENDLOOP;
   i ← i + len.li - 8;
   RTOSFile.Delete[fileID.id ! RTOSFile.Error = > CONTINUE]};
  ENDCASE = > NULL;

scanningState ← normal;
WHILE i < block.stopIndexPlusOne DO
  SELECT block.blockPointer[CARDINAL[i]] FROM
    < ShortNumberULimit = > i ← i + 2;
    < ShortOperatorULimit = > i ← i + 1;
    < LongOperatorULimit = > i ← i + 2;
    < ShortSequenceULimit = >
     IF (i + 1) = block.stopIndexPlusOne THEN { -- Length is in next block
       scanningState ← NeedShortLength; RETURN[FALSE, 0, 0]; }
     ELSE i ← i + block.blockPointer[CARDINAL[(i ← i + 1)]] + 1;
    ENDCASE = > { -- SequenceLong
```

```
      sequence ← block.blockPointer[CARDINAL[i]];
      len.li ← longNumberIndex ← 0;
      WHILE (i ← i + 1) < block.stopIndexPlusOne AND longNumberIndex < 3 DO
        SetSeqLength[]; longNumberIndex ← longNumberIndex + 1; ENDLOOP;
      IF longNumberIndex # 3 THEN { -- Length and FileID is in next block
        scanningState ← NeedLongLength; RETURN[FALSE, 0, 0]};
      SELECT sequence FROM
        DIFLongAdaptiveSeq, DIFLongCCITT4Seq, DIFLongCompressedSeq,
         DIFLongPackedSeq = > {
         fileIDIndex ← 0;
         fileID ← [id[RTOSFile.nullID]];
         WHILE (i ← i + 1) < block.stopIndexPlusOne AND fileIDIndex < 7 DO
          SetFileID[]; fileIDIndex ← fileIDIndex + 1; ENDLOOP;
         IF fileIDIndex # 7 THEN { -- fileID is in next block
          scanningState ← NeedFileID; RETURN[FALSE, 0, 0]};
         i ← i + len.li - 8;
         RTOSFile.Delete[fileID.id ! RTOSFile.Error = > CONTINUE]};
         ENDCASE = > i ← i + len.li;
       };
      ENDLOOP;
      next ← i - block.stopIndexPlusOne;
    };
   blockGenerator[blockAction];
  };

END.
```

-- File: IPDIFScannerImplA.mesa - last edit:

```
DIRECTORY
 ASWFileTypes USING [rasterJob],
 BlockStream USING [Block, EOF, nullBlock, StreamHandle],
 ByteBlt USING [ByteBlt],
 DIFPixelData USING [UndefinedSeqencePixelData],
 Environment USING [Byte, bytesPerPage, bytesPerWord],
 EventLogger USING [Log],
 IMBcc USING [GatherPBTDataFromBcc],
 Inline USING [BITOR, LongMult],
 IPDIFScanner USING [errorType],
 IPDIFScannerPrivate USING [
  Handle, HandleRep, InitPBTTable, StorePBT, VerifyAndCachePBT],
 NetLog USING [Log],
 RasterObjects USING [PixelOverhead],
 ResMgr USING [
  Abort, Allocate, AllocateBufferDescriptor, ChainedWrite, FreeBufferList,
  nullTransferID, TransferID, WaitForCompletion, WriteAsync, WriteSync],
 ResMgrStorage USING [
  BufferList, BufferDescriptor, bytesPerPage, Pages, PagesFromBytes,
  PagesFromWords, wordsPerPage],
 Print3 USING [SystemError],
 RTOSFile USING [Create, Delete, Error, FileID, GetFileInfo, nullID, Truncate],
 RTOSIGStructures USING [
  TiledImageXYEntry, TiledImageXYTablePtr, TiledImageBreakTablePtr,
  TiledImageBreakEntry],
 Stream USING [InvalidOperation, TimeOut];

IPDIFScannerImplANew: PROGRAM
 IMPORTS
  ByteBlt, BlockStream, EventLogger, IMBcc, Inline, IPDIFScannerPrivate, NetLog,
  ResMgr, ResMgrStorage, Print3, RTOSFile, Stream
 EXPORTS IPDIFScanner =
 BEGIN -- TYPEs BYTE: TYPE = Environment.Byte;
ByteSeq: TYPE = LONG POINTER TO ByteSeqRep;
ByteSeqRep: TYPE = RECORD [PACKED SEQUENCE COMPUTED CARDINAL OF BYTE];
Error: PUBLIC ERROR [code: IPDIFScanner.errorType] = CODE;

Handle: TYPE = IPDIFScannerPrivate.Handle;
HandleRep: TYPE = IPDIFScannerPrivate.HandleRep;

LongNumber: TYPE = MACHINE DEPENDENT RECORD [
 SELECT OVERLAID * FROM
 real = > [real: REAL],
 lp = > [lp: LONG POINTER],
 lc = > [lc: LONG CARDINAL],
 li = > [li: LONG INTEGER],
```

```
pair = > [lo: CARDINAL, hi: CARDINAL],
bytes = > [
 lh: Environment.Byte,
 ll: Environment.Byte,
 hh: Environment.Byte,
 hl: Environment.Byte],
bits = > [bits: PACKED ARRAY INTEGER [0..31] OF BOOL],
ENDCASE];

SequenceType: TYPE = MACHINE DEPENDENT{
  nil, sequenceString, sequenceInteger, sequenceInsertMaster, sequenceRational,
  sequenceIdentifier, sequenceComment, sequenceContinued,
sequenceLargeVector,
  sequencePackedPixelVector, sequenceCompressedPixelVector, sequenceInsertFile,
  sequenceAdaptivePixelVector, sequenceCCITT4PixelVector,
  undefinedPackedPixelVector(25), undefinedCompressedPixelVector,
  undefinedAdaptivePixelVector(28), (31)};

ShortNumber: TYPE = MACHINE DEPENDENT RECORD [
SELECT OVERLAID * FROM
sc = > [sc: CARDINAL],
si = > [si: INTEGER],
bytes = > [hi: Environment.Byte, lo: Environment.Byte],
bits = > [bits: PACKED ARRAY INTEGER [0..15] OF BOOL],
ENDCASE];

XYTableRecord: TYPE = RECORD [
 xyTableOffSet: CARDINAL ← 0,
 xyTableLength: CARDINAL ← 0];

-- Variables and Constants bytesPerPage: CARDINAL = Environment.bytesPerPage;

noBcc: BOOLEAN ← FALSE;
numberOfBytesForToken: CARDINAL = 1;
numberOfBytesForSeqLength: CARDINAL = 3;
trailerPage: ResMgrStorage.Pages = 1;
numberOfBytesForAdaptiveOverhead: CARDINAL =
 SIZE[adaptive RasterObjects.PixelOverhead] * Environment.bytesPerWord;
numberOfBytesForCompressedOverhead: CARDINAL =
 SIZE[compressed RasterObjects.PixelOverhead] * Environment.bytesPerWord;
numberOfBytesForPackedOverhead: CARDINAL =
 SIZE[packed RasterObjects.PixelOverhead] * Environment.bytesPerWord;
numberOfBytesForFileRep: CARDINAL =
 SIZE[RTOSFile.FileID] * Environment.bytesPerWord;
SequenceContinuedSeq: Environment.Byte = 0E7H;

-- PROCs

CleanUp: PROC [pvHandle: IPDIFScannerPrivate.Handle, zone: UNCOUNTED ZONE]
= {
 NetLog.Log[[cleanUp[]]];
 IF pvHandle # NIL THEN {
```

```
IF pvHandle.xferId # ResMgr.nullTransferID THEN {
  ResMgr.Abort[pvHandle.xferId]; pvHandle.xferId ← ResMgr.nullTransferID};
IF pvHandle.bccInfo.pbtBufferList # NIL THEN
  ResMgr.FreeBufferList[
    id: pvHandle.bccInfo.pbtID, buffer: pvHandle.bccInfo.pbtBufferList];
IF pvHandle.undefinedSeqData.fileId # RTOSFile.nullID THEN
  RTOSFile.Delete[
    pvHandle.undefinedSeqData.fileId ! RTOSFile.Error = > CONTINUE];
IF pvHandle.bccInfo.buffer0.blockPtr # NIL THEN
  zone.FREE[@pvHandle.bccInfo.buffer0.blockPtr];
  zone.FREE[@pvHandle];
  };
};

InstallPixelVector: PUBLIC PROC [
  inStream, outStream: BlockStream.StreamHandle, startBlock: BlockStream.Block,
  index: LONG CARDINAL, zone: UNCOUNTED ZONE, prevPVEnd: LONG CARDINAL]
  RETURNS [
    endBlock: BlockStream.Block, start: CARDINAL ← 0,
    endOfStream: BOOLEAN ← FALSE, installed: BOOLEAN ← FALSE,
    newBlock: BOOLEAN ← FALSE] = {
  pvHandle: IPDIFScannerPrivate.Handle ← NIL;
  {
  ENABLE UNWIND = > CleanUp[pvHandle, zone];

blockSize: LONG CARDINAL = CARDINAL[startBlock.stopIndexPlusOne];
  dataAddedToMip: CARDINAL ← numberOfBytesForFileRep;
  fileID: RTOSFile.FileID ← RTOSFile.nullID;
  mIPBlock: BlockStream.Block ← BlockStream.nullBlock;
  newSequenceType: BYTE ← Inline.BITOR[startBlock.blockPointer[index], 10H];
  pixelOverheadSize: CARDINAL ← 0;
  readIndex: LONG CARDINAL ← index + 1;
  readBlock, writeBlock: BlockStream.Block ← startBlock;
  sequenceLength, newLength: LongNumber ← [li[0]];
  sequenceType: SequenceType ← VAL[startBlock.blockPointer[index] MOD 40B];
  writeIndex: LONG CARDINAL ← index;

PutBlock: PROC [block: BlockStream.Block] = INLINE {
    outStream.transmit[outStream, block]};

GetBlock: PROC [] = INLINE {
    readBlock ← inStream.receive[
      inStream ! BlockStream.EOF = > {endOfStream ← TRUE; CONTINUE}];
    newBlock ← TRUE};

Read: PROC [dest: ByteSeq, size: CARDINAL] = {
    destIndex: CARDINAL ← 0;
    WHILE readIndex < readBlock.stopIndexPlusOne AND destIndex < size DO
      IF dest # NIL THEN dest[destIndex] ← readBlock.blockPointer[readIndex];
      destIndex ← destIndex + 1;
      readIndex ← readIndex + 1;
      ENDLOOP;
    IF readIndex = readBlock.stopIndexPlusOne THEN {
```

```
    writeBlock ← readBlock;
    GetBlock[];
    readIndex ← 0;
    WHILE destIndex < size DO
      IF dest # NIL THEN dest[destIndex] ← readBlock.blockPointer[readIndex];
      destIndex ← destIndex + 1;
      readIndex ← readIndex + 1;
      ENDLOOP};
    };
Write: PROC [src: ByteSeq, size: CARDINAL] = {
    srcIndex: CARDINAL ← 0;
    WHILE writeIndex < writeBlock.stopIndexPlusOne AND srcIndex < size DO
      writeBlock.blockPointer[writeIndex] ← src[srcIndex];
      srcIndex ← srcIndex + 1;
      writeIndex ← writeIndex + 1;
      ENDLOOP;
    IF writeIndex = writeBlock.stopIndexPlusOne THEN {
      PutBlock[writeBlock];
      writeBlock ← readBlock;
      writeIndex ← 0;
      WHILE srcIndex < size DO
        writeBlock.blockPointer[writeIndex] ← src[srcIndex];
        srcIndex ← srcIndex + 1;
        writeIndex ← writeIndex + 1;
        ENDLOOP};
    };

GetLength: PROC [] RETURNS [len: LongNumber ← [li[0]]] = {
    tmpLen: LongNumber ← [li[0]];
    lenPtr: LONG POINTER ← @tmpLen;
    Read[lenPtr, numberOfBytesForSeqLength];
    len.hl ← tmpLen.lh;
    len.lh ← tmpLen.ll;
    len.ll ← tmpLen.hh};

GetPixelOverHead: PROC [sequenceType: SequenceType]
    RETURNS [pixelOverhead: RasterObjects.PixelOverhead] = {
    pixelOverheadPtr: LONG POINTER ← @pixelOverhead;
    pixelOverheadSize ←
      SELECT sequenceType FROM
        sequenceAdaptivePixelVector = > numberOfBytesForAdaptiveOverhead,
        sequenceCompressedPixelVector = >
numberOfBytesForCompressedOverhead,
        sequencePackedPixelVector = > numberOfBytesForPackedOverhead,
        ENDCASE = > 0;
    Read[pixelOverheadPtr, pixelOverheadSize]};

PutTokenAndLength: PROC [newSequence: BYTE, len: LongNumber] = {
    word: ShortNumber ← [bytes[hi: newSequence, lo: 0]];
    newLength: LongNumber ← [bytes[lh: len.hl, ll: len.lh, hh: len.ll, hl: 0]];
    sequencePtr: LONG POINTER ← @word;
    lengthPtr: LONG POINTER ← @newLength;
    Write[sequencePtr, numberOfBytesForToken];
    Write[lengthPtr, numberOfBytesForSeqLength]};
```

```
PutFileID: PROC [fileID: RTOSFile.FileID] = {
  ptr: LONG POINTER ← @fileID;
  IF pixelOverheadSize < numberOfBytesForFileRep THEN
    Read[NIL, (dataAddedToMip - pixelOverheadSize)];
  Write[ptr, dataAddedToMip]};

NetLog.Log[[installPV[index]]];

sequenceLength ← GetLength[];

IF (sequenceLength.lc + readIndex) > blockSize THEN {
  pixelOverhead: RasterObjects.PixelOverhead ←
GetPixelOverHead[sequenceType];
  dataInBlock: CARDINAL = blockSize - readIndex;
  -- dataInBlock will be data excluding pixelOverHead
  numberOfPVBlocks: CARDINAL = CARDINAL[
    ((sequenceLength.li - pixelOverheadSize - dataInBlock) / blockSize)];
  dataTruncated: LONG CARDINAL = Inline.LongMult[numberOfPVBlocks,
blockSize];
  lastBlockGarbage: CARDINAL ← 0;
  dataAddedToMip: CARDINAL ← numberOfBytesForFileRep;

firstBlockGarbage: CARDINAL ← bytesPerPage - readIndex MOD bytesPerPage;

EventLogger.Log[581];
  installed ← TRUE;

start ←
    IF sequenceLength.lc < dataInBlock THEN CARDINAL[
    readIndex + (sequenceLength.lc - pixelOverheadSize)]
    ELSE CARDINAL[  -- IP Offset in last block
      sequenceLength.li - pixelOverheadSize - dataTruncated - dataInBlock];

lastBlockGarbage ← start MOD bytesPerPage;

newLength.li ← lastBlockGarbage + firstBlockGarbage + pixelOverheadSize;

IF (firstBlockGarbage + pixelOverheadSize) < dataAddedToMip THEN
    newLength.li ←
      newLength.li +
      ResMgrStorage.PagesFromBytes[
        (dataAddedToMip - (firstBlockGarbage + pixelOverheadSize))] *
        bytesPerPage;

PutTokenAndLength[newSequenceType, newLength];
  [pvHandle, fileID] ← Open[
    inStream, sequenceType, (sequenceLength.li - pixelOverheadSize),
    pixelOverhead, zone];

Copy[pvHandle, readBlock, readIndex, MIN[dataInBlock, sequenceLength.lc]];
  PutFileID[fileID];

mIPBlock.blockPointer ← readBlock.blockPointer;
```

```
mIPBlock.startIndex ← ((prevPVEnd / bytesPerPage) * bytesPerPage);
mIPBlock.stopIndexPlusOne ←
  ((writeIndex + bytesPerPage - 1) / bytesPerPage) * bytesPerPage;
PutBlock[mIPBlock];

Transfer[pvHandle, numberOfPVBlocks];
GetBlock[];
IF start > 0 THEN Copy[pvHandle, readBlock, 0, start];
Close[pvHandle];

IF readBlock.blockPointer[start] = SequenceContinuedSeq THEN {
  };
  EventLogger.Log[582];
}
ELSE {
  skipTo: CARDINAL = (CARDINAL[sequenceLength.li] + readIndex);
  IF (readBlock # writeBlock) OR skipTo > = blockSize THEN {
    PutBlock[writeBlock]; GetBlock[]; };
  start ← skipTo MOD blockSize;
  };
RETURN[readBlock, start, endOfStream, installed, newBlock];
}};

Open: PROC [
  inStream: BlockStream.StreamHandle, seqType: SequenceType,
  seqLength: LONG CARDINAL, pixelOverhead: RasterObjects.PixelOverhead,
  zone: UNCOUNTED ZONE] RETURNS [handle: Handle, fileId: RTOSFile.FileID] = {
  fileSizeInDiskPages: ResMgrStorage.Pages ← 0;

NetLog.Log[[open[seqLength]]];
  handle ← zone.NEW[HandleRep ← []];
  handle.bccInfo.zone ← zone;
  handle.inStream ← inStream;
  handle.undefinedSeqData.pixelV0ThroughV3 ← pixelOverhead;
  SELECT seqType FROM
    sequenceAdaptivePixelVector = > {
      handle.undefinedSeqData.pixelSequenceType ← adaptive;
      IF ~noBcc THEN IPDIFScannerPrivate.InitPBTTable[
        handle: handle,
        xPixels: handle.undefinedSeqData.pixelV0ThroughV3.nScanLines];
      };
    sequenceCompressedPixelVector = > {
      handle.undefinedSeqData.pixelSequenceType ← compressed;
      IF ~noBcc THEN IPDIFScannerPrivate.InitPBTTable[handle: handle, xPixels: 0];
      };
    sequencePackedPixelVector = > {
      handle.bccInfo.pbtID ← [captureIP, rasterDB];
      handle.undefinedSeqData.pixelSequenceType ← packed;
      };
    ENDCASE;
  handle.undefinedSeqData.pixelLengthInWords ←
    ((seqLength + 1) / Environment.bytesPerWord);
  fileSizeInDiskPages ←
    ResMgrStorage.PagesFromBytes[seqLength] + 2 + trailerPage + 20;
```

```
    handle.undefinedSeqData.fileId ← RTOSFile.Create[
      fileType: ASWFileTypes.rasterJob, size: fileSizeInDiskPages,
      replicated: FALSE, contiguous: TRUE, « TRUE for now, not for
SequenceContinued case !!! »
      threshold: threshold2];
    RETURN[handle, handle.undefinedSeqData.fileId];
    };

Close: PROC [handle: Handle] = {
    zone: UNCOUNTED ZONE = handle.bccInfo.zone;
    fileOffsetInPages, fileSizeInDiskPages, physicalFileSizeInPages:
      ResMgrStorage.Pages ← 0;
    NetLog.Log[[close[]]];
    fileOffsetInPages ← ResMgrStorage.PagesFromWords[
      handle.undefinedSeqData.pixelLengthInWords +
      handle.undefinedSeqData.pixelEncodingOffset];
    SELECT handle.undefinedSeqData.pixelSequenceType FROM
      adaptive, compressed = > {
        IF noBcc THEN {
        IF handle.bccInfo.pbtEntryInfo.is4WordTable THEN GenerateXYTable[handle];
        IPDIFScannerPrivate.StorePBT[handle: handle];
        IPDIFScannerPrivate.VerifyAndCachePBT[
          handle: handle, fileOffsetInPages: fileOffsetInPages];
        handle.undefinedSeqData.breakTableOffset ←
          (fileOffsetInPages * ResMgrStorage.wordsPerPage) -
          handle.undefinedSeqData.pixelEncodingOffset;
        fileSizeInDiskPages ←
          trailerPage + fileOffsetInPages + ResMgrStorage.PagesFromWords[
          handle.undefinedSeqData.breakTableLengthInWords];
            IF handle.bccInfo.buffer0.blockPtr # NIL
          AND handle.bccInfo.bccStatus.EOI = FALSE THEN
          zone.FREE[@handle.bccInfo.buffer0.blockPtr];
            RTOSFile.Truncate[
          fileID: handle.undefinedSeqData.fileId, size: fileSizeInDiskPages]; };
          IF handle.xferId # ResMgr.nullTransferID THEN
            ResMgr.WaitForCompletion[xferId: handle.xferId];
        IF handle.bccInfo.pbtEntryInfo.bccParamPtr # NIL THEN
          zone.FREE[@handle.bccInfo.pbtEntryInfo.bccParamPtr];

};
      packed = > {
        handle.undefinedSeqData.numberOfBreakTableEntries ← 0;
        handle.undefinedSeqData.breakTableLengthInWords ← 0;
        ResMgr.WaitForCompletion[xferId: handle.xferId];
        };
      ENDCASE = > ERROR;
    physicalFileSizeInPages ← RTOSFile.GetFileInfo[
      fileID: handle.undefinedSeqData.fileId, volumeName: NIL].size;
    StoreTrailerPage[handle: handle, fileOffset: (physicalFileSizeInPages - 1)];
    zone.FREE[@handle];
    };

GenerateXYTable: PROC [handle: Handle] = {
    -- at this point, tableIndex = entry number - 1
```

```
xyTablePtr: RTOSIGStructures.TiledImageXYTablePtr ←
  LOOPHOLE[(handle.bccInfo.pbtEntryInfo.tablePtr +
      ((handle.bccInfo.pbtEntryInfo.tableIndex + 1) * SIZE[
        RTOSIGStructures.TiledImageBreakEntry])),
  RTOSIGStructures.TiledImageXYTablePtr];
tablePtr: RTOSIGStructures.TiledImageBreakTablePtr ←
  LOOPHOLE[handle.bccInfo.pbtEntryInfo.tablePtr];
tempPtr: LONG POINTER TO XYTableRecord ←
  LOOPHOLE[(xyTablePtr +
      ((handle.bccInfo.pbtEntryInfo.tableIndex + 1) * SIZE[
        RTOSIGStructures.TiledImageXYEntry])), LONG POINTER];
nScanLines: CARDINAL ← tablePtr.seq[0].nScanLines;

NetLog.Log[[genXYTable[]]];
xyTablePtr.seq[0].xOffset ← 0;
xyTablePtr.seq[0].yOffset ← 0;
FOR i: CARDINAL IN [1..handle.bccInfo.pbtEntryInfo.tableIndex] DO
  -- firstTile is always at (0,0), yOffset is also always 0 in this case
  xyTablePtr.seq[i].xOffset ← nScanLines;
  xyTablePtr.seq[i].yOffset ← 0;
  nScanLines ← nScanLines + tablePtr.seq[i].nScanLines;
  ENDLOOP;
tempPtr.xyTableOffSet ←
  (handle.bccInfo.pbtEntryInfo.tableIndex + 1) * SIZE[
    RTOSIGStructures.TiledImageBreakEntry];
tempPtr.xyTableLength ←
  (handle.bccInfo.pbtEntryInfo.tableIndex + 1) * SIZE[
    RTOSIGStructures.TiledImageXYEntry];
};

Copy: PROC [
  handle: Handle, block: BlockStream.Block, start, size: LONG CARDINAL] = {
  bufferList: ResMgrStorage.BufferList ← NIL;
{
ENABLE
  UNWIND => 
    IF bufferList # NIL THEN
      ResMgr.FreeBufferList[id: handle.clientId, buffer: bufferList];
transferSize: ResMgrStorage.Pages ← 0;
newBlock: BlockStream.Block ← [NIL, 0, 0];
nibblesPerByte: CARDINAL = 2;
tempBufferList: ResMgrStorage.BufferList ← NIL;
bufferList ← CopyData[handle: handle, block: block, start: start, size: size];
tempBufferList ← bufferList.next;

IF handle.undefinedSeqData.pixelSequenceType # packed THEN {
  IF handle.xferId = ResMgr.nullTransferID THEN {
    handle.bccInfo.buffer0.blockPtr ←
      LOOPHOLE[bufferList.base + handle.undefinedSeqData.pixelEncodingOffset];
    IF bufferList.allocateSize * ResMgrStorage.bytesPerPage < size THEN {
      handle.bccInfo.buffer0.blockSizeInNibbles ←
        (ResMgrStorage.wordsPerPage -
          handle.undefinedSeqData.pixelEncodingOffset) *
        Environment.bytesPerWord * nibblesPerByte;
```

```
IF handle.undefinedSeqData.oddByte THEN {
  handle.bccInfo.bccParameters.nibbleOffset ← nibblesPerByte;
  handle.bccInfo.pbtEntryInfo.nibbleCountSoFar ← nibblesPerByte;
  }
ELSE {
  handle.bccInfo.bccParameters.nibbleOffset ← 0;
  handle.bccInfo.pbtEntryInfo.nibbleCountSoFar ← 0;
  };
}
ELSE {
  handle.bccInfo.buffer0.blockSizeInNibbles ← size * nibblesPerByte;
  IF handle.undefinedSeqData.oddByte THEN {
    handle.bccInfo.buffer0.blockSizeInNibbles ←
      handle.bccInfo.buffer0.blockSizeInNibbles + nibblesPerByte;
    handle.bccInfo.bccParameters.nibbleOffset ← nibblesPerByte;
    handle.bccInfo.pbtEntryInfo.nibbleCountSoFar ← nibblesPerByte;
    }
  ELSE {
    handle.bccInfo.bccParameters.nibbleOffset ← 0;
    handle.bccInfo.pbtEntryInfo.nibbleCountSoFar ← 0;
    };
  };
  handle.bccInfo.bccParameters.minPbkScanlines ← 16;
  WITH vec: handle.undefinedSeqData.pixelV0ThroughV3 SELECT
  handle.undefinedSeqData.pixelSequenceType FROM
    adaptive = >
      handle.bccInfo.bccParameters.scanlineNibbles ← vec.scanLength / 4;
    compressed = >
      handle.bccInfo.bccParameters.scanlineNibbles ← vec.scanLength / 4;
    ENDCASE = > ERROR;
  }
ELSE
  IF handle.bccInfo.buffer0.blockPtr = NIL THEN {
    handle.bccInfo.buffer0.blockPtr ← LOOPHOLE[bufferList.base];
    handle.bccInfo.buffer0.blockSizeInNibbles ←
      MIN[size, bufferList.allocateSize * ResMgrStorage.bytesPerPage] *
        nibblesPerByte;
    }
  ELSE {
    handle.bccInfo.buffer1.blockPtr ← LOOPHOLE[bufferList.base];
    handle.bccInfo.buffer1.blockSizeInNibbles ←
      MIN[size, bufferList.allocateSize * ResMgrStorage.bytesPerPage] *
        nibblesPerByte;
    };

IMBcc.GatherPBTDataFromBcc[bccInfoPtr: @handle.bccInfo];

IF tempBufferList # NIL THEN {
  UNTIL tempBufferList = NIL DO
    IF handle.bccInfo.buffer0.blockPtr = NIL THEN {
      handle.bccInfo.buffer0.blockPtr ← LOOPHOLE[tempBufferList.base];
      handle.bccInfo.buffer0.blockSizeInNibbles ←
        tempBufferList.allocateSize * ResMgrStorage.bytesPerPage *
          nibblesPerByte;
```

```
      }
      ELSE {
        handle.bccInfo.buffer1.blockPtr ← LOOPHOLE[tempBufferList.base];
        handle.bccInfo.buffer1.blockSizeInNibbles ←
          tempBufferList.allocateSize * ResMgrStorage.bytesPerPage *
            nibblesPerByte;
        };
      tempBufferList ← tempBufferList.next;
      IMBcc.GatherPBTDataFromBcc[bccInfoPtr: @handle.bccInfo];
      ENDLOOP;
      };

};

IF bufferList # NIL THEN {
    transferSize ← bufferList.allocateSize;
    IF bufferList.next # NIL THEN
      transferSize ← transferSize + bufferList.next.allocateSize;
    };

IF handle.xferId = ResMgr.nullTransferID THEN
    handle.xferId ← ResMgr.WriteAsync[
      id: handle.clientId, freeWhenComplete: TRUE,
      fileID: handle.undefinedSeqData.fileId, fileOffset: 0,
      buffer: bufferList, transferSize: transferSize]
  ELSE
    ResMgr.ChainedWrite[
      xferId: handle.xferId, id: handle.clientId, buffer: bufferList,
      transferSize: transferSize, freeWhenComplete: TRUE];
  bufferList ← NIL;
  };
  };

CopyData: PROC [
  handle: Handle, block: BlockStream.Block, start, size: LONG CARDINAL]
  RETURNS [bufferList: ResMgrStorage.BufferList ← NIL] = {
  ENABLE
    UNWIND = >
      IF bufferList # NIL THEN
        ResMgr.FreeBufferList[id: handle.clientId, buffer: bufferList];

offset: CARDINAL ← 0;
  blockBufferList: ResMgrStorage.BufferList ← NIL;
  startPageOffsetInWords: LONG CARDINAL ←
    ResMgrStorage.PagesFromBytes[start] * ResMgrStorage.wordsPerPage;
  sizePageAlignedToStart: LONG CARDINAL ←
    size - (startPageOffsetInWords * Environment.bytesPerWord - start);

IF handle.xferId = ResMgr.nullTransferID THEN {
    offset ← start MOD ResMgrStorage.bytesPerPage;
    handle.undefinedSeqData.pixelEncodingOffset ←
      offset / Environment.bytesPerWord;
```

```
    IF offset MOD 2 # 0 THEN handle.undefinedSeqData.oddByte ← TRUE;
    };

IF offset # 0 THEN {
    bufferList ← ResMgr.Allocate[
     id: handle.clientId, Pages: 1, base: NIL, waitTillAvailable: TRUE];
    IF bufferList = NIL THEN Print3.SystemError;
    [] ← ByteBlt.ByteBlt[
     from: [
     blockPointer: LOOPHOLE[block.blockPointer], startIndex: CARDINAL[start],
     stopIndexPlusOne: CARDINAL[
     (startPageOffsetInWords * Environment.bytesPerWord)]],
     to: [
     blockPointer: LOOPHOLE[bufferList.base], startIndex: offset,
     stopIndexPlusOne: ResMgrStorage.bytesPerPage], overLap: move];
    bufferList.next ← NIL;

IF sizePageAlignedToStart / ResMgrStorage.bytesPerPage # 0 THEN {
     blockBufferList ← ResMgr.AllocateBufferDescriptor[];

IF blockBufferList = NIL THEN {
      ResMgr.FreeBufferList[handle.clientId, bufferList];
      Print3.SystemError;
      };

blockBufferList.base ← block.blockPointer + startPageOffsetInWords;

IF
      LOOPHOLE[blockBufferList.base, LONG CARDINAL] MOD
       ResMgrStorage.wordsPerPage # 0 THEN ERROR;
     blockBufferList.allocateSize ←
      sizePageAlignedToStart / ResMgrStorage.bytesPerPage;
     blockBufferList.next ← NIL;
     bufferList.next ← blockBufferList;
     };
    }
  ELSE {
   IF sizePageAlignedToStart / ResMgrStorage.bytesPerPage # 0 THEN {
    bufferList ← ResMgr.AllocateBufferDescriptor[];
    IF bufferList = NIL THEN Print3.SystemError;
    bufferList.base ← block.blockPointer;
    IF LOOPHOLE[bufferList.base, LONG CARDINAL] MOD
ResMgrStorage.wordsPerPage
       # 0 THEN ERROR;
    bufferList.allocateSize ←
     sizePageAlignedToStart / ResMgrStorage.bytesPerPage;
    };

IF sizePageAlignedToStart MOD ResMgrStorage.bytesPerPage # 0 THEN {
    blockBufferList ← ResMgr.Allocate[
     id: handle.clientId, Pages: 1, base: NIL, waitTillAvailable: TRUE];
    IF blockBufferList = NIL THEN Print3.SystemError;
    [] ← ByteBlt.ByteBlt[
     from: [
```

```
    blockPointer: LOOPHOLE[block.blockPointer],
    startIndex: CARDINAL[
     (((start + size) / ResMgrStorage.bytesPerPage) *
       ResMgrStorage.bytesPerPage)],
    stopIndexPlusOne: CARDINAL[(start + size)]],
    to: [
    blockPointer: LOOPHOLE[blockBufferList.base], startIndex: 0,
    stopIndexPlusOne: ResMgrStorage.bytesPerPage], overLap: move];
    blockBufferList.next ← NIL;

IF bufferList = NIL THEN bufferList ← blockBufferList
    ELSE bufferList.next ← blockBufferList;
    }};

RETURN[bufferList];
  };

Transfer: PROC [handle: Handle, numberOfBlocks: CARDINAL] = {
  block: BlockStream.Block ← BlockStream.nullBlock;
  transferSizeInPages: ResMgrStorage.Pages ← 0;
  bufferList: ResMgrStorage.BufferList ← NIL;

GetBlock: PROC [] = INLINE {
   block ← handle.inStream.receive[
    sH: handle.inStream ! BlockStream.EOF = > Error[unexpectedEOF];
    Stream.TimeOut = > REJECT; -- handled upstream
    Stream.InvalidOperation = > Error[InvalidStreamOp]]};

UNTIL numberOfBlocks = 0 DO
   GetBlock[];
   -- Do not generate break table for packed sequences
   IF handle.undefinedSeqData.pixelSequenceType # packed THEN {
    IF handle.bccInfo.buffer0.blockPtr = NIL THEN {
     handle.bccInfo.buffer0.blockPtr ← LOOPHOLE[block.blockPointer];
     handle.bccInfo.buffer0.blockSizeInNibbles ← block.stopIndexPlusOne * 2;
     }
    ELSE {
     handle.bccInfo.buffer1.blockPtr ← LOOPHOLE[block.blockPointer];
     handle.bccInfo.buffer1.blockSizeInNibbles ← block.stopIndexPlusOne * 2;
     };
    IMBcc.GatherPBTDataFromBcc[bccInfoPtr: @handle.bccInfo];
    };

bufferList ← ResMgr.AllocateBufferDescriptor[];

transferSizeInPages ← ResMgrStorage.PagesFromBytes[block.stopIndexPlusOne];

IF bufferList # NIL THEN {
    bufferList.base ← block.blockPointer;
    bufferList.allocateSize ← transferSizeInPages;
    bufferList.next ← NIL;
    }
   ELSE ERROR;
```

```
    ResMgr.ChainedWrite[
      xferId: handle.xferId, id: handle.clientId, buffer: bufferList,
      transferSize: transferSizeInPages, freeWhenComplete: TRUE];

numberOfBlocks ← numberOfBlocks - 1;
    ENDLOOP;
  };

StoreTrailerPage: PROC [handle: Handle, fileOffset: ResMgrStorage.Pages] = {
  tempPVBufferList: ResMgrStorage.BufferList ← ResMgr.Allocate[
    id: handle.bccInfo.pbtID, Pages: trailerPage, base: NIL,
    waitTillAvailable: TRUE];
  size: CARDINAL =
    SIZE[DIFPixelData.UndefinedSeqencePixelData] * Environment.bytesPerWord;
  IF tempPVBufferList = NIL THEN Print3.SystemError;
  [] ← ByteBlt.ByteBlt[
    from: [
    blockPointer: LOOPHOLE[@handle.undefinedSeqData], startIndex: 0,
    stopIndexPlusOne: size],
    to: [
    blockPointer: LOOPHOLE[tempPVBufferList.base], startIndex: 0,
    stopIndexPlusOne: size], overLap: move];
  ResMgr.WriteSync[
    id: handle.bccInfo.pbtID, freeWhenComplete: TRUE,
    fileID: handle.undefinedSeqData.fileId, fileOffset: fileOffset,
    buffer: tempPVBufferList, transferSize: trailerPage];
  }; -- of StoreTrailerPage

END.
```

-- File: IPDIFScannerImplB.mesa -- last edit:

DIRECTORY
 Bcc USING [PBTEntryInfo],
 IPDIFScannerPrivate USING [Handle],
 Print3 USING [SystemError],
 ResMgr USING [Allocate, ChainedWrite, nullTransferID, WaitForCompletion],
 ResMgrStorage USING [
  BufferDescriptor, BufferList, Pages, PagesFromWords],
 RMCache USING [BackFillSegment, «Error,» SegmentDescriptor],
 RTOSIGStructures USING [ImageBreakEntry, ImageBreakTablePtr,
  TiledImageBreakEntry, TiledImageXYEntry];

IPDIFScannerImplB: PROGRAM
 IMPORTS Print3, ResMgr, ResMgrStorage, RMCache
 EXPORTS IPDIFScannerPrivate =

BEGIN

-- TYPEs
Handle: TYPE = IPDIFScannerPrivate.Handle;
WordSeq: TYPE = RECORD [SEQUENCE COMPUTED CARDINAL OF WORD];

-- Procedures

InitPBTTable: PUBLIC PROC [handle: Handle, xPixels: CARDINAL] = {
 defaultXPixels: CARDINAL = 5280;  -- only for 8 1/2 X 11 size
 defaultScansPerBreak: CARDINAL = 16;
 pbtTableSize: CARDINAL ← 0;

handle.bccInfo.pbtID ← [captureIP, rasterDB];
 IF xPixels = 0 THEN xPixels ← defaultXPixels;
 pbtTableSize ← CARDINAL[ResMgrStorage.PagesFromWords[
   (((xPixels + defaultScansPerBreak - 1) / defaultScansPerBreak) *
    SIZE[RTOSIGStructures.ImageBreakEntry])]];
 pbtTableSize ← pbtTableSize * 2; -- doubled size just to be sure
 handle.bccInfo.pbtBufferList ← ResMgr.Allocate[Pages: pbtTableSize,
  id: handle.bccInfo.pbtID, base: NIL, waitTillAvailable: TRUE];
 IF handle.bccInfo.pbtBufferList = NIL THEN Print3.SystemError;
 handle.bccInfo.pbtEntryInfo.tablePtr ← handle.bccInfo.pbtBufferList.base;
 };

StorePBT: PUBLIC PROC [handle: Handle] = {
 transferSizeInPages: ResMgrStorage.Pages ← 0;
 handle.undefinedSeqData.numberOfBreakTableEntries ← IF
handle.bccInfo.bccStatus.EOI
   THEN (CARDINAL[handle.bccInfo.pbtEntryInfo.tableIndex] + 1)
   ELSE CARDINAL[handle.bccInfo.pbtEntryInfo.tableIndex];
 handle.undefinedSeqData.breakTableLengthInWords ←
 IF ~handle.bccInfo.pbtEntryInfo.is4WordTable
   THEN CARDINAL[handle.undefinedSeqData.numberOfBreakTableEntries *
         SIZE[RTOSIGStructures.ImageBreakEntry]]
   ELSE CARDINAL[(handle.undefinedSeqData.numberOfBreakTableEntries *

```
            (SIZE[RTOSIGStructures.TiledImageBreakEntry] +
            SIZE[RTOSIGStructures.TiledImageXYEntry])) + 2]; --
xyTableOffSetAndLength
    transferSizeInPages ←
```

ResMgrStorage.PagesFromWords[handle.undefinedSeqData.breakTableLengthInW
ords];
    handle.undefinedSeqData.scansPerBreak ←
    CheckScansPerBreak[handle.bccInfo.pbtEntryInfo];
    ResMgr.ChainedWrite[xferId: handle.xferId, id: handle.bccInfo.pbtID,
        buffer: handle.bccInfo.pbtBufferList, transferSize: transferSizeInPages,
        freeWhenComplete: TRUE];
    ResMgr.WaitForCompletion[xferId: handle.xferId];
    handle.xferId ← ResMgr.nullTransferID;
    handle.bccInfo.pbtBufferList ← NIL;
    handle.bccInfo.pbtEntryInfo.tablePtr ← NIL;
    };

VerifyAndCachePBT: PUBLIC PROC [
    handle: Handle, fileOffsetInPages: ResMgrStorage.Pages] = {
    transferSizeInPages: CARDINAL ← CARDINAL[

ResMgrStorage.PagesFromWords[handle.undefinedSeqData.breakTableLengthInW
ords]];
    IF handle.undefinedSeqData.scansPerBreak = 0 THEN {
      cacheSegmentDescriptor: RMCache.SegmentDescriptor ← [
        backingFile: handle.undefinedSeqData.fileId, filePage: fileOffsetInPages,
        length: transferSizeInPages];
      RMCache.BackFillSegment[id: handle.clientId, segment:
cacheSegmentDescriptor,
        priority: [keepMostRecent[]]]};
    };

CheckScansPerBreak: PROCEDURE [pbtEntryInfo: Bcc.PBTEntryInfo]
      RETURNS [scansPerBreak: CARDINAL] = {
    tablePtr: RTOSIGStructures.ImageBreakTablePtr ←
LOOPHOLE[pbtEntryInfo.tablePtr];
    scansPerBreak ← tablePtr.seq[0].scanCount;
    FOR i: CARDINAL IN [1..pbtEntryInfo.tableIndex) DO
          IF tablePtr.seq[i].scanCount # scansPerBreak THEN
            RETURN [scansPerBreak: 0];
    ENDLOOP;
    RETURN [scansPerBreak];
    };

END...

```
-- File: NetLogImpl.mesa

DIRECTORY
  NetLog USING [Entry],
  Process USING [GetCurrent];

NetLogImpl: MONITOR
  IMPORTS Process
  EXPORTS NetLog =
  BEGIN

-- TYPES
  DatabaseObject: TYPE = ARRAY [0..0) OF Entry;
  Entry: TYPE = RECORD [
   event: NetLog.Entry ← [null[]],
   procID: PROCESS];

W: TYPE = RECORD[SEQUENCE COMPUTED CARDINAL OF WORD];

entriesAllocated: CARDINAL ← 0;
  entriesInUse: CARDINAL ← 0;
  logCalls: CARDINAL ← 0;
  logDB: LONG POINTER TO DatabaseObject ← NIL;
  next: CARDINAL ← 0;
  logOn: BOOLEAN ← TRUE;

CreateLog: PUBLIC PROCEDURE[zone: UNCOUNTED ZONE, nEntries: CARDINAL] =
    BEGIN
    IF logDB = NIL THEN {
      logDB ← LOOPHOLE[zone.NEW[W[SIZE[Entry]*nEntries]]];
      entriesAllocated ← nEntries;
      entriesInUse ← 0;
      logCalls ← 0;
      next ← 0};
    END;

DestroyEventLog: PUBLIC ENTRY PROCEDURE[zone: UNCOUNTED ZONE] =
    BEGIN
    IF logDB = NIL THEN RETURN;
    zone.FREE[@logDB];
    END;

Log: PUBLIC ENTRY PROC[entry: NetLog.Entry] =
    BEGIN
    ENABLE UNWIND = > NULL;
    IF (logDB = NIL) OR (NOT logOn) THEN RETURN;
    logDB[next] ← [entry, Process.GetCurrent[]];
    IF entriesInUse < entriesAllocated THEN entriesInUse ← SUCC[entriesInUse];
    next ← IF next = entriesAllocated-1 THEN 0 ELSE SUCC[next];
    logCalls ← SUCC[logCalls];
    END;

END...
```

```
-- File: MIPStreamMgrImpl.mesa - last edit:

DIRECTORY
 ASWFileTypes USING [interpress],
 BlockStream USING [
   AcquireBlockProcedure, Block, BufferPointer, DeleteProcedure, Object,
   ReceiveBlockProcedure, ReturnBlockProcedure, SetAbortProcedure,
   SetEOFProcedure, StreamHandle, TransmitBlockProcedure],
 DIFConstants USING [ResMgrID, MIPSegmentSize],
 Environment USING [bytesPerWord, bytesPerPage, wordsPerPage],
 JobID USING [ID],
 MIPStreamMgr,
 Process USING [Abort, EnableAborts],
 ResMgr USING [
   Allocate, AllocateBufferDescriptor, nullTransferID, FreeBufferDescriptor,
   FreeBufferList, TransferID, SwapBuffers],
 ResMgrIDs USING [ID],
 ResMgrStorage USING [BufferList, Pages, PagesFromBytes],
 RMCache USING [
   DeleteAllForFile, ForceOut, MakeStatic, SegmentDescriptor, SegmentPriority,
 SwapToCache],
 RTOSFile USING [Create, Delete, FileID, nullID, Truncate];

NewMIPStreamMgrImpl: MONITOR
 IMPORTS Process, ResMgr, ResMgrStorage, RMCache, RTOSFile EXPORTS
 MIPStreamMgr =
 BEGIN OPEN MIPStreamMgr;

-- Constants
FileIDsPerSegment: CARDINAL ←
 (Environment.wordsPerPage / (SIZE[RTOSFile.FileID])) - 1;

-- Types

DirectoryEntry: TYPE = LONG POINTER TO DirectoryEntryRep ← NIL;
DirectoryEntryRep: TYPE = RECORD [
 next, prev: DirectoryEntry ← NIL, segment: DirectorySegment ← NIL];

DirectorySegment: TYPE = LONG POINTER TO DirectorySegmentRep ← NIL;
DirectorySegmentRep: TYPE = RECORD [
 fileID: SEQUENCE size: CARDINAL OF RTOSFile.FileID];

WriterInfo: TYPE = LONG POINTER TO WriterInfoRep ← NIL;
WriterInfoRep: TYPE = RECORD [
 state: StreamState ← init,
 streamStatusProc: StreamStatusProc ← NIL,
 statusOnBlockNumber: CARDINAL ← 0,
 currentSizeInPages: ResMgrStorage.Pages ← 0,
 dIndex: CARDINAL ← 0,
 fileID: RTOSFile.FileID ← RTOSFile.nullID,
 holdingBuffer: ResMgrStorage.BufferList ← NIL,
```

```
    xferId: ResMgr.TransferID ← ResMgr.nullTransferID];

ReaderInfo: TYPE = LONG POINTER TO ReaderInfoRep ← NIL;
ReaderInfoRep: TYPE = RECORD [
    state: StreamState ← init,
    abortStream: BOOLEAN ← FALSE,
    statusProc: StatusProc ← NIL,
    streamHandle: BlockStream.StreamHandle ← NIL,
    fileAvailable: CONDITION,
    spooler: PROCESS,
    directorySize, dIndex: CARDINAL ← 0,
    directoryHead, directoryTail: DirectoryEntry ← NIL];

StreamState: TYPE = {init, read, write, closed};

StreamList: TYPE = LONG POINTER TO StreamListRep ← NIL;
StreamListRep: TYPE = RECORD [
    next, prev: StreamList ← NIL,
    fileHandle: RTOSFile.FileID ← RTOSFile.nullID,
    resMgrID: ResMgrIDs.ID ← DIFConstants.ResMgrID,
    writerInfo: WriterInfoRep,
    readerInfo: ReaderInfoRep,
    zone: UNCOUNTED ZONE ← NIL];

-- Globals
streamListHead: StreamList ← NIL;

-- Public Procs

CreateCacheOutputStream: PUBLIC PROC [
    streamStatusProc: StreamStatusProc, statusOnBlockNumber: CARDINAL ← 1,
    zone: UNCOUNTED ZONE] RETURNS [bsH: BlockStream.StreamHandle, fileId:
RTOSFile.FileID] = {
    nsH: StreamList ← zone.NEW[
        StreamListRep ← [
        writerInfo: [
        streamStatusProc: streamStatusProc,
        statusOnBlockNumber: statusOnBlockNumber], zone: zone]];
    bsH ← zone.NEW[
        BlockStream.Object ← [
        bufPtr: LOOPHOLE[nsH], delete: Delete, acquire: Acquire, receive: Receive,
        return: Return, transmit: Transmit, setAbort: SetAbort, setEOF: SetEOF,
        setTimeout: NIL]];
    nsH.fileHandle ← RTOSFile.Create[
        fileType: ASWFileTypes.interpress, size: 2, replicated: FALSE,
        contiguous: FALSE];
    AppendToStreamList[nsH];
    RETURN[bsH, nsH.fileHandle]};

CreateDiskOutputStream: PUBLIC PROC [
    streamStatusProc: StreamStatusProc, statusOnBlockNumber: CARDINAL ← 1,
    zone: UNCOUNTED ZONE] RETURNS [bsH: BlockStream.StreamHandle, fileId:
RTOSFile.FileID] = {
    bsH ← NIL; fileId ← RTOSFile.nullID};
```

```
OpenMIPInputStream: PUBLIC PROC [
  streamHandle: BlockStream.StreamHandle, fileID: RTOSFile.FileID,
  statusProc: StatusProc, zone: UNCOUNTED ZONE] = {
  streamList: StreamList ← OpenForRead[fileID];
  bsHBufPtr: LONG POINTER TO StreamList ← LOOPHOLE[@streamHandle.bufPtr];
  head, tail: DirectoryEntry ← NIL;
  size: CARDINAL ← 0;
  IF streamList = NIL THEN {
    [head, tail, size] ← DirectoryFromFileID[
      fileID, DIFConstants.ResMgrID, zone];
    streamList ← zone.NEW[
      StreamListRep ← [
      fileHandle: fileID,
      writerInfo: [state: closed],
      readerInfo: [
      state: read, directorySize: size, directoryHead: head,
      directoryTail: tail], zone: zone]];
    AppendToStreamList[streamList]};
  bsHBufPtr ↑ ← streamList; -- Stores streamList in streamHandle.bufPtr
  streamList.readerInfo.statusProc ← statusProc;
  streamList.readerInfo.streamHandle ← streamHandle;
  Process.EnableAborts[@streamList.readerInfo.fileAvailable];
  streamList.readerInfo.spooler ← FORK SpoolToOutStream[streamList]};

CloseStream: PUBLIC PROC [streamHandle: BlockStream.StreamHandle] = {
  streamList: StreamList ← LOOPHOLE[streamHandle.bufPtr];
  JOIN streamList.readerInfo.spooler;
  streamList.readerInfo.state ← closed;
  DeleteFromStreamList[streamList]};

GetPrintIDStatus: PUBLIC PROC [clientID: JobID.ID] RETURNS [ok: BOOLEAN ←
TRUE] =
  {};

SetPrintIDStatus: PUBLIC PROC [clientID: JobID.ID, ok: BOOLEAN] = {};

--Internal Procs

AppendToStreamList: ENTRY PROC [streamListPtr: StreamList] = {
  ENABLE UNWIND = > NULL;
  IF streamListHead # NIL THEN streamListHead.prev ← streamListPtr;
  streamListPtr.next ← streamListHead;
  streamListHead ← streamListPtr};

DeleteFromStreamList: ENTRY PROC [streamListPtr: StreamList] = {
  ENABLE UNWIND = > NULL;
  zone: UNCOUNTED ZONE ← streamListPtr.zone;
  SELECT TRUE FROM
    streamListPtr.writerInfo.state = closed
    AND streamListPtr.readerInfo.state = closed = > {
        RMCache.DeleteAllForFile[id: streamListPtr.resMgrID, fileID:
streamListPtr.fileHandle];
      RTOSFile.Delete[streamListPtr.fileHandle]};
```

```
    streamListPtr.writerInfo.state = closed
      AND streamListPtr.readerInfo.state = init = > FlushDirectory[streamListPtr];
    ENDCASE = > RETURN;
  IF streamListPtr.prev # NIL THEN streamListPtr.prev.next ← streamListPtr.next
  ELSE streamListHead ← streamListPtr.next;
  IF streamListPtr.next # NIL THEN streamListPtr.next.prev ← streamListPtr.prev;
  zone.FREE[@streamListPtr]};

NewDirectoryEntry: PROC [id: ResMgrIDs.ID, zone: UNCOUNTED ZONE]
  RETURNS [newEntry: DirectoryEntry] = {
  buffer: ResMgrStorage.BufferList ← ResMgr.Allocate[id: id, Pages: 1];
  newSegment: DirectorySegment ← LOOPHOLE[buffer.base];
  LOOPHOLE[newSegment, LONG POINTER TO CARDINAL] ↑ ← (FileIDsPerSegment -
1);
  newEntry ← zone.NEW[DirectoryEntryRep ← [segment: newSegment]];
  ResMgr.FreeBufferDescriptor[buffer]};

AddToDirectory: INTERNAL PROC [streamListPtr: StreamList] = {
  ENABLE UNWIND = > NULL;
  readerInfo: ReaderInfo ← @streamListPtr.readerInfo;
  writerInfo: WriterInfo ← @streamListPtr.writerInfo;
  currentSegment: DirectorySegment ← NIL;
  z: UNCOUNTED ZONE ← streamListPtr.zone;
  IF readerInfo.directoryTail = NIL THEN {
    readerInfo.directoryHead ← readerInfo.directoryTail ←
NewDirectoryEntry[streamListPtr.resMgrID, z];
    writerInfo.dIndex ← 0};
  currentSegment ← readerInfo.directoryTail.segment;
  IF writerInfo.dIndex = currentSegment.size THEN {
    newEntry: DirectoryEntry ← NewDirectoryEntry[streamListPtr.resMgrID, z];
    readerInfo.directoryTail.next ← newEntry;
    newEntry.prev ← readerInfo.directoryTail;
    readerInfo.directoryTail ← newEntry;
    writerInfo.dIndex ← 0};
  currentSegment.fileID[writerInfo.dIndex] ← writerInfo.fileID;
  writerInfo.dIndex ← writerInfo.dIndex + 1;
  readerInfo.directorySize ← readerInfo.directorySize + 1;
  NOTIFY readerInfo.fileAvailable};

GetFromDirectory: ENTRY PROC [streamListPtr: StreamList]
  RETURNS [fileID: RTOSFile.FileID] = {
  ENABLE UNWIND = > NULL;
  readerInfo: ReaderInfo ← @streamListPtr.readerInfo;
  currentSegment: DirectorySegment ← NIL;
  WHILE readerInfo.directorySize = 0 DO WAIT readerInfo.fileAvailable; ENDLOOP;
  currentSegment ← readerInfo.directoryHead.segment;
  fileID ← currentSegment.fileID[readerInfo.dIndex];
  IF readerInfo.dIndex = (currentSegment.size - 1) THEN {
    z: UNCOUNTED ZONE ← streamListPtr.zone;
    bufferList: ResMgrStorage.BufferList ← ResMgr.AllocateBufferDescriptor[];
    currentEntry: DirectoryEntry ← readerInfo.directoryHead;
    readerInfo.directoryHead ← currentEntry.next;
    IF readerInfo.directoryHead # NIL THEN readerInfo.directoryHead.prev ← NIL
    ELSE readerInfo.directoryTail ← NIL;
```

```
  IF currentEntry = NIL THEN ERROR;
  z.FREE[@currentEntry];
  bufferList.allocateSize ← 1;
  bufferList.base ← LOOPHOLE[currentSegment];
  ResMgr.FreeBufferList[id: streamListPtr.resMgrID, buffer: bufferList]};
  readerInfo.directorySize ← readerInfo.directorySize - 1;
  readerInfo.dIndex ← readerInfo.dIndex + 1};

CreateOutputSegment: PROC [
  resMgrID: ResMgrDs.ID, bufferList: ResMgrStorage.BufferList,
transferSizeInPages: ResMgrStorage.Pages]
  RETURNS [fileID: RTOSFile.FileID, holdingBuffer: ResMgrStorage.BufferList] = {
  fileID ← RTOSFile.Create[
    fileType: ASWFileTypes.interpress, size: DIFConstants.MIPSegmentSize + 1,
    replicated: FALSE, contiguous: FALSE];
  holdingBuffer ← ResMgr.Allocate[id: resMgrID, Pages:
DIFConstants.MIPSegmentSize + 1];
  SwapAndFree[bufferList, (holdingBuffer.base + Environment.wordsPerPage),
resMgrID]};

FlushSegment: ENTRY PROC [nsH: StreamList, setEOF: BOOLEAN ← FALSE] = {
  ENABLE UNWIND = > NULL;
  IF nsH.writerInfo.state = write THEN {
    SetFileSize[nsH.writerInfo.holdingBuffer, nsH.writerInfo.currentSizeInPages];
    CacheIt[
      bufferList: nsH.writerInfo.holdingBuffer, forceOut: ifNecessary,
        id: nsH.resMgrID, fileID: nsH.writerInfo.fileID, fileOffset: 0,
        length: nsH.writerInfo.holdingBuffer.allocateSize];
    AddToDirectory[nsH];
    nsH.writerInfo.fileID ← RTOSFile.nullID};
  IF setEOF THEN nsH.writerInfo.state ← closed};

OpenForRead: ENTRY PROC [fileID: RTOSFile.FileID]
  RETURNS [streamList: StreamList] = {
  ENABLE UNWIND = > NULL;
  streamList ← streamListHead;
  WHILE streamList # NIL AND streamList.fileHandle # fileID DO
    streamList ← streamList.next; ENDLOOP;
  IF streamList # NIL THEN streamList.readerInfo.state ← read};

FlushDirectory: PROC [streamList: StreamList] = {
  directoryEntry: DirectoryEntry ← streamList.readerInfo.directoryHead;
  lastEntrySize: CARDINAL =
    streamList.readerInfo.directorySize MOD FileIDsPerSegment;
  directorySizeInPages: ResMgrStorage.Pages =
    (streamList.readerInfo.directorySize + FileIDsPerSegment - 1) /
FileIDsPerSegment;
  directoryHoldingBuffer: ResMgrStorage.BufferList ← ResMgr.Allocate[
    id: streamList.resMgrID, Pages: (directorySizeInPages + 1)];
  destPtr: LONG POINTER ← directoryHoldingBuffer.base +
Environment.wordsPerPage;
  ptr: LONG POINTER ← NIL;
  LOOPHOLE[streamList.readerInfo.directoryTail.segment, LONG POINTER TO
CARDINAL] ↑
```

```
    ← lastEntrySize; -- Last entry needs to be updated.
    SetFileSize[directoryHoldingBuffer, directorySizeInPages];
    WHILE directoryEntry # NIL DO
      bufferList: ResMgrStorage.BufferList ← ResMgr.AllocateBufferDescriptor[];
      bufferList.allocateSize ← 1;
      bufferList.base ← LOOPHOLE[directoryEntry.segment];
      SwapAndFree[bufferList, destPtr, streamList.resMgrID];
      ptr ← directoryEntry;
      directoryEntry ← directoryEntry.next;
      streamList.zone.FREE[@ptr];
      destPtr ← destPtr + Environment.wordsPerPage;
      ENDLOOP;
    CacheIt[
      bufferList: directoryHoldingBuffer, forceOut: writeSync,
      id: streamList.resMgrID, fileID: streamList.fileHandle, fileOffset: 0,
      length: (directorySizeInPages + 1)]};

DirectoryFromFileID: PROC [
    fileID: RTOSFile.FileID, id: ResMgrIDs.ID, zone: UNCOUNTED ZONE]
    RETURNS [
    directoryHead, directoryTail: DirectoryEntry ← NIL, size: CARDINAL ← 0] = {
    directorySizeInPages: ResMgrStorage.Pages;
    bufferList: ResMgrStorage.BufferList ← ResMgr.AllocateBufferDescriptor[];
    directorySizeInPages ← GetFileSize[id, fileID];
    bufferList.allocateSize ← 1;
    bufferList.next ← NIL;
    FOR i: ResMgrStorage.Pages IN [1..directorySizeInPages] DO
      segment: RMCache.SegmentDescriptor ← [fileID, i, 1];
      newEntry: DirectoryEntry ← NewDirectoryEntry[id, zone];
      bufferList.base ← LOOPHOLE[newEntry.segment];
      RMCache.MakeStatic[id: id, segment: segment, buffer: bufferList];
      newEntry.prev ← directoryTail;
      IF directoryHead = NIL THEN directoryHead ← directoryTail ← newEntry
      ELSE {directoryTail.next ← newEntry; directoryTail ← directoryTail.next};
      size ← size + newEntry.segment.size;
      ENDLOOP;
    ResMgr.FreeBufferDescriptor[bufferList]};

SetFileSize: PROC [
    bufferList: ResMgrStorage.BufferList, fileSize: ResMgrStorage.Pages] = {
    LOOPHOLE[bufferList.base, LONG POINTER TO ResMgrStorage.Pages] ↑ ←
  fileSize};

GetFileSize: PROC [id: ResMgrIDs.ID, fileID: RTOSFile.FileID]
    RETURNS [sizeInPages: ResMgrStorage.Pages] = {
    buffer: ResMgrStorage.BufferList ← ResMgr.Allocate[id: id, Pages: 1];
    segment: RMCache.SegmentDescriptor ← [fileID, 0, 1];
    RMCache.MakeStatic[id: id, segment: segment, buffer: buffer];
    sizeInPages ← LOOPHOLE[buffer.base, LONG POINTER TO
  ResMgrStorage.Pages] ↑ ;
    ResMgr.FreeBufferList[id: id, buffer: buffer]};

EndOfStream: ENTRY PROC [streamList: StreamList] RETURNS [BOOLEAN] = {
    ENABLE UNWIND = > NULL;
```

```
IF streamList.readerInfo.abortStream THEN ERROR ABORTED;
RETURN[
    streamList.writerInfo.state = closed
    AND streamList.readerInfo.directorySize = 0]};

SpoolToOutStream: PROC [streamList: StreamList] = {
    bufferList: ResMgrStorage.BufferList ← ResMgr.AllocateBufferDescriptor[];
    outStream: BlockStream.StreamHandle ← streamList.readerInfo.streamHandle;
    BEGIN ENABLE ABORTED = > CONTINUE;
    block: BlockStream.Block;
    pagesLeftInBlock: ResMgrStorage.Pages ← 0;
    zone: UNCOUNTED ZONE ← streamList.zone;
    WHILE NOT EndOfStream[streamList] DO
            fileID: RTOSFile.FileID ← GetFromDirectory[streamList];
            pagesLeftInFile: ResMgrStorage.Pages ← GetFileSize[streamList.resMgrID,
fileID];
            fileOffset: ResMgrStorage.Pages ← 1;  -- Start at one since file size is at
page 0
            transferSize: ResMgrStorage.Pages ← 0;
            WHILE pagesLeftInFile > 0 DO
              segment: RMCache.SegmentDescriptor;
              IF pagesLeftInBlock = 0 THEN {
                block ← outStream.acquire[outStream, LAST[LONG CARDINAL]];
                pagesLeftInBlock ←
ResMgrStorage.PagesFromBytes[block.stopIndexPlusOne];
                block.stopIndexPlusOne ← 0};
              transferSize ← MIN[pagesLeftInFile, pagesLeftInBlock];
              bufferList.base ← block.blockPointer + (block.stopIndexPlusOne /
Environment.bytesPerWord);
              bufferList.allocateSize ← transferSize;
              segment.backingFile ← fileID;
              segment.filePage ← fileOffset;
              segment.length ← transferSize;
              RMCache.MakeStatic[id: streamList.resMgrID, segment: segment, buffer:
bufferList];
              block.stopIndexPlusOne ← block.stopIndexPlusOne + (transferSize *
Environment.bytesPerPage);
              pagesLeftInBlock ← pagesLeftInBlock - transferSize;
              IF pagesLeftInBlock = 0 THEN outStream.transmit[outStream, block];
              pagesLeftInFile ← pagesLeftInFile - transferSize;
              fileOffset ← fileOffset + transferSize;
              ENDLOOP;
            RMCache.DeleteAllForFile[id: streamList.resMgrID, fileID: fileID];
            RTOSFile.Delete[fileID];
            ENDLOOP;
    IF pagesLeftInBlock # 0 THEN outStream.transmit[outStream, block];
    END;
    outStream.setEOF[outStream];
    ResMgr.FreeBufferDescriptor[bufferList]};

SwapAndFree: PROC [sourceBuffer: ResMgrStorage.BufferList, destintationPtr:
LONG POINTER, id: ResMgrIDs.ID] = {
    destintationBuffer: ResMgrStorage.BufferList ←
ResMgr.AllocateBufferDescriptor[];
```

```
    destintationBuffer.base ← destintationPtr;
    destintationBuffer.allocateSize ← sourceBuffer.allocateSize;
    ResMgr.SwapBuffers[id: id, id1: id, buffer0: sourceBuffer, buffer1:
destintationBuffer];
    ResMgr.FreeBufferList[id: id, buffer: sourceBuffer];
    ResMgr.FreeBufferDescriptor[destintationBuffer]};

CacheIt: PROC [
    bufferList: ResMgrStorage.BufferList, forceOut: RMCache.ForceOut,
    id: ResMgrIDs.ID, fileID: RTOSFile.FileID, fileOffset, length: ResMgrStorage.Pages]
 = {
    segment: RMCache.SegmentDescriptor ← [fileID, fileOffset, length];
    priority: RMCache.SegmentPriority ← [keepLeastRecent[]];
    RMCache.MakeStatic[id: id, segment: segment, buffer: bufferList, dontRead:
TRUE];
    RMCache.SwapToCache[id: id, segment: segment, priority: priority,
      forceOut: forceOut, staticBuffer: bufferList];
    ResMgr.FreeBufferList[id: id, buffer: bufferList]};

Transmit: BlockStream.TransmitBlockProcedure = {
    nsH: StreamList ← LOOPHOLE[sH.bufPtr];
    bufferList: ResMgrStorage.BufferList ← ResMgr.AllocateBufferDescriptor[];
    blockPtr: LONG POINTER ← block.blockPointer;
    transferSizeInPages: ResMgrStorage.Pages ← ResMgrStorage.PagesFromBytes[
      block.stopIndexPlusOne - block.startIndex];

bufferList.base ← blockPtr + block.startIndex / Environment.bytesPerWord;
    bufferList.allocateSize ← transferSizeInPages;
    bufferList.next ← NIL;

SELECT TRUE FROM
      nsH.writerInfo.state = init = > {
       [nsH.writerInfo.fileID, nsH.writerInfo.holdingBuffer] ← CreateOutputSegment[
         nsH.resMgrID, bufferList, transferSizeInPages];
       nsH.writerInfo.state ← write};

nsH.writerInfo.currentSizeInPages + transferSizeInPages >
        DIFConstants.MIPSegmentSize = > {
           pagesLeftInBlock: ResMgrStorage.Pages =
             DIFConstants.MIPSegmentSize - nsH.writerInfo.currentSizeInPages;
           pagesInNewBlock: ResMgrStorage.Pages = transferSizeInPages -
pagesLeftInBlock;
           nextBase: LONG POINTER = bufferList.base + (pagesLeftInBlock *
Environment.wordsPerPage);
           IF pagesLeftInBlock > 0 THEN { -- Spans across holding buffer; split up
accordingly
             destPtr: LONG POINTER ← nsH.writerInfo.holdingBuffer.base +
               ((nsH.writerInfo.currentSizeInPages + 1) * Environment.wordsPerPage);
             bufferList.allocateSize ← pagesLeftInBlock;
             SwapAndFree[bufferList, destPtr, nsH.resMgrID];
             bufferList ← ResMgr.AllocateBufferDescriptor[];};
       FlushSegment[nsH]; -- This may be forked if proves to be bottleneck
       nsH.writerInfo.currentSizeInPages ← 0;
```

```
            bufferList.base ← nextBase;
            bufferList.allocateSize ← pagesInNewBlock;
    [nsH.writerInfo.fileID, nsH.writerInfo.holdingBuffer] ← CreateOutputSegment[
      nsH.resMgrID, bufferList, pagesInNewBlock];
      };

ENDCASE = > {
    destPtr: LONG POINTER ← nsH.writerInfo.holdingBuffer.base +
          ((nsH.writerInfo.currentSizeInPages + 1) * Environment.wordsPerPage);
    SwapAndFree[bufferList, destPtr, nsH.resMgrID];
          };

nsH.writerInfo.currentSizeInPages ←
    nsH.writerInfo.currentSizeInPages + transferSizeInPages;

IF nsH.writerInfo.statusOnBlockNumber # 0 THEN {
    nsH.writerInfo.statusOnBlockNumber ← nsH.writerInfo.statusOnBlockNumber -
1;
    IF nsH.writerInfo.statusOnBlockNumber = 0 THEN
      nsH.writerInfo.streamStatusProc[sH, nthBlockTransmitted];
    };
  };

SetEOF: BlockStream.SetEOFProcedure = {
  nsH: StreamList ← LOOPHOLE[sH.bufPtr];
  FlushSegment[nsH, TRUE]};

SetAbort: ENTRY BlockStream.SetAbortProcedure = {
  nsH: StreamList ← LOOPHOLE[sH.bufPtr];
  IF nsH.readerInfo.state = read THEN {
    nsH.readerInfo.abortStream ← TRUE;
    Process.Abort[nsH.readerInfo.spooler]};
  };

Delete: BlockStream.DeleteProcedure = {
  nsH: StreamList ← LOOPHOLE[sH.bufPtr];
  zone: UNCOUNTED ZONE ← nsH.zone;
  DeleteFromStreamList[nsH];
  zone.FREE[@sH]};

Acquire: BlockStream.AcquireBlockProcedure = {ERROR};
Receive: BlockStream.ReceiveBlockProcedure = {ERROR};
Return: BlockStream.ReturnBlockProcedure = {ERROR};

END...
```

-- File: Print3SchedImplA.mesa - last edit:

DIRECTORY
 BlockStream USING [StreamHandle],
 Courier USING [Error],
 DBError USING [OperationFailed],
 FENetServ USING [
  FirstBlockComplete, JobParms, JobParmsPtr, PreParseStepParms, Print],
 IPDIF USING [Command, FilterStream, Status, StatusProc],
 IPDIFScanner USING [Error],
 JobBackUp USING [LockID, nullLockID],
 JobID USING [ID, nullID],
 JobStep USING [Error, GetRootStep, RootStep, Status, StatusPut],
 JobQ USING [BackUpJob, DereferenceJob, Error, LockJob, ReferenceJob, UnlockJob],
 MIPStreamMgr USING [CreateCacheOutputStream, StreamStatusProc],
 NetLog USING [CreateLog],
 NetStream USING [CreateStream, CreateDiskStream],
 NetworkLog USING [LogNetJob],
 Print3,
 Print3Sched,
 Print3SchedInternal USING [
  AddInstance, FindInstanceByStream, FindInstanceByJob, PrintJobHandle,
  PrintJobObject, PrintStateHandle, PrintStateObject, RemoveInstance, State],
 Print3Spool,
 Print3Status USING [
  CheckServiceEnabled, CloseConnection, heap, OpenConnection, pagesInBuffer],
 Print3Stream USING [RegisterFile],
 Print3Utils USING [GetJobParms, DumpInstructions],
 PublicPrinting USING [InternalMedium, nullMedium],
 RTOSFile USING [Error, FileID, nullID],
 ResMgrStorage USING [Pages],
 Runtime USING [CallDebugger],
 ServNetServ USING [netServStep],
 SMNetServSSC,
 Stream USING [Handle, TimeOut],
 String,
 System USING [switches],
 Time USING [Current, defaultTime],
 XStream USING [BUG];

Print3SchedImplA: MONITOR LOCKS sH USING sH:
Print3SchedInternal.PrintStateHandle
 IMPORTS
  Courier, DBError, IPDIF, IPDIFScanner, FENetServ, JobStep, JobQ, MIPStreamMgr,
  NetLog, NetStream, NetworkLog, Print3, Print3SchedInternal, Print3Spool,
  Print3Status, Print3Stream, Print3Utils, RTOSFile, Runtime, String, Stream,
  System, Time, XStream
 EXPORTS Print3Sched, SMNetServSSC =

BEGIN

-- globals
bypassName: LONG STRING ← "saveip enabled";

```
debug: BOOLEAN ← FALSE;
callDebug: BOOLEAN ← TRUE;

--Public Procs

Abort: PUBLIC PROCEDURE [jobID: JobID.ID] =
BEGIN
pH: Print3SchedInternal.PrintJobHandle ←
  Print3SchedInternal.FindInstanceByJob[jobID: jobID];
IF (pH # NIL) THEN AbortInternal[sH: pH.sH] ELSE ERROR;  <<SIGNAL invalid JobID>>
  pH.inStream.setAbort[pH.inStream];
  pH.outStream.setAbort[pH.outStream];
END;

AbortAll: PUBLIC PROCEDURE [] = {};

ClearFault: PUBLIC PROCEDURE [bucket: CARDINAL] = {};

PrintJob: PUBLIC PROCEDURE [
  master: Stream.Handle, printAttributes: Print3.PrintAttributes,
  printOptions: Print3.PrintOptions]
  RETURNS [printRequestID: Print3.RequestID] =
BEGIN -- locals intMediaArray: ARRAY [0..1) OF PublicPrinting.InternalMedium;
jobParmsPtr: FENetServ.JobParmsPtr ← NIL;
lockID: JobBackUp.LockID ← JobBackUp.nullLockID;
pH: Print3SchedInternal.PrintJobHandle ← NIL;
preParseParms: FENetServ.PreParseStepParms;
timeOut: BOOLEAN ← FALSE;
zone: UNCOUNTED ZONE ← Print3Status.heap;

intMediaArray[0] ← PublicPrinting.nullMedium;
Print3Status.CheckServiceEnabled[];

Print3Status.OpenConnection[];
jobParmsPtr ← zone.NEW[FENetServ.JobParms];

jobParmsPtr^ ← [
  access: [[all[]], [all[]]], accountNum: NIL, copyCount: 1,
  createDate: Time.defaultTime, finishing: sampleTray, jobName: "Job"L,
  media: DESCRIPTOR[intMediaArray], message: NIL, owner: NIL,
  priority: medium, recipientName: NIL, senderName: NIL, sigJob: FALSE];

preParseParms ← [
  defaulted: [
  TRUE, TRUE, TRUE, TRUE, TRUE, TRUE, TRUE, TRUE, TRUE, TRUE, TRUE],
  media: DESCRIPTOR[intMediaArray], plex: simplex,
  pagesToPrint: [range[[1, LAST[CARDINAL]]]]];
```

```
Print3Utils.GetJobParms[
  printAttributes, printOptions, jobParmsPtr, preParseParms];

printRequestID.jobID ← FENetServ.Print[jobParms: jobParmsPtr];

IF printRequestID.jobID = JobID.nullID THEN ERROR Print3.SpoolingQueueFull;

pH ← zone.NEW[Print3SchedInternal.PrintJobObject ← [next: NIL]];
pH.sH ← zone.NEW[Print3SchedInternal.PrintStateObject ← []];
Print3SchedInternal.AddInstance[pH];

pH.jobID ← printRequestID.jobID;
pH.preParseStepParms ← @preParseParms;

NetLog.CreateLog[zone: zone, nEntries: 120];

[pH.outStream, pH.preParseStepParms^.ipFileID] ←
  MIPStreamMgr.CreateCacheOutputStream[
    streamStatusProc: StreamStatusProc, zone: zone];

SELECT TRUE FROM
  System.switches['n] = down
    AND String.Compare[
      s1: jobParmsPtr^.owner, s2: bypassName, ignoreCase: TRUE] = 0 = >
    pH.inStream ← Spool[
      registerFiles: TRUE, printAttributes: printAttributes,
      printOptions: printOptions, jobParmsPtr: jobParmsPtr, master: master,
      zone: zone];

debug = >
    pH.inStream ← Spool[
      registerFiles: FALSE, printAttributes: printAttributes,
      printOptions: printOptions, jobParmsPtr: jobParmsPtr, master: master,
      zone: zone];

ENDCASE = >
    pH.inStream ← NetStream.CreateStream[
      blockSize: Print3Status.pagesInBuffer, source: master, zone: zone];

SetState[sH: pH.sH, state: running];

pH.jobReference ← JobQ.ReferenceJob[
  pH.jobID ! JobQ.Error, DBError.OperationFailed = > Print3.SystemError; ];

lockID ← JobQ.LockJob[
  job: pH.jobReference, jobID: pH.jobID, readOnly: FALSE !
  JobQ.Error, DBError.OperationFailed = > {
    JobQ.DereferenceJob[job: pH.jobReference]; Print3.SystemError}];

pH.rootStep ← JobStep.GetRootStep[
  lockID: lockID, stepType: ServNetServ.netServStep, transaction: captureIP !
  JobStep.Error, DBError.OperationFailed = > {
```

```
    JobQ.UnlockJob[lockID: lockID];
    JobQ.DereferenceJob[job: pH.jobReference];
    Print3.SystemError}];

JobStep.StatusPut[
    lockID, running, pH.rootStep.stepHandle !
    JobStep.Error, DBError.OperationFailed = > {
    JobQ.UnlockJob[lockID: lockID];
    JobQ.DereferenceJob[job: pH.jobReference];
    Print3.SystemError}];

JobQ.BackUpJob[lockID: lockID];
  JobQ.UnlockJob[lockID: lockID];

IF pH.sH.state # aborting THEN {
  IPDIF.FilterStream[
    handle: LOOPHOLE[pH], inStream: pH.inStream, outStream: pH.outStream,
    statusProc: DIFStatusProc !
    ABORTED, Stream.TimeOut, Courier.Error, XStream.BUG = > {
      CleanUp[pH, jobParmsPtr, faulted, zone]; REJECT};
    IPDIFScanner.Error = > {
      CleanUp[pH, jobParmsPtr, faulted, zone]; Print3.SystemError};
    RTOSFile.Error = >
      SELECT errorType FROM
        insufficientContiguousSpace, noSpace = > {
          CleanUp[pH, jobParmsPtr, faulted, zone];
          Print3.InsufficientSpoolSpace};
        ENDCASE = > {
          CleanUp[pH, jobParmsPtr, faulted, zone]; Print3.SystemError};
      UNWIND = > {NULL}; ANY = > IF callDebug THEN
Runtime.CallDebugger["bug"L]];

CleanUp[pH, jobParmsPtr, done, zone];

NetworkLog.LogNetJob[
      netLogRecord: [
      jobID: printRequestID.jobID, objectName: jobParmsPtr^.jobName,
      senderName: jobParmsPtr^.senderName, version: 1,
      submissionTime: Time.Current[], destination: printQueue,
      messageStatus: noMessage, jobStatus: received]]}
    ELSE CleanUp[pH, jobParmsPtr, faulted, zone];

END; << PrintJob >>

--Internal procs

CleanUp: PROC [
  pH: Print3SchedInternal.PrintJobHandle, jobParmsPtr: FENetServ.JobParmsPtr,
  status: JobStep.Status, zone: UNCOUNTED ZONE] = { lockID: JobBackUp.LockID ← JobQ.LockJob[
    job: pH.jobReference, jobID: pH.jobID, readOnly: FALSE !
    JobQ.Error, DBError.OperationFailed = > {
      JobQ.DereferenceJob[job: pH.jobReference]; Print3.SystemError}];
```

```
JobStep.StatusPut[
 lockID, status, pH.rootStep.stepHandle !
 JobStep.Error, DBError.OperationFailed = > {
  JobQ.UnlockJob[lockID: lockID];
  JobQ.DereferenceJob[job: pH.jobReference];
  Print3.SystemError}];
JobQ.BackUpJob[lockID: lockID];
JobQ.UnlockJob[lockID: lockID];
JobQ.DereferenceJob[job: pH.jobReference];

pH.outStream.delete[pH.outStream];
pH.inStream.delete[pH.inStream];

Print3Status.CloseConnection[error: FALSE];
Print3SchedInternal.RemoveInstance[pH: pH];
zone.FREE[@pH.sH];
zone.FREE[@pH];
zone.FREE[@jobParmsPtr]};

Spool: PROC [
 registerFiles: BOOLEAN, printAttributes: Print3.PrintAttributes,
 printOptions: Print3.PrintOptions, jobParmsPtr: FENetServ.JobParmsPtr,
 master: Stream.Handle, zone: UNCOUNTED ZONE]
 RETURNS [bsH: BlockStream.StreamHandle ← NIL] =

BEGIN
file: RTOSFile.FileID ← RTOSFile.nullID;
fileSize: ResMgrStorage.Pages ← 0;
version: CARDINAL ← 1;
inStream: BlockStream.StreamHandle ← NIL;
protocolFile: RTOSFile.FileID ← RTOSFile.nullID;

IF registerFiles THEN {
 protocolFile ← Print3Utils.DumpInstructions[printAttributes, printOptions];
 [version] ← Print3Stream.RegisterFile[
  fileName: jobParmsPtr^.jobName, fileID: protocolFile,
  postfix: [".ii"L, 0, 3], fileNumber: version, forceNumber: TRUE,
  ipCaptureMode: TRUE]};
inStream ← NetStream.CreateStream[
 blockSize: Print3Status.pagesInBuffer, source: master, zone: zone];
[file, fileSize] ← Print3Spool.SpoolToDisk[
 inStream: inStream, ipCaptureMode: registerFiles];
IF registerFiles THEN
 [version] ← Print3Stream.RegisterFile[
  fileName: jobParmsPtr^.jobName, fileID: protocolFile,
  postfix: [".ii"L, 0, 3], fileNumber: version, forceNumber: TRUE,
  ipCaptureMode: registerFiles];
bsH ← NetStream.CreateDiskStream[
 blockSize: Print3Status.pagesInBuffer, source: file, sourceSize: fileSize,
 zone: zone];
END;
```

```
DIFStatusProc: IPDIF.StatusProc =
BEGIN
pH: Print3SchedInternal.PrintJobHandle ← LOOPHOLE[handle];
RETURN[DIFStatusProcInternal[sH: pH.sH, status: status]];
END;

StreamStatusProc: MIPStreamMgr.StreamStatusProc =
BEGIN
lockID: JobBackUp.LockID ← JobBackUp.nullLockID;

pH: Print3SchedInternal.PrintJobHandle ←
  Print3SchedInternal.FindInstanceByStream[bsH];
IF streamStatus = nthBlockTransmitted AND pH.sH.state = running THEN
  FENetServ.FirstBlockComplete[
    preParseStepParms: pH.preParseStepParms^, jobID: pH.jobID]
ELSE ERROR;
END;

AbortInternal: ENTRY PROCEDURE [sH: Print3SchedInternal.PrintStateHandle] = {
ENABLE UNWIND = > NULL;
IF sH.state = aborting THEN ERROR;
sH.state ← aborting;
};

DIFStatusProcInternal: ENTRY PROC [
sH: Print3SchedInternal.PrintStateHandle, status: IPDIF.Status]
RETURNS [command: IPDIF.Command] =
BEGIN
ENABLE UNWIND = > NULL;
SELECT sH.state FROM
  aborting = > command ← abort;

completing = >
    SELECT status FROM
      ok = > command ← continue;
      done = > {command ← continue; sH.state ← completing};
      error = > {command ← abort; sH.state ← aborting}
      ENDCASE;

idle = > command ← abort;

running = >
    SELECT status FROM
      ok = > command ← continue;
      done = > {command ← continue; sH.state ← completing};
      error = > {command ← abort; sH.state ← aborting}
      ENDCASE
  ENDCASE;
RETURN[command];
END;

SetState: ENTRY PROCEDURE [
sH: Print3SchedInternal.PrintStateHandle, state: Print3SchedInternal.State] =
```

{ENABLE UNWIND => NULL; sH.state ← state};
END.

-- File: Print3SchedImplB.mesa - Last edit:

```
DIRECTORY
 BlockStream USING [StreamHandle],
 JobID USING [ID],
 Print3SchedInternal;

Print3SchedImplB: MONITOR
 EXPORTS Print3SchedInternal =

BEGIN instanceHead: Print3SchedInternal.PrintJobHandle ← NIL;

AddInstance: PUBLIC ENTRY PROCEDURE[pH: Print3SchedInternal.PrintJobHandle]
=
  {ENABLE UNWIND = > NULL;
   listHead: Print3SchedInternal.PrintJobHandle ← instanceHead;
   IF listHead = NIL THEN instanceHead ← pH
   ELSE {
    WHILE listHead.next # NIL DO listHead ← listHead.next ENDLOOP;
    listHead.next ← pH}};

FindInstanceByStream: PUBLIC ENTRY PROCEDURE[bsH:
BlockStream.StreamHandle]
   RETURNS[pH: Print3SchedInternal.PrintJobHandle] = {
   ENABLE UNWIND = > NULL;
   pH ← instanceHead;
   WHILE (pH.outStream # bsH) AND (pH # NIL) DO pH ← pH.next ENDLOOP;
   RETURN[pH]};

FindInstanceByJob: PUBLIC ENTRY PROC[jobID: JobID.ID]
   RETURNS [pH: Print3SchedInternal.PrintJobHandle] = {
   ENABLE UNWIND = > NULL;
   pH ← instanceHead;
   WHILE (pH.jobID # jobID) AND (pH # NIL) DO pH ← pH.next ENDLOOP;
   RETURN[pH]};

RemoveInstance: PUBLIC ENTRY PROCEDURE [pH:
Print3SchedInternal.PrintJobHandle] = {
   instance: Print3SchedInternal.PrintJobHandle ← instanceHead;
   prevInstance: Print3SchedInternal.PrintJobHandle ← NIL;

WHILE (pH # instance) AND (instance # NIL) DO
    prevInstance ← instance;
    instance ← instance.next
    ENDLOOP;
   IF prevInstance # NIL THEN prevInstance.next ← instance.next
   ELSE instanceHead ← NIL};
```

END...

```
-- File: Print3StatusImpl.mesa - last edit:

DIRECTORY
  Courier USING [ExportRemoteProgram, UnexportRemoteProgram],
  EventHandler USING [MemoryActionCompleteProcType, ReportStateChange],
  Heap USING [systemZone],
  IPDIF USING [Init],
  JobID USING [nullID],
  JobQPlus USING [GetNumberOfJobs],
  PublicPrinting USING [Spooler],
  Print3 USING [Busy, ServiceUnavailable, SpoolingDisabled,
    TooManyClients, InsufficientSpoolSpace, SpoolingQueueFull],
  Print3Control USING [],
  Print3Courier USING [Dispatcher, Init, programNumber, version],
  Print3SM USING [InitList],
  Print3Status USING [],
  Process USING [Detach],
  ResMgrIDs USING [TransactionID],
  ResMgrStorage USING [bytesPerPage, Pages],
  SMNetServSSC,
  System USING [switches],
  TopLevel USING [WaitAllUp];

Print3StatusImpl: MONITOR
  IMPORTS Courier, EventHandler, Heap, IPDIF, JobQPlus, Print3, Print3Courier,
    Print3SM, Process, System, TopLevel
  EXPORTS Print3Control, SMNetServSSC, Print3Status =

BEGIN

-- Variables
  spoolingEnabled: BOOLEAN ← FALSE;
  serviceEnabled: BOOLEAN ← TRUE;
  serviceON: BOOLEAN ← FALSE;
  purgeON: BOOLEAN ← FALSE;
  shutdown: BOOLEAN ← FALSE;

diskUsage: ResMgrStorage.Pages ← 0;
  maxDiskUsage: ResMgrStorage.Pages ← 50000;  -- set by allocations
  maxExtensions: CARDINAL ← 32; -- number of file extensions allowed.

openConnections: CARDINAL ← 0;
  maxConnections: CARDINAL ← 1;
  maxConnectionsOffPSwitch: CARDINAL = 6;
  connectionLimit: CARDINAL ← 6; -- set by allocations -- Public Variables
  heap: PUBLIC UNCOUNTED ZONE ← Heap.systemZone;
  maxFileSize: PUBLIC ResMgrStorage.Pages ← 50000; -- set by system limits
  pagesInBuffer: PUBLIC CARDINAL ← 60;
  bytesInBuffer: PUBLIC CARDINAL ← pagesInBuffer * ResMgrStorage.bytesPerPage;
  extendFileBy: PUBLIC ResMgrStorage.Pages ← MAX[pagesInBuffer,
 maxFileSize/maxExtensions];
  defaultFileSize: PUBLIC ResMgrStorage.Pages ← pagesInBuffer;
```

--types memoryClearProc: EventHandler.MemoryActionCompleteProcType ← NIL;

-- Procedures

Shutdown: PUBLIC ENTRY PROCEDURE [id: ResMgrIDs.TransactionID,
        proc: EventHandler.MemoryActionCompleteProcType] =

```
BEGIN
ENABLE UNWIND = > NULL;

spoolingEnabled ← FALSE;
shutdown ← TRUE;

IF openConnections = 0 THEN {
  Process.Detach [FORK proc[[captureIP,netServ]]];
      RETURN;
  };

memoryClearProc ← proc;
END;
```

Resume: PUBLIC ENTRY PROCEDURE [id: ResMgrIDs.TransactionID] =

```
BEGIN
ENABLE UNWIND = > NULL;

spoolingEnabled ← TRUE;
shutdown ← FALSE;
END;
```

CheckStatus: <<Print3Status>> PUBLIC ENTRY PROCEDURE []
    RETURNS [disabled: BOOLEAN] =

```
BEGIN
ENABLE UNWIND = > NULL;

disabled ← IF shutdown OR
      NOT serviceEnabled OR
            NOT spoolingEnabled
    THEN TRUE ELSE FALSE;
END;
```

CheckServiceEnabled: <<Print3Status>> PUBLIC ENTRY PROCEDURE [] =

```
BEGIN
ENABLE UNWIND = > NULL;

IF purgeON THEN RETURN WITH ERROR Print3.Busy;

IF NOT serviceEnabled THEN RETURN WITH ERROR Print3.ServiceUnavailable;
END;
```

```
CloseConnection: <<Print3Status>> PUBLIC ENTRY PROCEDURE [error:
BOOLEAN] =

BEGIN
  ENABLE UNWIND => NULL;
  IF openConnections # 0 THEN openConnections ← openConnections - 1;
  IF shutdown THEN DoShutdown[];
  END;

CloseDiskConnection: <<Print3Status>> PUBLIC ENTRY PROCEDURE [size:
ResMgrStorage.Pages] =

BEGIN
  ENABLE UNWIND => NULL;

IF diskUsage <= size THEN diskUsage ← 0
  ELSE diskUsage ← diskUsage - size;
  END;

<< CloseStreamConnection: PUBLIC ENTRY PROCEDURE [] =

BEGIN
  ENABLE UNWIND => NULL;

streamAvailable ← TRUE;
  IF openConnections # 0 THEN
    openConnections ← openConnections - 1;
  IF shutdown THEN DoShutdown[];
  END; >>

ExportService: PUBLIC ENTRY PROCEDURE [] =

BEGIN << ExportService >>
  ENABLE UNWIND => NULL;

IF serviceON THEN RETURN;

Courier.ExportRemoteProgram[
    programNumber: Print3Courier.programNumber,
    versionRange: [Print3Courier.version, Print3Courier.version],
        zone: heap,
    dispatcher: Print3Courier.Dispatcher,
        classOfService: bulk,
    serviceName: "PrintProtocol"L];

serviceON ← TRUE;
  END; << ExportService >>

Init: PUBLIC PROCEDURE [] = {
  Process.Detach[FORK InitInternal[]]};

CheckDiskUsage: PUBLIC ENTRY PROCEDURE [masterSize: ResMgrStorage.Pages,
``` completed: BOOLEAN] =

```
BEGIN
ENABLE UNWIND = > NULL;

IF (diskUsage + masterSize) > = maxDiskUsage THEN
  RETURN WITH ERROR Print3.InsufficientSpoolSpace;
 IF completed THEN diskUsage ← diskUsage + masterSize;
END;
```

GetSpoolingStatus: <<Print3Status>> PUBLIC ENTRY PROCEDURE []
 RETURNS [status: PublicPrinting.Spooler] =

```
BEGIN
ENABLE UNWIND = > NULL;

IF NOT spoolingEnabled THEN
  status ← disabled
 ELSE IF JobQPlus.GetNumberOfJobs[].systemLimitReached THEN
  status ← full
 ELSE IF openConnections < maxConnections THEN
  status ← available
 ELSE
  status ← busy;
END;
```

OpenConnection: PUBLIC ENTRY PROCEDURE [] =

```
BEGIN
ENABLE UNWIND = > NULL;

IF NOT spoolingEnabled THEN
  RETURN WITH ERROR Print3.SpoolingDisabled;

IF JobQPlus.GetNumberOfJobs[].systemLimitReached THEN
  RETURN WITH ERROR Print3.SpoolingQueueFull;

IF openConnections > = maxConnections THEN
  RETURN WITH ERROR Print3.TooManyClients;

openConnections ← openConnections + 1;
END;
```

PurgeCompleted: PUBLIC ENTRY PROCEDURE [] =
```
BEGIN
ENABLE UNWIND = > NULL;

purgeON ← FALSE;
END;
```

SetMaxPrintConnections: PUBLIC ENTRY PROCEDURE
 [newLimit: CARDINAL] RETURNS [ok: BOOLEAN ← TRUE] =

```
BEGIN
```

```
ENABLE UNWIND = > NULL;

IF newLimit IN [0..connectionLimit] THEN
  maxConnections ← newLimit
ELSE
  ok ← FALSE;
END;

SetMaxDiskUsage: PUBLIC ENTRY PROCEDURE
  [pages: ResMgrStorage.Pages] =
BEGIN
ENABLE UNWIND = > NULL;
maxDiskUsage ← pages;
END;

SetPrint3ServerSwitch: PUBLIC ENTRY PROCEDURE
  [onLine: BOOLEAN] =

BEGIN
ENABLE UNWIND = > NULL;

serviceEnabled ← onLine;
END;

SetServiceSwitch: PUBLIC PROCEDURE [onLine: BOOLEAN] =

BEGIN
IF onLine THEN
  ExportService[]
ELSE
  UnexportService[];
END;

SetSpoolingSwitch: PUBLIC ENTRY PROCEDURE [enable: BOOLEAN] =

BEGIN
ENABLE UNWIND = > NULL;

spoolingEnabled ← enable;
END;

UnexportService: PUBLIC ENTRY PROCEDURE [] =

BEGIN
ENABLE UNWIND = > NULL;

IF NOT serviceON THEN RETURN;

Courier.UnexportRemoteProgram[
  programNumber: Print3Courier.programNumber,
  versionRange: [Print3Courier.version, Print3Courier.version]];
```

```
serviceON ← FALSE;
END;

-- Private Procedures--

DoShutdown: PROCEDURE [] =
  BEGIN
  IF openConnections = 0 AND memoryClearProc # NIL THEN {
    memoryClearProc[[captureIP,netServ]];
        memoryClearProc ← NIL;
        };
  END;

InitInternal: ENTRY PROCEDURE [] =

BEGIN
  ENABLE UNWIND = > NULL;

TopLevel.WaitAllUp[];
  EventHandler.ReportStateChange[
  id: [trans: captureIP, module: netServ],
  data: [
  state: notReady, jobInfo: [JobID.nullID, add, medium, 0, running],
  resume: none, faultList: [NIL, NIL, NIL, NIL]]];

Print3SM.InitList[];
  Print3Courier.Init[];
  IPDIF.Init[];
  IF System.switches['P] = down THEN
    maxConnections ← maxConnectionsOffPSwitch;
  IF System.switches['n] = down THEN
    maxDiskUsage ← LAST [LONG CARDINAL];

EventHandler.ReportStateChange[
  id: [trans: captureIP, module: netServ],
  data: [
  state: ready, jobInfo: [JobID.nullID, add, medium, 0, running],
  resume: none, faultList: [NIL, NIL, NIL, NIL]]];
  END;

END.
```

EXTERNAL SOFTWARE INTERFACES TO THE DIF SOFTWARE:

ASWFileTypes USING [rasterJob],
  BlockStream USING [StreamHandle];
  ByteBlt USING [ByteBlt],
  Courier USING [ErrorCode],
  DBError USING [OperationFailed],
  DirectoryType USING [OperatorAccess],
  Environment USING [Byte, bytesPerPage],
  EventHandler USING [MemoryActionCompleteProcType],
  FaultLogger USING [ID],
  Heap USING [systemZone],
  Inline USING [BITOR, LongMult],
  JobBackUp USING [LockID],
  JobID USING [ID],
  JobStep USING [RootStep],
  JobQ USING [Priority],
  MRSignature USING [defaultTrimOffset, defaultTrimSizeX, defaultTrimSizeY,
    TrimOffset, TrimSizeX, TrimSizeY],
  NetStream USING [CreateStream, CreateDiskStream],
  Print3 USING [PrintAttributes, PrintOptions, RequestID],
  Print3Control USING [],
  Print3Courier USING [Dispatcher, Init, programNumber, version],
  Process USING [Detach],
  PublicPrinting USING [Finishing, InternalMedia, PagesToPrint, Plex],
  RasterObjects USING [PixelSequence, PixelOverhead],
  ResMgrIDs USING [ID],
  ResMgrStorage USING [Pages];
  RMCache USING [BackFillSegment, «Error,» SegmentDescriptor],
  RTOSFile USING [FileID, nullID];
  RTOSIGStructures USING [
    TiledImageXYEntry, TiledImageXYTablePtr, TiledImageBreakTablePtr,
    TiledImageBreakEntry],
  RTOSMP2Process USING [DirectProcess],
  ServPreParse USING [DefaultRecord],
  Stream USING [CompletionCode];
  System USING [GreenwichMeanTime],
  Time USING [Current, defaultTime],
  TopLevel USING [WaitAllUp];
  UserProfile USING [DefaultJobAccess];
  XStream USING [BUG];

What is claimed is:

1. A network printing system, having a memory section, for making prints from a job represented by a stream of image data written in a printer page description language, the stream of image data corresponding with one or more images, the one or more images including a compressed bitmap having break entries dividing the bitmap into a plurality of image data segments, comprising:

a preparsing system for separating image data associated with the compressed bitmap from the stream of image data, said separating including segregating image data associated with each of the one or more images into an image data set;

a boundary code catching system, communicating with said preparsing system, for examining the image data set associated with the compressed bitmap and placing the break entries thereof into a break entry table;

the break entry table being stored along with the image data set for the compressed bitmap in the memory section; and a plurality of imaging channels, communicating with said memory section, for decompressing selected segments of the compressed bitmap, in parallel, by reference to the break entry table.

2. The printing system of claim 1, further comprising:

a workstation;

a network adapted to operatively couple said preparsing system with said workstation, the stream of image data being communicated across said network; and a data stream delivery system for inputting the stream of image data from said network to said preparsing system.

3. The printing system of claim 2, further comprising an input filter for modifying the stream of image data while separating the compressed bitmap therefrom.

4. The printing system of claim 3, wherein said boundary code catching system communicates with said input filter for operating on the bitmap being received at said data stream delivery system.

5. The printing system of claim 3, further comprising a second memory section for storing the modified stream of image data.

6. The printing system of claim 5, wherein said input filter directs the compressed bitmap with its corresponding break entry table to said first memory section and the modified stream to said second memory section.

7. The printing system of claim 1, further comprising a system for installing the compressed bitmap, with the corresponding break entry table, in said memory.

8. The printing system of claim 1, further comprising an image output terminal for printing the bitmap on a substrate, wherein said image output terminal includes said decompression channels.

9. The printing system of claim 1, further comprising a buffer, communicating with both said preparsing system and said boundary code catching system, for buffering the bitmap.

10. A parsing apparatus for a network printing system with multiple decompression channels, said parsing apparatus receiving a stream of image data corresponding with one or more images and being written in a printer page description language, the stream of image data including a compressed bitmap having break entries dividing the bitmap into a plurality of image data segments, comprising:

a preparsing system for separating image data associated with the compressed bitmap from the stream of image data, said separating including segregating image data associated with each of the one or more images into an image data set;

a boundary code catching system, communicating with said preparsing system, for examining the image data set associated with the compressed bitmap and placing the break entries thereof into a break entry table;

the plurality of image data segments of the compressed bitmap being decompressed, in parallel, with the multiple decompression channels by reference to the break entry table.

11. The parsing apparatus of claim 10, in which said parsing apparatus is operatively coupled with memory, further comprising an image installment system for storing the compressed bitmap, with the corresponding break entry table, in the memory.

12. The parsing apparatus of claim 10, further comprising an input filter for modifying the stream of image data while separating the compressed bitmap therefrom.

13. The parsing apparatus of claim 12, further comprising:

a first memory section for storing the compressed bitmap with the corresponding break entry table; and a second memory section for storing the modified stream of image data.

14. The parsing apparatus of claim 13, wherein said input filter directs the compressed bitmap, with its corresponding break entry table, to the first memory section and the modified stream to the second memory section.

15. The parsing apparatus of claim 12, in which the parsing apparatus includes a data stream delivery system for inputting the stream of image data to said preparsing system, wherein said boundary code catching system communicates with said input filter for operating on the stream of image data being received by the data stream delivery system.

16. The parsing apparatus of claim 10, further comprising a buffer, communicating with both said preparsing system and said boundary code catching system, for buffering the bitmap.

* * * * *